United States Patent
Dunlap et al.

(10) Patent No.: US 11,975,915 B1
(45) Date of Patent: *May 7, 2024

(54) LIFT LOOP ASSEMBLY TEST PROCESS AND APPARATUS

(71) Applicant: AMERIGLOBE, LLC, Lafayette, LA (US)

(72) Inventors: Clifford Dunlap, Baton Rouge, LA (US); Brody Alan Viator, Lafayette, LA (US)

(73) Assignee: Ameriglobe, LLC, Lafayette, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,945

(22) Filed: Feb. 22, 2023

Related U.S. Application Data

(63) Continuation of application No. 17/007,828, filed on Aug. 31, 2020, now Pat. No. 11,591,156.

(Continued)

(51) Int. Cl.
*B65D 88/16* (2006.01)
*B65D 33/10* (2006.01)
(Continued)

(52) U.S. Cl.
CPC ..... *B65D 88/1681* (2013.01); *B65D 88/1668* (2013.01); *G01N 3/08* (2013.01);
(Continued)

(58) Field of Classification Search
CPC ............ B65D 88/1681; B65D 88/1668; B65D 33/105; G01N 3/08; G01N 3/12;
(Continued)

(56) References Cited

U.S. PATENT DOCUMENTS

| 4,211,266 A | 7/1980 | Massey |
| 4,364,424 A | 12/1982 | Nattrass |

(Continued)

FOREIGN PATENT DOCUMENTS

| CN | 103600936 | 2/2014 |
| CN | 203601811 | 5/2014 |

(Continued)

OTHER PUBLICATIONS

PCT International Search Report and the Written Opinion of the Searching Authority for International Application No. PCT/US2014/041154 (dated Nov. 6, 2014).

(Continued)

*Primary Examiner* — Jonathan M Dunlap
(74) *Attorney, Agent, or Firm* — Garvey, Smith & Nehrbass, Patent Attorneys, L.L.C.; Julia M. FitzPatrick; Gregory C. Smith

(57) ABSTRACT

A hand-held lift loop assembly tester apparatus and method tests peel strength of a heat seal connection between a lift loop patch and a bulk bag body as an indicator of shear strength of the connection and whether the bag will pass industry safety lifting requirements. A lifting platform of the hand loop tester is inserted between the patch and the bag body in an unsealed area and measures the amount of peel and thus the peel strength of the heat seal bond or connection at the edges or sides of the unsealed area. If the peel strength is adequate, this is a reliable indicator that the shear strength of the bond or connection is also adequate and that the bag will meet the current industry required 5 to 1 safety lifting requirements.

20 Claims, 38 Drawing Sheets

Related U.S. Application Data

(60) Provisional application No. 63/046,409, filed on Jun. 30, 2020, provisional application No. 62/893,561, filed on Aug. 29, 2019.

(51) Int. Cl.
*G01N 3/08* (2006.01)
*G01N 3/12* (2006.01)
*G01N 3/24* (2006.01)
*G01N 19/04* (2006.01)

(52) U.S. Cl.
CPC ............... *G01N 3/12* (2013.01); *G01N 3/24* (2013.01); *G01N 19/04* (2013.01); *B65D 33/105* (2013.01); *G01N 2203/0091* (2013.01); *G01N 2203/0282* (2013.01)

(58) Field of Classification Search
CPC .. G01N 3/24; G01N 19/04; G01N 2203/0091; G01N 2203/0282
See application file for complete search history.

(56) References Cited

U.S. PATENT DOCUMENTS

| | | | |
|---|---|---|---|
| 4,479,243 A | 10/1984 | Derby et al. | |
| 4,480,766 A | 11/1984 | Platt | |
| 4,781,473 A | 11/1988 | LaFleur | |
| 4,781,475 A | 11/1988 | LaFleur | |
| 4,822,179 A | 4/1989 | Nattrass | |
| 4,865,218 A | 9/1989 | Derby et al. | |
| 5,536,086 A | 7/1996 | Nattrass | |
| 5,695,598 A | 12/1997 | Groshens et al. | |
| 5,823,683 A | 10/1998 | Antonacci et al. | |
| 6,063,418 A | 5/2000 | Sugimoto et al. | |
| 6,076,702 A | 6/2000 | Hoffmann et al. | |
| 6,305,845 B1 | 10/2001 | Navin | |
| 6,374,579 B1 | 4/2002 | Muller | |
| 6,935,782 B2 | 8/2005 | Cholsaipant | |
| 7,276,269 B2 | 10/2007 | Kraimer et al. | |
| 8,297,840 B2 | 10/2012 | Jansen | |
| 8,562,214 B2 | 10/2013 | Dozier et al. | |
| 10,112,739 B2 | 10/2018 | Dunlap et al. | |
| 10,479,599 B2 | 11/2019 | Dunlap et al. | |
| 10,618,225 B2 | 4/2020 | Dunlap | |
| 10,745,192 B2 | 8/2020 | Dunlap et al. | |
| 11,591,156 B1 | 2/2023 | Dunlap et al. | |
| 2008/0115458 A1 | 5/2008 | Funaki et al. | |
| 2008/0176009 A1 | 7/2008 | Chereau et al. | |
| 2009/0260324 A1 | 10/2009 | Funaki et al. | |
| 2010/0209025 A1 | 8/2010 | Futase | |
| 2011/0019942 A1 | 1/2011 | Piraneo | |
| 2011/0085749 A1 | 4/2011 | Frei et al. | |
| 2011/0142378 A1 | 6/2011 | Samadijavan et al. | |
| 2011/0206300 A1 | 8/2011 | Koesters et al. | |
| 2012/0227363 A1 | 9/2012 | Nussbaum | |
| 2012/0314979 A1 | 12/2012 | Heininga | |
| 2013/0202231 A1 | 8/2013 | Nowak et al. | |
| 2013/0209002 A1 | 8/2013 | Bazbaz | |
| 2014/0360669 A1 | 12/2014 | Schnaars, Sr. et al. | |
| 2014/0363106 A1 | 12/2014 | Schnaars, Sr. et al. | |
| 2018/0050863 A1 | 2/2018 | Dunlap et al. | |
| 2018/0118451 A1 | 5/2018 | Dunlap et al. | |
| 2018/0126661 A1 | 5/2018 | Dunlap et al. | |
| 2019/0185212 A1 | 6/2019 | Dunlap et al. | |
| 2020/0156863 A1 | 5/2020 | Dunlap et al. | |
| 2020/0254697 A1 | 8/2020 | Dunlap et al. | |

FOREIGN PATENT DOCUMENTS

| | | |
|---|---|---|
| EP | 0342012 | 11/1989 |
| EP | 1298075 | 4/2003 |
| EP | 2570365 | 3/2013 |
| GB | 1604213 | 12/1981 |
| GB | 2429198 | 2/2007 |
| JP | h061389 | 1/1994 |
| SU | 1533636 | 1/1990 |
| WO | 9811291 | 3/1998 |
| WO | 2003/032763 | 4/2003 |
| WO | 2012/121716 | 9/2012 |
| WO | 2014/197727 | 12/2014 |
| WO | 2014/197728 | 12/2014 |
| WO | 2018085843 | 5/2018 |
| WO | 2018089504 | 5/2018 |
| WO | 2018118975 | 6/2018 |

OTHER PUBLICATIONS

PCT International Search Report and the Written Opinion of the Searching Authority for International Application No. PCT/US2014/041155 (dated Sep. 10, 2014).

PCT International Search Report and the Written Opinion of the Searching Authority for International Application No. PCT/US2017/067393 (dated Apr. 26, 2018).

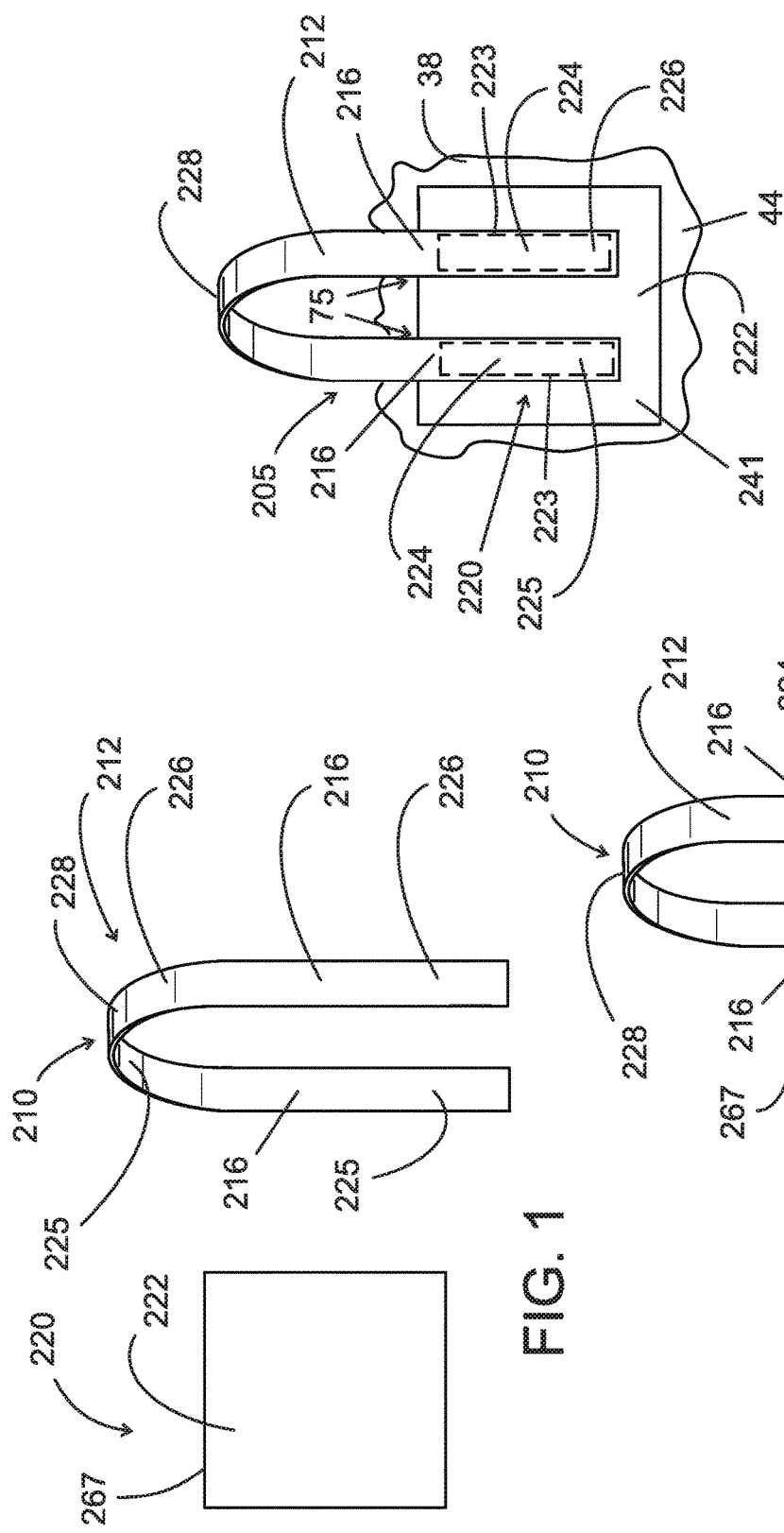

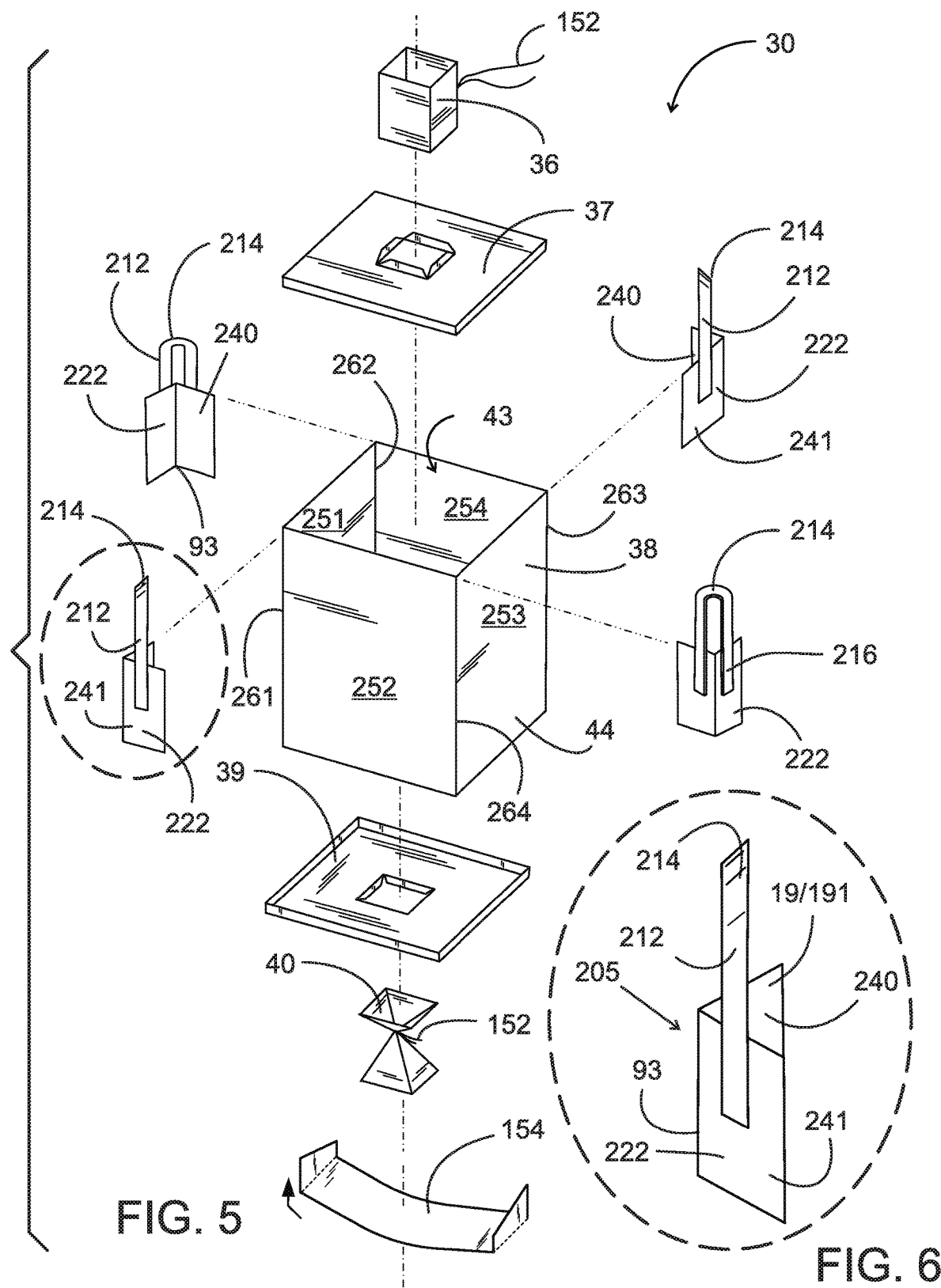

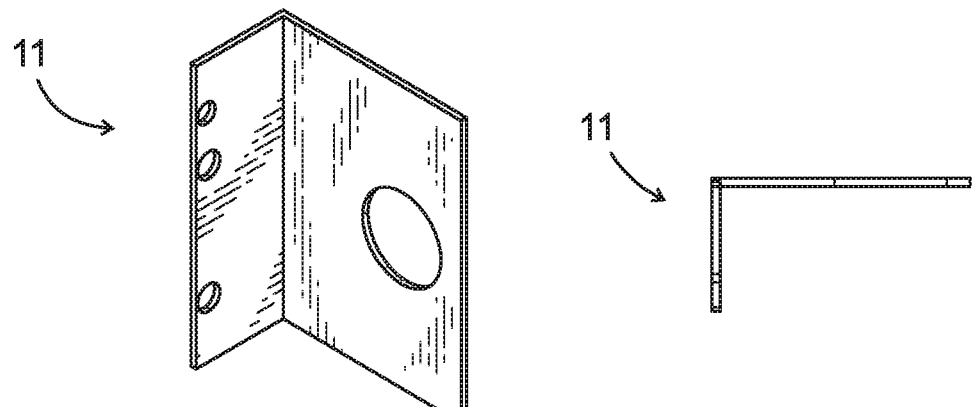
FIG. 39
FIG. 40
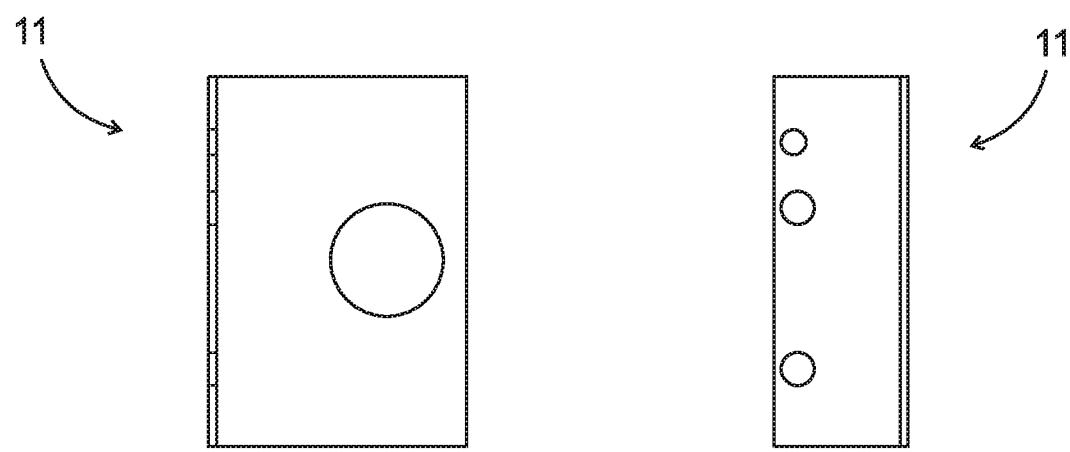
FIG. 41
FIG. 42

FUSION *AMERIGLOBE*
Lowering Cost Through Unique Solutions

System screens

LOOP TESTER MAIN

CANCEL/RESET

Date: [ ]

Bag Test Count: [ 0 ]
Pass: [ 0 ]  Fail: [ 0 ]

Enter bag no. to begin test: [ 0 ]

Duration of Loading per Loop (sec): [ 3 ]
Loops Tested: [ 0 ]
Air Pressure (PSI): [ 66 ]
Peel distance: [ +0.00 ]

PEEL RESULTS
| | A | B | AVG |
|---|---|---|---|
| L1 | +0.00 | +0.00 | +0.00 |
| L2 | +0.00 | +0.00 | +0.00 |
| L3 | +0.00 | +0.00 | +0.00 |
| L4 | +0.00 | +0.00 | +0.00 |
| TOTAL | | | +0.00 |

Failure Rate: [ 0% ]   Reset Fail Rate

Machine Mode: [ ¦ ¦ ¦ ]   PRODUCTION

Operator ID: [ ]

LIFT LOOP ASSEMBLY TEST PROCESS AND APPARATUS

CROSS-REFERENCE TO RELATED APPLICATIONS

This is a continuation of U.S. patent application Ser. No. 17/007,828, filed on 31 Aug. 2020 (issued as U.S. Pat. No. 11,591,156 on Feb. 28, 2023), which claims priority to and/or the benefit of U.S. Patent Application Ser. No. 62/893,561, filed on 29 Aug. 2019 and U.S. Patent Application Ser. No. 63/046,409, filed on 30 Jun. 2020, each of which is hereby incorporated herein by reference thereto, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a quality control method and apparatus for testing the safety and strength of lift loop assemblies on bulk bags. More particularly, the present invention relates to a lift loop tester apparatus, which for example can be hand held, that tests peel strength of a connection between a lift loop patch and a hulk hag body as an indicator of shear strength of the connection and whether the bag will pass industry safety lifting requirements.

2. General Background of the Invention

Many industries exist in which large quantities of materials or products must be contained and transported. Such materials or products can be free-flowing, making it necessary to fully support the entire volume of the materials or products. Industries that deal with storing and transporting such dry, flowable products, e.g., sand, fertilizer, granules of plastic, powdered chemicals, carbon black, grains and food products, use what are known as Flexible Intermediate Bulk Containers (FIBC), also known as bulk bags, industrial bags, or big bags. The bags are generally made from flexible fabric, e.g., flexible plastic fabric, and typically are made from woven polypropylene or woven polyethylene fabric. The bags in the prior art for decades have been assembled from multiple pieces of flexible fabric that are sewn together at stitched joints. More recently, the Applicant has developed bulk bags that are stitch free in at least a containment area of the bag, and which are manufactured with heat seal joints or connections instead of stitched seams. Reference is made to the following patent applications of the same Applicant, each of which is incorporated herein by reference thereto, for further detail:

i) U.S. patent application Ser. No. 14/297,441, filed on 5 Jun. 2014, titled "METHOD OF PRODUCTION OF FABRIC BAGS OR CONTAINERS USING HEAT FUSED SEAMS", issued as U.S. Pat. No. 10,112,739, on 30 Oct. 2018;

ii) International PCT Patent Application No. PCT/US2014/041155, filed on 5 Jun. 2014, titled "METHOD OF PRODUCTION OF FABRIC BAGS OR CONTAINERS USING HEAT FUSED SEAMS", published as No. WO2014/197728A1 on 11 Dec. 2014;

iii) U.S. patent application Ser. No. 15/345,452, filed on 7 Nov. 2016, titled "INDUSTRIAL BAG DISCHARGE SPOUT", published as No. US2018/0050863A1 on 22 Feb. 2018, and issued as U.S. Pat. No. 10,745,192 on 18 Aug. 2020;

iv) International PCT Patent Application No. PCT/US2017/060411, on filed 7 Nov. 2017, titled "INDUSTRIAL BAG DISCHARGE SPOUT", published as No. WO2018/085843A1 on 11 May 2018;

v) U.S. patent application Ser. No. 15/383,841, filed on 19 Dec. 2016, titled "INDUSTRIAL BAG LIFT LOOP ASSEMBLY", published as No. US2018/0118451A1 on 3 May 2018, and issued as U.S. Pat. No. 10,479,599 on 19 Nov. 2019;

vi) International PCT Patent Application No. PCT/US2017/067393, filed 19 Dec. 2017, titled "INDUSTRIAL BAG LIFT LOOP ASSEMBLY", published as No. WO2018/118975A1 on 28 Jun. 2018;

vii) U.S. patent application Ser. No. 15/807,272, filed on 8 Nov. 2017, titled "CARRIER PLATE FOR USE IN MANUFACTURING STITCHLESS BULK BAGS WITH HEAT FUSED SEAMS", published as No. US2018/0126661A1 on 10 May 2018, and issued as U.S. Pat. No. 10,618,225 on 14 Apr. 2020;

viii) International PCT Patent Application No. PCT/US2017/060652, filed 8 Nov. 2017, titled "STITCHLESS BULK BAG WITH HEAT FUSED SEAMS AND METHOD OF PRODUCTION", published as No. WO2018/089504A1 on 17 May 2018;

ix) U.S. patent application Ser. No. 16/126,635, filed on 10 Sep. 2018, titled "METHOD OF PRODUCTION OF FABRIC BAGS OR CONTAINERS USING HEAT FUSED SEAMS", published as US 2019/0185212A1 on 20 Jun. 2019;

x) U.S. patent application Ser. No. 16/796,521, filed on 20 Feb. 2020, titled "STITCHLESS BULK BAG WITH HEAT FUSED SEAMS AND METHOD OF PRODUCTION", published as US2020/0254697A1 on 13 Aug. 2020; and xi) U.S. patent application Ser. No. 16/687,196, filed on 18 Nov. 2019, titled "INDUSTRIAL BAG LIFT LOOP ASSEMBLY", published as US2020/0156863A1 on 21 May 2020.

Bulk bags or FIBCs are generally large bags that must safely carry tremendous weights, e.g., one to two tons of materials, and in some cases more than two tons of material (e.g., 4,000 to 5,000 pounds of material), from one location to another. In the industry, bulk bags generally are required to pass 5 to 1 industry safety lifting margins. This means that a bag designed to hold 2,200 pounds of material generally must pass an FIBC generally accepted safety test of holding 11,000 pounds of material.

Prior art testing of bulk bags requires destruction of the bulk bag, and thus, not every bag put on the market can be tested. To test a bulk bag in the prior art, the bag is hung from its lift loops and hydraulic pressure is applied to the bag from the top of the bag to measure the force needed to break the bag.

There is a need in the art for a testing process and apparatus that can test a bulk bag's lifting capacity without destruction of the bag.

There is also a need in the art to be able to safely and accurately test lifting capacity of all bulk bags put on the market to ensure each bag meets the industry required safety margins, instead of just testing a sample of bulk bags put on the market.

BRIEF SUMMARY OF THE INVENTION

The apparatus and method of the present invention solves the problems confronted in the art in a simple and straightforward manner. What is provided is a lift loop assembly tester that can perform a quality control function for each bulk bag put on the market by testing the peel strength of a lift assembly heat seal bond and providing a reliable indicator as to whether the bag can safely lift desired weights, e.g., weights according to the generally accepted FIBC industry safety standards. Currently, a 5 to 1 weight lift safety ratio is the industry accepted safety standard as provided by FIBCA (Flexible Intermediate Bulk Container Association) guidelines. The safety lift test and apparatus of one or more preferred embodiments of the method and apparatus of the present invention can also potentially measure strength of a bulk bag based on industry standards and/or regulations to be developed in the future.

In one or more preferred embodiments, the apparatus, system and method of the present invention measures peel of a heat seal bond or connection between flexible fabrics, e.g., flexible plastic fabrics, and peel strength of the heat seal bond or connection, which provides an indication of shear strength of the heat seal bond or connection.

In bulk bags formed with heat seal connections, preferably a lifting assembly is provided on the bag that does not create stitch holes in a containment area of the bag, e.g., does not create stitch holes along the bag body sidewalls, e.g., as shown and described in U.S. patent application Ser. No. 15/383,841, filed 19 Dec. 2016, titled "INDUSTRIAL BAG LIFT LOOP ASSEMBLY", published as No. US2018/0118451A1 on 3 May 2018, and issued as U.S. Pat. No. 10,479,599 on 19 Nov. 2019; U.S. patent application Ser. No. 15/807,272, filed on 8 Nov. 2017, entitled "CARRIER PLATE FOR USE IN MANUFACTURING STITCHLESS BULK BAGS WITH HEAT FUSED SEAMS", published as No. US2018/0126661A1 on 10 May 2018, and issued as U.S. Pat. No. 10,618,225 on 14 Apr. 2020; and U.S. patent application Ser. No. 16/687,196, filed on 18 Nov. 2019, titled "INDUSTRIAL BAG LIFT LOOP ASSEMBLY", published as US2020/0156863A1 on 21 May 2020 each of which is incorporated herein by reference.

A lift loop assembly as described in U.S. patent application Ser. Nos. 15/383,841; 15/807,272; and 16/687,196 can include a fabric patch that is heat sealed to the fabric bag body sidewall. A lift loop is preferably sewn to the patch prior to heat sealing the patch to the body sidewall. No stitching penetrates the body sidewall.

Such a lift loop assembly is very strong and bags with the lift loop assembly routinely pass the 5 to 1 industry safety requirements. However, it is difficult to determine by just looking at the heat seal connection of the lift assembly patch on the body whether the connection is flawed in some area, which would cause the bag to fail or break when filled with bulk material and lifted by the lift loops.

In manufacturing a heat sealed bag as described in U.S. patent application Ser. Nos. 15/383,841; 15/807,272; and 16/687,196, preferably each lift loop assembly including a lift loop attached to a patch is folded and placed along a gusseted edge of the bag body in a folded configuration. One lift loop leg of each assembly is positioned on an exterior side of the body gussets and the second lift loop leg of each assembly is positioned on an interior side of the body gussets. The bag body with the lift loop assemblies positioned thereon is passed through a heat sealing machine and heat seal bars of the machine heat seal the patches of the lift loop assembly to the bag body with a heat seal bond in between the lift loop patch and bag body. For each lift loop assembly, however, an area of the patch underneath the lift loop legs is not heat sealed to the bag body because preferably the heat seal bar has a u-shape which does not provide heat to the lift loop itself so that any heat seal coupler in that area does not melt and form a heat seal connection between the patch and the bag body. The lift loop assembly tester of one or more preferred embodiments of the present invention is inserted between the patch and the bag body in this unsealed area and measures the peel strength of the heat seal bond or connection along the edges of the area that is not sealed. If the peel strength is adequate, this is a reliable indicator that the shear strength of the bond or connection is also adequate and that the bag will meet the current industry required 5 to 1 safety lifting requirements.

Because of something called the elasticity modulus which indicates that no testing of the shear strength that tests the entire bond can predict the final strength of the next pull, every commonly known method of testing lift loop safety of bulk bags is unable to assure the safety of the lifting mechanisms (loops) for the very next pull. Because of this modulus feature in plastics, testing and experimentation performed with regard to the present invention was unsuccessful in using a straight pull test of the lift loops to prove minimum safety of every bag.

In a first test referred to as a tensile test, pulling all four lift loops to a 3 to 1 level of strength for 2200 pounds was tried. In other words, the lift loops were taxed to 6600 pounds in a non-destructive manner before taking them to the 5 to 1 testing machine to be tested to destruction. The 5 to 1 testing machine tests the bag by a hydraulically driven pressure plate inserted into the bag and pressure is set to 5 to 1, which is 11,000 pounds of force against the lift loops for a bag designed to hold 2200 pounds. It was originally assumed that if the bag successfully handled 6600 pounds in the first tensile strength test, then it could be counted on that the bag would always be good for at least that amount. However, on the 774 bags tested, there ended up being a failure of the lift loops at about 4700 pounds, i.e., at 4,720 pounds, in 1 of the 774 bags that was tested, which was less than the 6600 pounds that said bags previously had handled. The bag that failed below 6600 pounds had passed the tensile test method but would have likely failed in the field if it had not been passed to the 5 to 1 test method and tested to destruction.

It was opined that maybe the bag had been ready to break and it just needed testing with more 6600 pound pulls. The testing therefore started pulling the 6600 pounds for a series of 5 tries before sending it to the 5 to 1 testing machine. A bag tested in this manner broke at less than 6600 pounds. Pre-pulling to prove safety therefore was determined to not be a reliable way to effectively test the safety of every bag.

Another series of testing began with testing a small part of every bond in the peel direction instead of the shear direction, on the basis that the strength in the peel direction would be a dependable predictor of the shear strength of any bond. In this series of tests, a small platform was inserted in the open area at the top of the patch where the lift loop prevents any bonding action from occurring between the patch and the bag body, and the platform lifted up the patch with a known load at a known air pressure.

The testing demonstrated that if a bond had the right amount of strength, a pre-determined amount of square surface area at a certain amount of air pressure would only allow the flat inserted surface to rise a certain distance. If the bond broke enough to allow the flat surface to rise further than the desired amount, then the bond would likely not have enough strength to meet the current industry 5 to 1 lifting safety requirements for the bag.

This method was used to test 1017 bags. This method rejected only thirteen bags. The rest of the bags (1004) were tested to destruction. A small number of the bags tested below the 11,000 pounds required in the 5 to 1 safety tests, but none of them failed below the minimum hoped for 3 to 1 safety level. In fact, all tested above 4 to 1 and only 3% tested below the 5 to 1 level. Many of them passed at a 7 to 1 level.

Next, the thirteen bags that this test method rejected were tested to destruction. Three of the thirteen bags tested below the 3 to 1 level. Three bags tested at over the hoped for 5 to 1. The testing as described evidences that the testing of the peel strength of the bag with a lift loop assembly tester of the present invention is a valid predicator of safety for every bag and provides a reasonable expectation of safety that could not otherwise be achieved, e.g., with the first pulling test methods described above.

In one or more preferred embodiments, the lift loop test is applied to each leg of each loop after heat sealed loop assemblies are heat sealed to a bag. There are four loops, each with two legs, so this test is preferably applied 8 times to each bag, but only once to each unsealed area below a lift loop leg.

This test further preferably affects only the leading edges of the bond surrounding the inner edges of the patch at the top of the lift loop. In one or more preferred embodiments, each leg of each loop is attached to 180 square inches of bonding minus the 30 square inches under the lift loop. This method of testing only affects 4 linear edge inches of the bond. All of the tests are indicating that there is no detectable difference in the total shear strength between bags using this peel test and bags not having had the peel test performed on them. The testing results evidence that the test provides reliable predictability of the strength of the bond and eliminates any dangerously weak bonds. This testing is done without any apparent damage to the bags.

Since in preferred embodiments this test is performed at all 8 lift loop legs, preferably one or more embodiments of the test machine, also referred to herein as a lift loop assembly tester or a lift loop tester, also marks each leg (or each lift loop assembly or another desired location on a bag being tested) as it is tested so visual verification can be made at any time later by seeing 8 marks on the completed bag.

A lift assembly tester apparatus also preferably features a self-testing diagnostic that can confirm that a test area did not rise to unacceptable levels. The tester apparatus preferably has safeties (or safety mechanisms or safety features) that insure the tester is fully and properly inserted in the test area before the machine will actuate and run each test. The lift loop assembly tester also preferably collects all data on each bag to show that any bag in question has been tested. Preferably, a unique bag number or unique identifier has to be entered into the lift loop assembly tester prior to testing. The hand lift loop assembly tester can be programmed so that it will not accept the next bag until a new bag is entered and 8 tests are performed on the previous bag or the previous bag had been failed by the tester. The hand lift loop assembly tester can also be programmed so that if a test area reads as being unacceptable an error message will be sent to technology support or engineering.

In one or more preferred embodiments, testing the peel strength of a bond is a reliable predictor as to whether the shear strength of the bond is acceptable.

In one or more preferred embodiments, a bulk bag lift loop assembly safety tester comprises:
 a lifting member operable to be raised and lowered by the tester, the lifting member for testing peel strength of a heat seal bond between flexible fabrics, wherein the lifting member is insertable in an unsealed area of the flexible fabrics that has sealed areas of the flexible fabric on at least two sides of the unsealed area; and
 wherein the lifting member is operable to be raised while inserted in the unsealed area for a desired amount of time under a desired amount of pressure; and
 wherein the tester is operable to determine whether the peel strength of the bond is adequate for the hag to pass industry safety standards by measuring the amount of peel that occurs in the sealed areas on one or both of the at least two sides of the unsealed area while the lifting member is being raised.

In one or more preferred embodiments, the tester further comprises an air cylinder operable to raise and lower the lifting member during a test.

In one or more preferred embodiments, the tester further comprises a sensor operable to automatically sense when the lifting member is inserted into the unsealed area and send a signal to automatically start a test by starting to lift the lifting member.

In one or more preferred embodiments, the tester further comprises a marker assembly including a pen, wherein the marker assembly is operable to automatically lower the pen to mark one of said flexible fabrics when the tester receives a signal that the test has been successful.

In one or more preferred embodiments, the tester is configured to automatically cancel a test if the test is unsuccessful.

In one or more preferred embodiments, the test is successful if the lifting member rises to a height that is 1.5 inches or below and the designated time is 3 seconds and the desired pressure applied is 37 psi, e.g., by an air cylinder powered to 37 psi, which means that only an acceptable amount of peel, if any, has occurred during the test.

In one or more preferred embodiments, selected pressure, e.g., pressure to which an air cylinder is powered to, is 36 to 120 psi.

In one or more preferred embodiments, the test is unsuccessful if the lifting member rises to a height that is above 1.5 inches and the desired time is 3 seconds and the designated pressure is 37 psi, e.g., by an air cylinder powered to 37 psi, which means that an unacceptable amount of peel has occurred during the test.

In one or more preferred embodiments, the tester is configured for manual operation to start a test.

In one or more preferred embodiments, the tester is configured for automatic operation to start a test.

In one or more preferred embodiments, the tester is configured for manual operation to end a test and record a successful or unsuccessful test.

In one or more preferred embodiments the tester is configured for automatic operation to record a successful test or an unsuccessful test.

In one or more preferred embodiments, the tester is operable to record designated errors during testing and to send an error message to operation control.

In one or more preferred embodiments, messages can be set to be automatically sent to technical support, e.g., via email, when an error state occurs.

In one or more preferred embodiments, operational control or technical support clears an error state of the tester.

In one or more preferred embodiments, a test operator cannot clear an error state of the tester, rather it is done by operational control or technical support.

In one or more preferred embodiments, the lift loop assembly that is tested comprises a patch with a lift loop coupled thereto and wherein the patch is heat sealed to a sidewall of the bulk bag, wherein the patch is one of the flexible fabrics and the sidewall is another of the flexible fabrics with the heat seal bond between the patch and the sidewall, and wherein the unsealed area is a space between the patch and the sidewall below a leg of the lift loop.

In one or more preferred embodiments, the lift loop assembly that is tested comprises a patch with a lift loop coupled thereto and wherein the patch is heat sealed to a sidewall of the bulk bag, wherein the patch is one of the flexible fabrics and the sidewall is another of the flexible fabrics with the heat seal bond between the patch and the sidewall, and wherein the unsealed area is a space between the patch and the sidewall in a location below a leg of the lift loop.

In one or more preferred embodiments, the lift loop assembly that is tested comprises a patch with a lift loop coupled thereto and wherein the patch is heat sealed to a sidewall of the bulk bag, wherein the patch is one of the flexible fabrics and the sidewall is another of the flexible fabrics with the heat seal bond between the patch and the sidewall, and wherein the unsealed area is a space between the patch and the sidewall.

In one or more preferred embodiments, the lifting member is inserted 2 inches into the unsealed area.

In one or more preferred embodiments, the lifting member is inserted 2 to 8 inches into the unsealed area.

In one or more preferred embodiments, the lifting member is inserted 4 inches into the unsealed area.

In one or more preferred embodiments, the lifting member has a width that is adapted to apply pressure to edges of said sealed areas when inserted into the unsealed area.

In one or more preferred embodiments, the lifting member has a length that is adapted to test a desired portion of said sealed areas.

In one or more preferred embodiments, a tester of the present invention is operable to test the peel strength of a heat seal bond or joint between flexible fabrics to provide a measure of the shear strength of the heat seal bond or joint.

In one or more preferred embodiments, a tester of the present invention is operable to test the peel strength of a heat seal bond or connection or a joint between flexible fabrics of a bulk bag to provide a measure of the shear strength of the heat seal bond or joint and whether a bulk bag will pass industry safety requirements.

In one or more preferred embodiments, a method of testing the strength of a lifting assembly heat sealed to a bulk hag, comprises the following steps:
  a) testing the strength of a heat sealed bond or joint of the lifting assembly on the bulk bag by raising the lifting assembly in an unsealed area that is not heat sealed to the bulk bag; and
  b) determining whether the peel strength of a heat seal bond or joint connecting the lifting assembly to the bulk bag next to the unsealed area is adequate by measuring the amount of peel that occurs in the heat seal bond or joint while raising the unsealed area.

In one or more preferred embodiments, measuring the peel strength of the heat seal bond provides evidence as to whether the shear strength of the bond is adequate.

In one or more preferred embodiments, the unsealed area is adjacent to at least two heat sealed bonds and wherein peel strength of the at least two heat sealed bonds is tested by raising the lifting assembly in the unsealed area.

In one or more preferred embodiments, the at least two heat seal bonds are subjected to lifting pressure for a designated amount of time under a designated amount of pressure when the unsealed area is raised in step (a).

In one or more preferred embodiments, the designated amount of time is 3 seconds and the designated amount of pressure is 37 psi.

In one or more preferred embodiments, the lifting assembly passes the test if the lifting assembly rises only 1.5 inches or below during the 3 seconds under the 37 psi.

In one or more preferred embodiments, the lifting assembly does not pass the test if the lifting assembly rises over 1.5 inches during the 3 seconds under the 37 psi.

In one or more preferred embodiments, the lifting assembly is lifted by a tester having a lifting platform that is inserted into the unsealed area in step (a).

In one or more preferred embodiments, the tester automatically starts the test when the lifting platform is inserted into the unsealed area.

In one or more preferred embodiments, the tester automatically cancels a test if unsuccessful.

In one or more preferred embodiments, the test is unsuccessful if the lifting platform rises above 1.5 inches during a 3 second time interval under a pressure of 37 psi.

In one or more preferred embodiments, the tester automatically records a successful test.

In one or more preferred embodiments, the tester automatically indicates the test is a successful test by marking the lifting assembly or another desired part of a bag being tested.

In one or more preferred embodiments, the tester automatically ends a test.

In one or more preferred embodiments, the tester automatically ends a test and records a successful test or sends an error message if a test was unsuccessful.

In one or more preferred embodiments, a test is successful if the lifting platform rises only 1.5 inches or less during a 3 second time interval under 37 psi.

In one or more preferred embodiments, the test is started when a pair of air cylinders begin lifting the lifting platform under 37 psi.

In one or more preferred embodiments, a pen marks the lifting assembly when the pen is automatically lowered by a pair of air cylinders when the test is successful.

In one or more preferred embodiments, the tester is configured to enter an error state if the pressure used to lift the lifting assembly deviates +/−1 psi from the designated pressure of 37 psi.

In one or more preferred embodiments, a lift assembly tester apparatus (which can be hand-held or not) and method tests peel strength of a heat seal connection between a lift loop patch and a bulk bag body as an indicator of shear strength of the connection and whether the bag will pass industry safety lifting requirements. A lifting platform of the tester apparatus is inserted between the patch and the hag body in an unsealed area and measures the peel strength of a heat seal bond or connection at the edges or sides of the unsealed area. If the peel strength is adequate, this is a reliable indicator that the shear strength of the bond or connection is also adequate and that the bag will meet the current industry required 5 to 1 safety lifting requirements.

In one or more preferred embodiments of the present invention, preferred specifications for a lift loop assembly tester, which can be hand-held, are:
1. Size—12" L×3" W×7" H;
2. Electrical—120 VAC, 60 Hz, Single Phase;
3. Air—filtered at 37 psi;
4. Internet compliant with full data collection and storage bag traceability with data including: Serial number, Testing times and date, Operator, air pressure, test results, Error messages; and
5. Automatically marks each patch inspection that passes.

In one or more preferred embodiments, the pressure setting on a tester of the present invention is set to a desired pressure based on the particular combination of coatings that form the bond and the amount of insertion that the lifting member of the lifting platform is designed to insert into the lift loop patch area. When a heat seal bond is made between a propylene based elastomers or plastomers coating, e.g., VERSIFY™ 3000, on one piece of fabric and a standard polypropylene fabric coating on another piece of fabric and the lifting member is inserted about 2 inches into an unsealed area of a lift loop patch, 37 psi+/−1 is the preferred pressure during testing.

As discussed, testing has established that if a bond has the right amount of strength or adequate strength, e.g., was able to pass 3 to 1, or 4 to 1, or 5 to 1 lifting ratio weight based safety tests, a pre-determined amount of square surface area at a certain amount of air pressure allows the flat inserted surface of the lifting member to rise a certain distance. If the lifting member of the lifting platform was able to rise 1.5 inches or below, and these bags were later tested to destruction using hydraulic pressure, the bags consistently passed 3 to 1, or 4 to 1, or 5 to 1 lifting ratio weight based safety tests. The amount of peel that occurred in sealed areas when the lifting member was only able to rise 1.5 inches or below in the unsealed area was thus an acceptable amount of peel indicating the heat seal bonds in the sealed area adjacent the unsealed area had adequate strength. But if the lifting member was able to rise over 1.5 inches, this was an unacceptable amount of peel in the sealed areas and evidence that the bag may fail in the field. The 3 second time interval and 1.5 inch allowable rise distance parameters of a lifting platform lifting member inserted 2 inches into an unsealed area under 37 psi (+/−1) (e.g., by air cylinders pressurized to 37 psi) was selected based on testing of bags and how long a rise in the fabric of the unsealed area would typically occur before stopping and how much rise in the fabric in the unsealed area would occur under different pressures. As the types of coatings or bonding agent in the heat seal bond, the fabric, and length of the lifting member inserted change, the selected pressure and selected time interval can also change. Through testing, desired tester apparatus parameters for testing bags made with different coatings and different types of flexible fabric can be chosen based on the level of acceptable rise that is able to occur in the unsealed area that is established to be adequate when bags with a certain amount of rise in tested unsealed areas later pass desired safety testing, e.g., standard industry safety tests, which is currently a weight lifting ratio of 5 to 1, when the bags are tested to destruction.

In other preferred embodiments, a lifting platform can be inserted 4 inches into an unsealed area of a patch of a lift assembly and bulk bag body. When a heat seal bond is made between a propylene plastomer and elastomer based coating on one piece of fabric and a standard polypropylene fabric coating on another piece of fabric, and the lifting member of a lifting platform is inserted about 4 inches into an unsealed area of a lift loop patch and bulk bag body, the preferred pressure setting for this preferred embodiment is 65 psi (+/−1), e.g., of an air cylinder powered to 65 psi (+/−1). Under these parameters, if the lifting member or platform rises over 1.5 inches in the unsealed area this is evidence that the heat seal bond may not be adequate to support a weight of material contained in the bag in the field, or may not be adequate to support weights based on 3 to 1, 4 to 1 or 5 to 1 weight lifting ratio based safety tests. If the lifting member or platform rises 1.5 inches or below in the unsealed area, this is evidence that the heat seal bond in the sealed areas of the lift loop patch and bulk bag body is adequate to support desired weights in the field, including weights established for industry safety tests.

If there is a different mix of coatings, the pressure setting and the distance that the platform is inserted into the bag (and also possibly the level of acceptable rise of a lifting platform) can be different, however the close tolerance of the air pressure (e.g., +/−1 of any set pressure) is important as this relates directly to the sensitivity of the lift loop assembly tester.

Thus the pressure setting can be determined by the amount of insertion and the coating to coating adhesion in a heat seal bond, and the pressure can be different under different conditions. A desired or designated pressure can be selected based on sample testing to be as close as possible to a solid clear rejection rate and not over rejecting good product.

In one or more preferred embodiments of the present invention, a lift tester of the present invention has a lifting platform that is about 4 inches long, which increases the amount of material being tested. The over-seal on the edge of a lift loop patch (which is a mathematical constant based on the dimensions of a heat seal bar used to form a heat seal bond or joint or connection) has less influence the deeper the lifting member of a lifting platform is inserted into the unsealed patch area. The over-seal is an area around the patch where a heating element goes beyond the edge of the patch during heating sealing of the patch to a bag body, which in a preferred embodiment is about ¼ inch beyond the patch. If a patch and bulk bag body bond fails, the normal failure mode of a patch is usually at the bottom corner and starts peeling upward. By over-sealing that area around the patch, it delays the peeling affect, which in turns gives a general increase in bonding strength. The ¼ inch over-seal is a constant based on the dimensions of a heat seal bar that is 18.25 inches wide when a patch is 18 inches wide, and is ⅛th of the insertion amount on a 2 inch lifting member and only has a 1/16 inch influence on a 4 inch lifting platform insertion.

In one or more preferred embodiments of the present invention, a lift tester apparatus of the present invention has a lifting platform that is 2 to 4 inches long.

In one or more preferred embodiments of the present invention, a lift tester apparatus of the present invention has a lifting platform that is 2 to 8 inches long.

In one or more preferred embodiments of the present invention, a tester apparatus has a displacement sensor which measures the distance that the lifting platform insert or lifting member moves as opposed to a sensor that can be included in other preferred embodiments that have a dead-stop collar/sensor combination to detect 1.5 inches of movement which would then give a "failed test" input. A displacement sensor allows for stop of the movement electronically when the 1.5 inch distance is reached thus triggering a "failed test". A displacement sensor that can be used in one or more preferred embodiments of the present invention is a laser displacement sensor (IL Series) commercially available from Keyence. Other non-contact sensors can also be used that work to measure displacement such as resistive sensors, capacitive sensors, inductive sensors, ultrasonic sensors as well as other types of optical/laser sensors. There are also other linear transducers that could be attached to a lifting platform of a testing device to measure displacement as well.

In one or more preferred embodiments, movement can be stopped electronically when the preferred over 1.5 inch rise distance of a lifting member is reached thus triggering a "failed test".

In one or more preferred embodiments, movement can be stopped electronically when a 1.5 inch rise distance of a lifting member is reached thus triggering a "failed test".

In one or more preferred embodiments a bond has an adequate amount of strength if the lifting member rises 0 to less than 1.5 inches.

In one or more preferred embodiments a connection being tested by a tester apparatus of the present invention has an adequate amount of strength if the lifting member rises only an acceptable distance in an unsealed area or unconnected area and then stops rising during a selected time interval under the selected pressure. An acceptable rise distance is a distance that the lifting member is able to rise during a test in an unconnected area when there is an acceptable amount of peel in a connection next to the unsealed or unconnected area being tested. If the lifting member stops rising within the acceptable distance range the rise is an acceptable amount of rise. An acceptable amount of peel in a connection next to an unsealed or unconnected area is present when there is an acceptable amount of rise of a lifting platform in an unsealed area. An acceptable amount of rise of a lifting platform in an unsealed or unconnected area can be established by testing bags with different levels of lifting platform rise (before the lifting platform stops) to destruction. Bags having an unsealed area in which the lifting platform was able to rise (which means these bags had some peel that occurred in bonds adjacent the unsealed or unconnected areas) that later pass desired safety weight testing when tested to destruction had an acceptable amount of rise and an acceptable amount of peel. A rise level in testing parameters can be selected based on one more acceptable levels of rise that occurred in bags that later passed the safety tests when tested to destruction.

In one or more preferred embodiments a time interval for testing can be 1 to 10 seconds.

In one or more preferred embodiments, pressure applied to bonds in sealed areas of a flexible fabrics, e.g., via air cylinders, can be 20 to 80 psi.

In one or more preferred embodiments, the present invention tests peel of a heat seal bond or a connection between two different materials to determine whether the strength of a bond is adequate as a quality control measure.

In one or more preferred embodiments, the present invention tests peel of a heat seal bond or a connection between two different materials to determine whether the peel and shear strength of a bond is adequate as a quality control measure.

In one or more preferred embodiments, the present invention tests peel of a heat seal bond or a connection between two different materials to determine whether the peel strength of a bond is adequate as a quality control measure.

In one or more preferred embodiments, the present invention tests peel of a heat seal bond or a connection between two different flexible fabrics to determine whether the strength of a bond is adequate as a quality control measure.

In one or more preferred embodiments, the present invention tests peel of a heat seal bond or a connection between two different flexible fabrics to determine whether the peel and shear strength of a bond is adequate as a quality control measure.

In one or more preferred embodiments, the present invention tests peel of a heat seal bond or a connection between two different flexible fabrics to determine whether the peel strength of a bond is adequate as a quality control measure.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 1-3 illustrate an assembly process for a lift loop assembly for a preferred embodiment of a hulk hag of the type that can be tested with a preferred embodiment of a lift loop assembly tester of the present invention;

FIG. 5 is an exploded view of a preferred embodiment of a bulk bag that can be tested with a preferred embodiment of a lift loop assembly tester of the present invention;

FIG. 6 is a close up view of a lift loop assembly as shown in FIG. 5;

FIG. 39 is a perspective view of a preferred embodiment of a cable holder in a preferred embodiment of a lift loop assembly tester of the present invention;

FIG. 40 is a top view of a preferred embodiment of a cable holder in a preferred embodiment of a lift loop assembly tester of the present invention;

FIG. 41 is a front view of a preferred embodiment of a cable holder in a preferred embodiment of a lift loop assembly tester of the present invention;

FIG. 42 is a right side view of a preferred embodiment of a cable holder in a preferred embodiment of a lift loop assembly tester of the present invention;

FIG. 69 illustrates a preferred embodiment of a main tester display screen on a control panel in a preferred embodiment of the present invention;

DETAILED DESCRIPTION OF THE INVENTION

Figure 4:
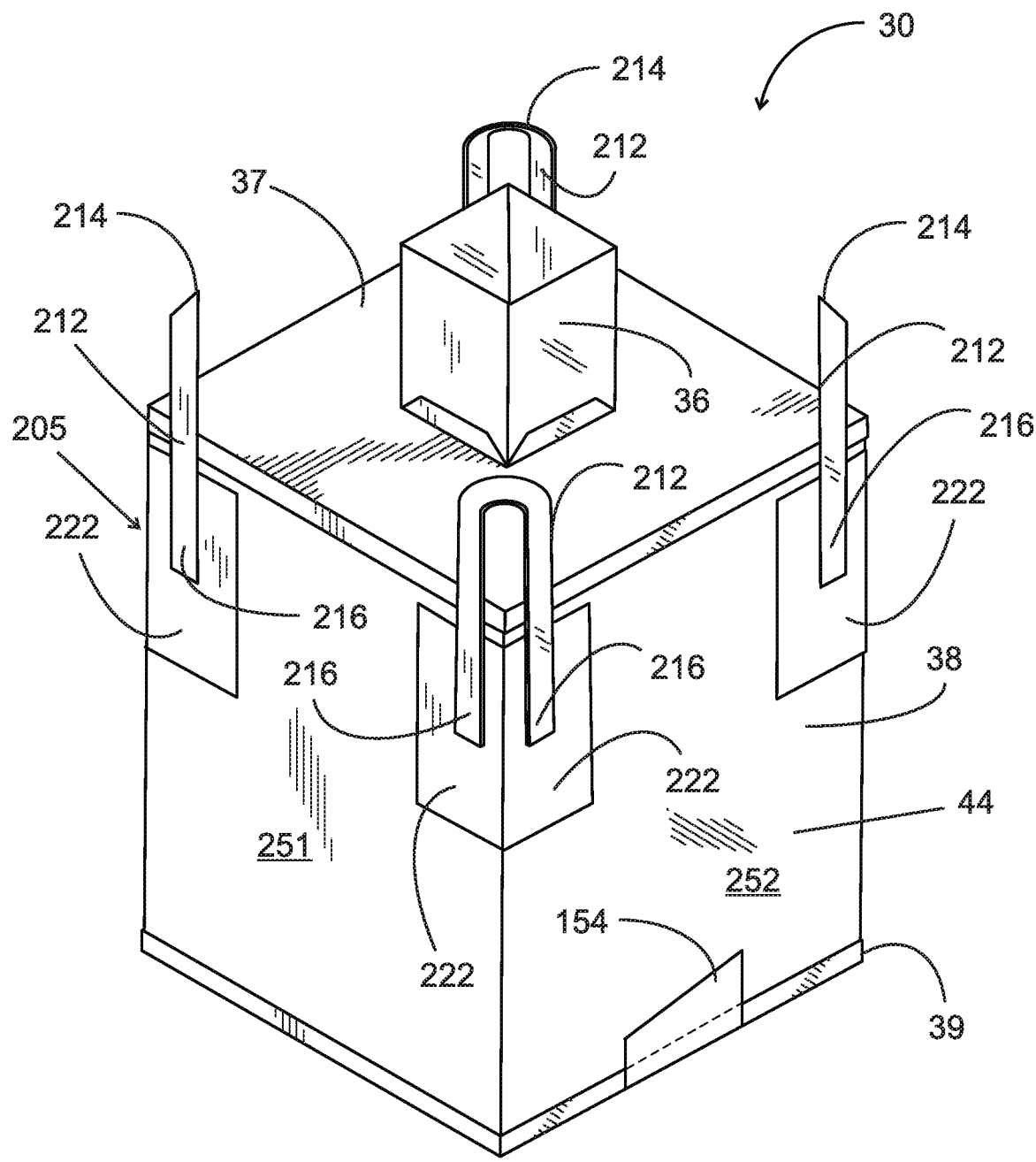
FIG. 4 is a perspective view of a preferred embodiment of a bulk bag including a lift loop assembly that can be tested with a preferred embodiment of a lift loop assembly tester of the present invention.

FIGS. 1-11 and 62-63 illustrate a lift loop assembly and bulk bags of the type that one or more preferred embodiments of a lift loop assembly tester 20 or 280 of the present invention can test for quality control purposes to help make sure a lift loop assembly on a bulk bag has desired lifting strength and that a bulk bag is safe to put on the market. FIGS. 1 through 8 illustrate features of a lifting assembly 205. A lifting assembly 205 can be utilized with various types and designs of bulk bags, including with bulk bags that have one or more stitched seams or joints, and with bulk bags that do not include stitched seams or joints, e.g., bags that include all heat fused or heat sealed joints. A lifting assembly 205 preferably includes a lift loop or lift member assembly 210 and a bag connection assembly 220, which are illustrated in the figures in accordance with principles disclosed herein. Lift loop assembly 210 preferably includes a lift loop or strap 212 with an upper or lift end 214 and with lower or connection ends 216. At times herein a lower or connection end 216 is also referred to as an end or a lift loop leg 216. A lift loop 212 has a bottom surface 225 and a top surface 226 (see FIGS. 1-3, 5-6). A lift loop 212 can be formed from approximately 3-12 ounces per square yard of polypropylene fabric, which is an approximate operating range for generally existing type bags or from the same fabric used to form bag 30, e.g., woven polypropylene fabric or woven polyethylene fabric. Lesser or more ounces per square yard can be used for bags with different strength requirements.

A bag connection assembly 220 preferably includes a patch or intermediate member 222 and a connection area 224 wherein lift assembly 205 is coupled to patch or intermediate member 222. Preferably patch or intermediate member 222 is configured to be directly coupled to the fabric of bag 30, e.g., on an intermediate panel or side wall 38, and/or at one or more other walls of bag 30, via a heat seal connection. An intermediate member 222 can be coupled to a bulk bag 30, for example, wherein it extends from one side wall (e.g., at side walls 251, 252, 253, 254 of intermediate panel 38) across a corner, e.g., corner location 261, 262, 263, 264, respectively, to an adjacent sidewall (see FIGS. 5-6). Patch or intermediate member 222 has a bottom surface 240 and a top surface 241 (see FIGS. 5-6).

Preferably a lift loop assembly 210, is directly coupled to top surface 241 of an intermediate member or patch 222 and is not directly coupled to the bag 30 fabric (e.g., is not directly coupled to a bag wall or otherwise to an outer or exterior surface 44 of a bag 30). Bottom surface 240 of patch or intermediate member 222 can be directly coupled to a bag 30, with a joint or coupling formed between a coating on the bottom surface 240 of patch 222 and a coating on an exterior surface 44 of the bag fabric, as will be described further below. Patch 222 can be made from a single layer of approximately 3-12 ounces per square yard of polypropylene fabric. This is an approximate operating range for generally existing type bags. Lesser or more ounces per square yard can be used for bags with different strength requirements. Material of a patch 222 can be the same or similar to the fabric used to form a bag 30, e.g., polypropylene fabric or polyethylene fabric.

A lift or lifting assembly 205 is an improvement over prior art lift loops that are directly coupled to the bag fabric, e.g., via stitching or sewing. In preferred embodiments of a lift or lifting assembly 205, where patch or intermediate member 222 is directed coupled to bag fabric instead of lift loop 212 being coupled to bag fabric, e.g., at a side wall or intermediate wall 38, if the lift loop 212 on patch 222 fails, e.g., tears away from a patch 222, or otherwise becomes uncoupled from patch 222, the bag fabric itself will be undamaged since the lift loop or member 212 is not directly coupled to the hag fabric. Additionally, preferably patch or intermediate member 222 is not stitched to a bag 30 but coupled to a bag 30 via a heat sealing process or with suitable adhesives. Thus, if a patch 222 tears away from a bag 30, or otherwise becomes uncoupled from a bag 30, then the bag fabric will not be torn or ripped. A containment area of a bag 30, therefore, is left unaffected and/or undamaged if a lift assembly 205 with a stitched lift loop assembly 210 and heat fused bag connection assembly 220 fails, without material contents of the bag being exposed to air or moisture or otherwise being contaminated, and without leaking from a bag 30. As referred to herein, a containment area of bag 30 is the portion of the bag that houses bulk material including portions of the bag body portion 38, top 37 and bottom 39. A body portion opening 43 is also shown in FIG. 5.

In FIGS. 1-3, a process of forming a lifting assembly 205 is depicted. The process of forming a lifting assembly 205 with a lift loop assembly 210 and connection assembly 220 preferably begins with providing a patch or intermediate member 222, which may be a patch of fabric made from the same material as an intermediate or side wall or body portion 38 of the bulk bag 30 (e.g., polypropylene or polyethylene woven fabric or other desired flexible plastic fabric). A patch 222 preferably can be made from polypropylene fabric when being used with a polypropylene fabric bag. Alternatively, a patch 222 can be made from polyethylene fabric when used with a polypropylene or polyethylene bulk bag, for example. A lift loop or member 212 is also provided, which preferably can be made from polypropylene fabric when being used with a polypropylene fabric bag. Alternatively, a lift loop or member 212 can be made from polyethylene fabric when used with a polypropylene or polyethylene bulk bag for example.

A lift loop 212 is positioned on patch 222 in a desired location and then ends or legs 216 are connected or attached to a patch 222 at connection area 224. Ends or legs 216 of a lift loop can be attached to patch 222 via heat sealing or an adhesive, or in the most preferred embodiments, ends or legs 216 of a lift loop 212 are sewn or stitched to a patch 222 at connection area 224 (see FIGS. 1-3). Patch 222 can then be connected, attached or coupled to the bag 30, e.g., at intermediate/body portion 38, preferably via heat sealing.

FIGS. 2 and 3 depict stitching 223 along a perimeter of legs or ends 216 at connection area 224. A heat fused connection or adhesive if used instead of stitching preferably extends across the width and length of loop legs or ends 216 in the connection area 224, wherein the loop is coupled to patch 222 so that there are no graspable edges along the sides and the bottom of the lift loop end 216 in the connection area 224. To later release a lift loop 212 with a heat fused connection or adhesive at a desired time, it can be pulled away from the patch 222 in a peel position.

As discussed, in the most preferred embodiments, a patch 222 is heat sealed or heat fused to a bag 30 without sewing or stitching. Preferably a patch 222 includes a heat sealing coating 191 or a standard laminate coating 19 on bottom surface 240 of patch 222 (see FIG. 6). Preferably, ends or legs 216 of lift members 212 are positioned in a desired location on top surface 241 of patch 222 and then sewn or stitched thereto in connection area 224 (see FIGS. 2-3).

If a patch 222 will be coupled to a body portion 38 that includes a standard polypropylene or standard polyethylene fabric coating 19 on an exterior surface 44 of body portion 38, then preferably patch 222 has a heat sealing coating 191 on bottom surface 240 of patch 222. Patch 222 could also have either a heat sealing coating 191 or a standard polypropylene coating 19 on a bottom surface 240 of the patch 222 if a bag body portion 38, or other portion of a bag 30 to which the patch will be coupled, has a heat sealing coating 191 on an exterior surface 44.

Preferably a bag body or intermediate portion 38 will include a standard coating 19, and patch 222 will include a heat sealing coating 191. In this manner, less heat sealing coating 191, which is more expensive than standard coatings 19, is utilized during the overall process of making a bag with a lift assembly 205, resulting in lower cost.

Figure 56:
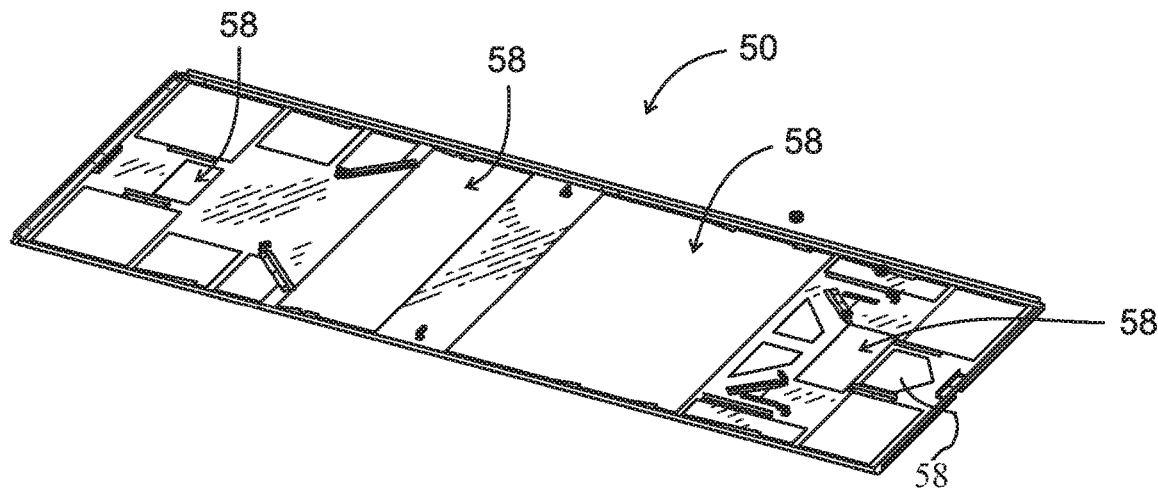
FIG. 56 illustrates a perspective view of a preferred embodiment of a carrier plate that can be used for assembly of a bulk bag that includes a lift loop assembly that can be tested with a preferred embodiment of a lift loop assembly tester of the present invention.
Figure 57:
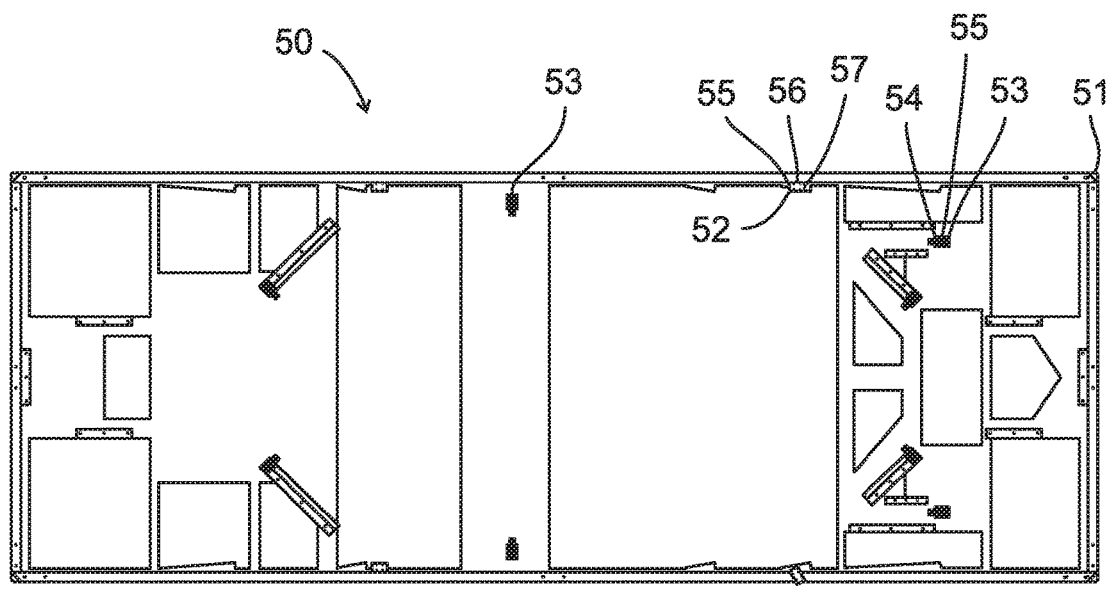
FIG. 57 illustrates a top view of a preferred embodiment of a carrier plate that can be used for assembly of a bulk bag that includes a lift loop assembly that can be tested with a preferred embodiment of a lift loop assembly tester of the present invention.

To attach a patch 222 to a body or intermediate portion 38, a bottom surface 240 of patch 222 having a standard 19 or heat sealing 191 coating is preferably positioned over an exterior surface 44 of bag body portion 38 having either a standard 19 or heat sealing coating 191, respectively, in a desired position and heat and pressure are applied. Fill spout 36, top 37, body 38, bottom 39, discharge portion 40 and a lift assembly 205 can be assembled via overlapping respective portions on a carrier plate 50 as shown in FIGS. 56-57.

Figure 58:
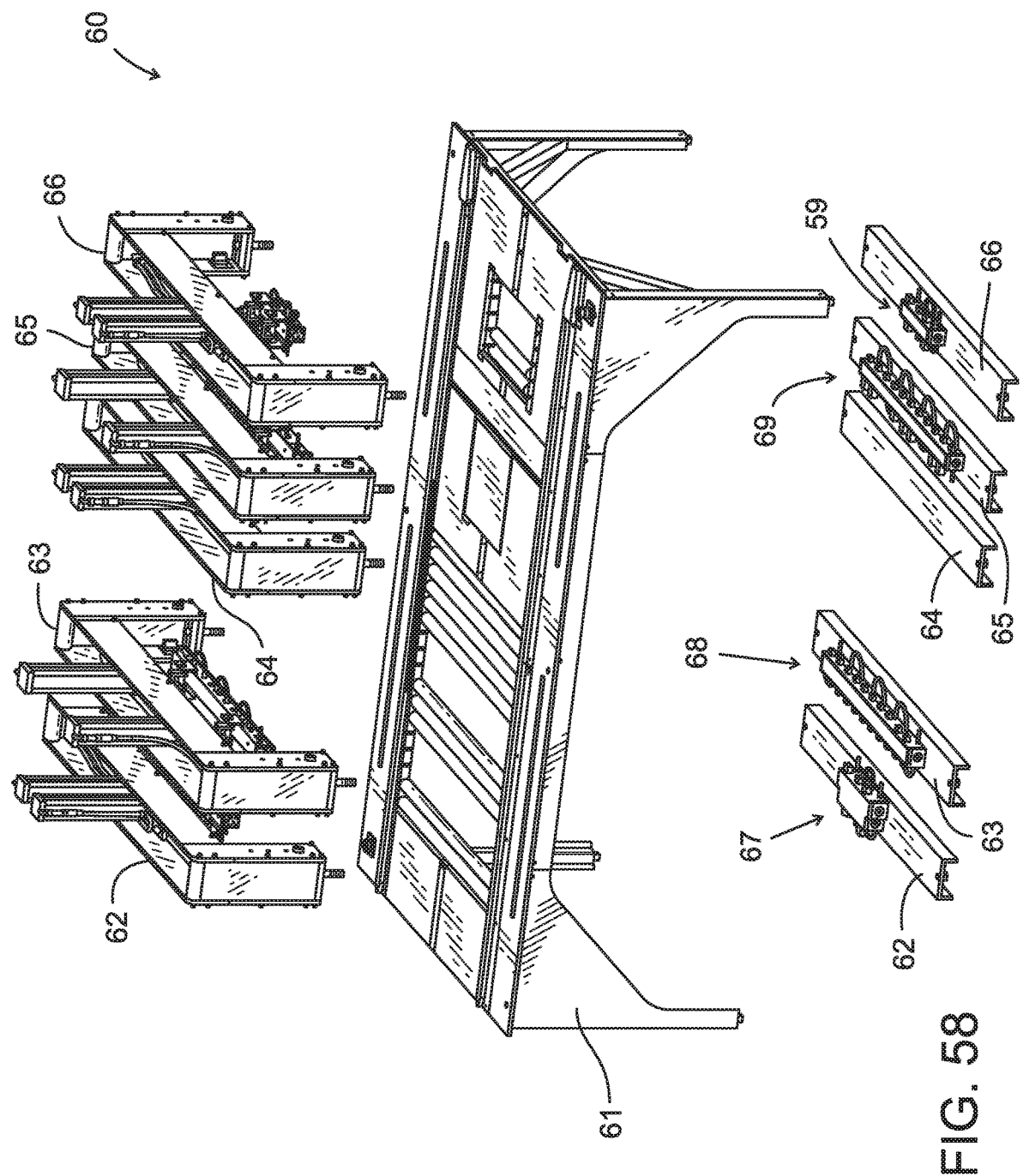
FIG. 58 is an exploded view of a preferred embodiment of a bulk bag main body heat sealing machine that can heat seal a discharge assembly to a bottom portion, a bottom to a body portion, a label/tag to a body portion, a body portion to a top portion, and a top portion to a fill spout portion.
Figure 59:
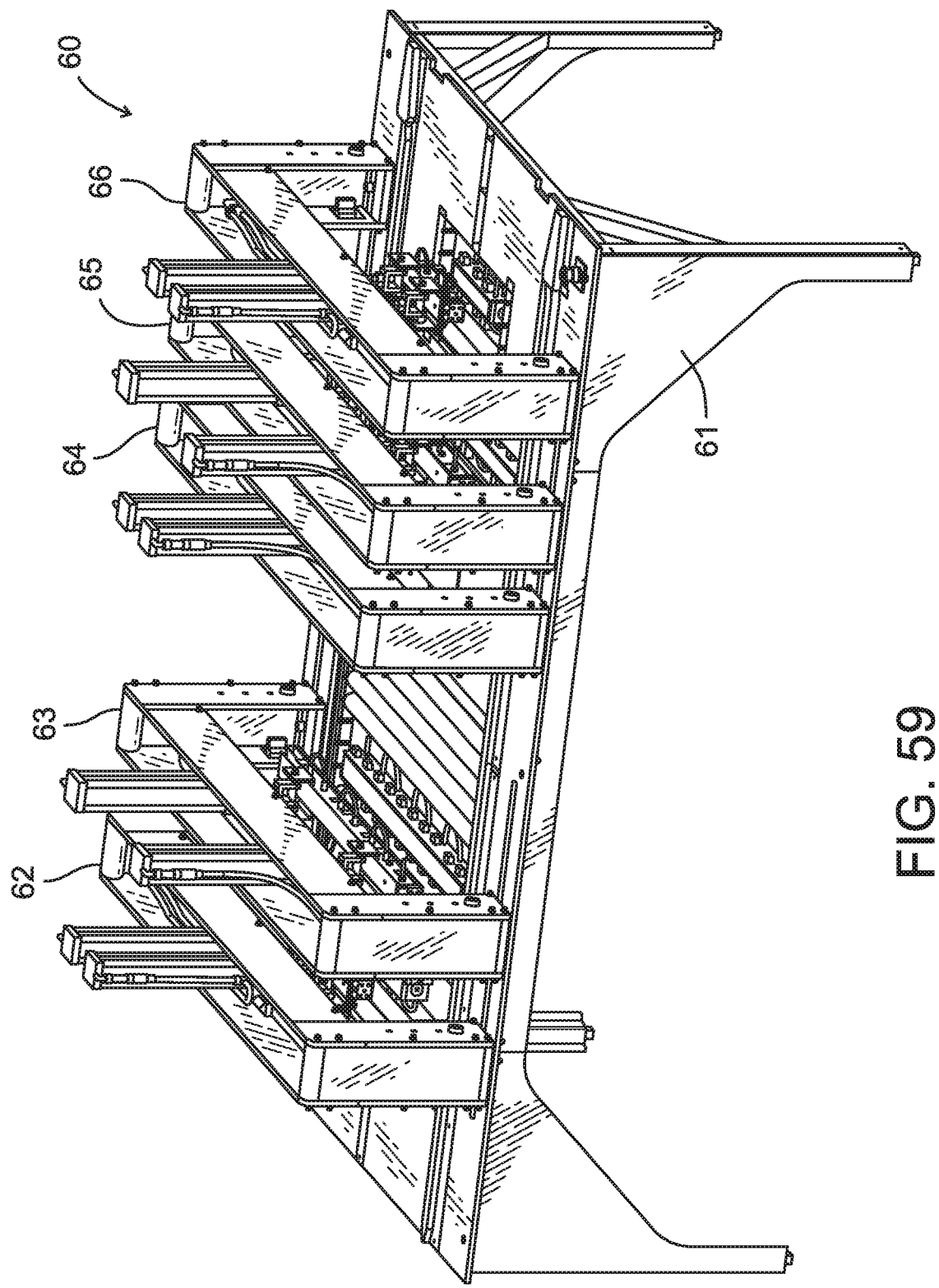
FIG. 59 is a perspective view of a preferred embodiment of a bulk bag main body heat sealing machine that can heat seal a discharge assembly to a bottom portion, a bottom to a body portion, a label/tag to a body portion, a body portion to a top portion, and a top portion to a fill spout portion.
Figure 60:
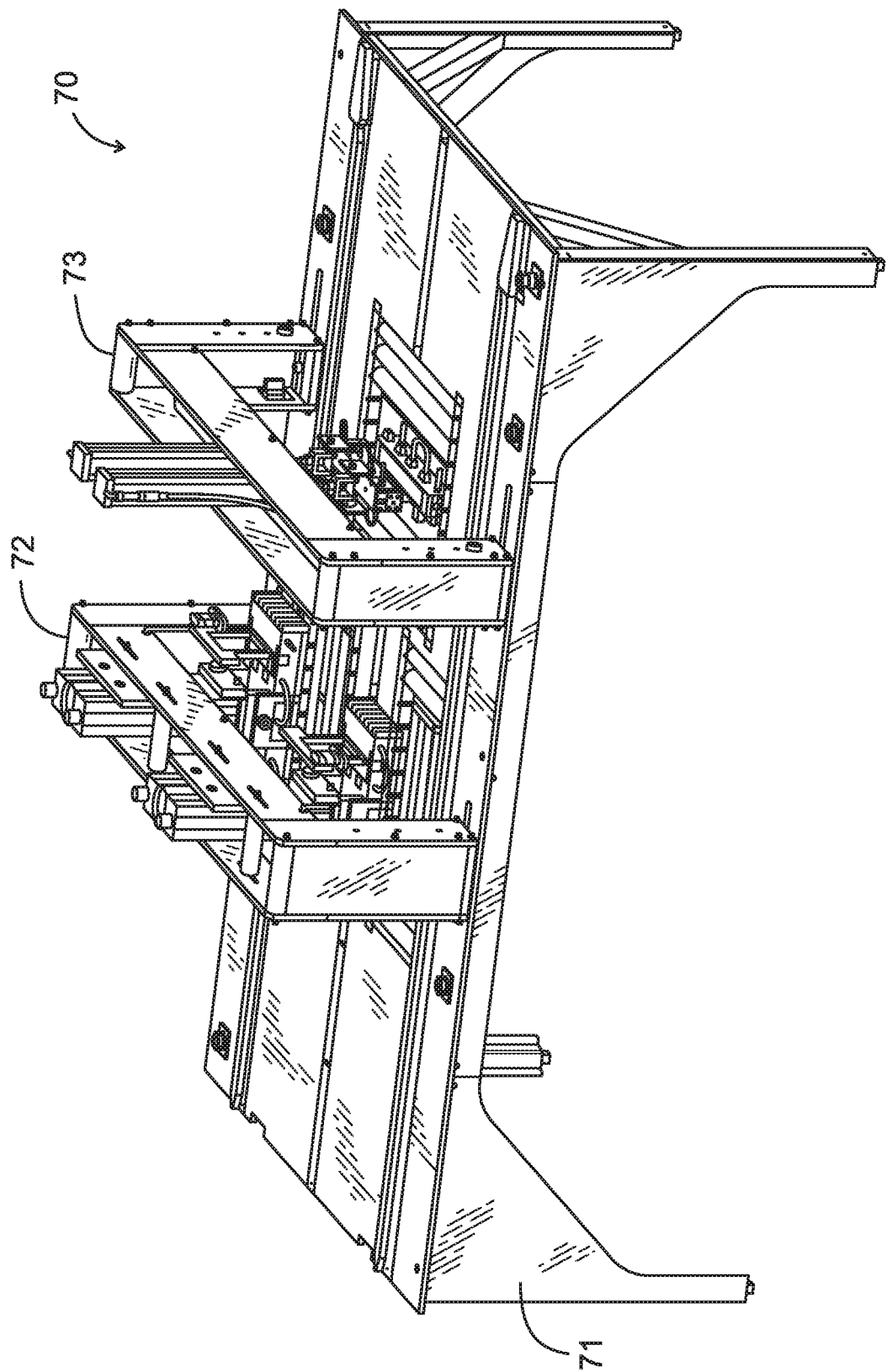
FIG. 60 is a perspective view of a preferred embodiment of a lift loop assembly and bottom cover/diaper heat sealing machine that can heat seal lift loop assemblies to a hulk hag and a bottom cover/diaper to a bulk bag.
Figure 61:
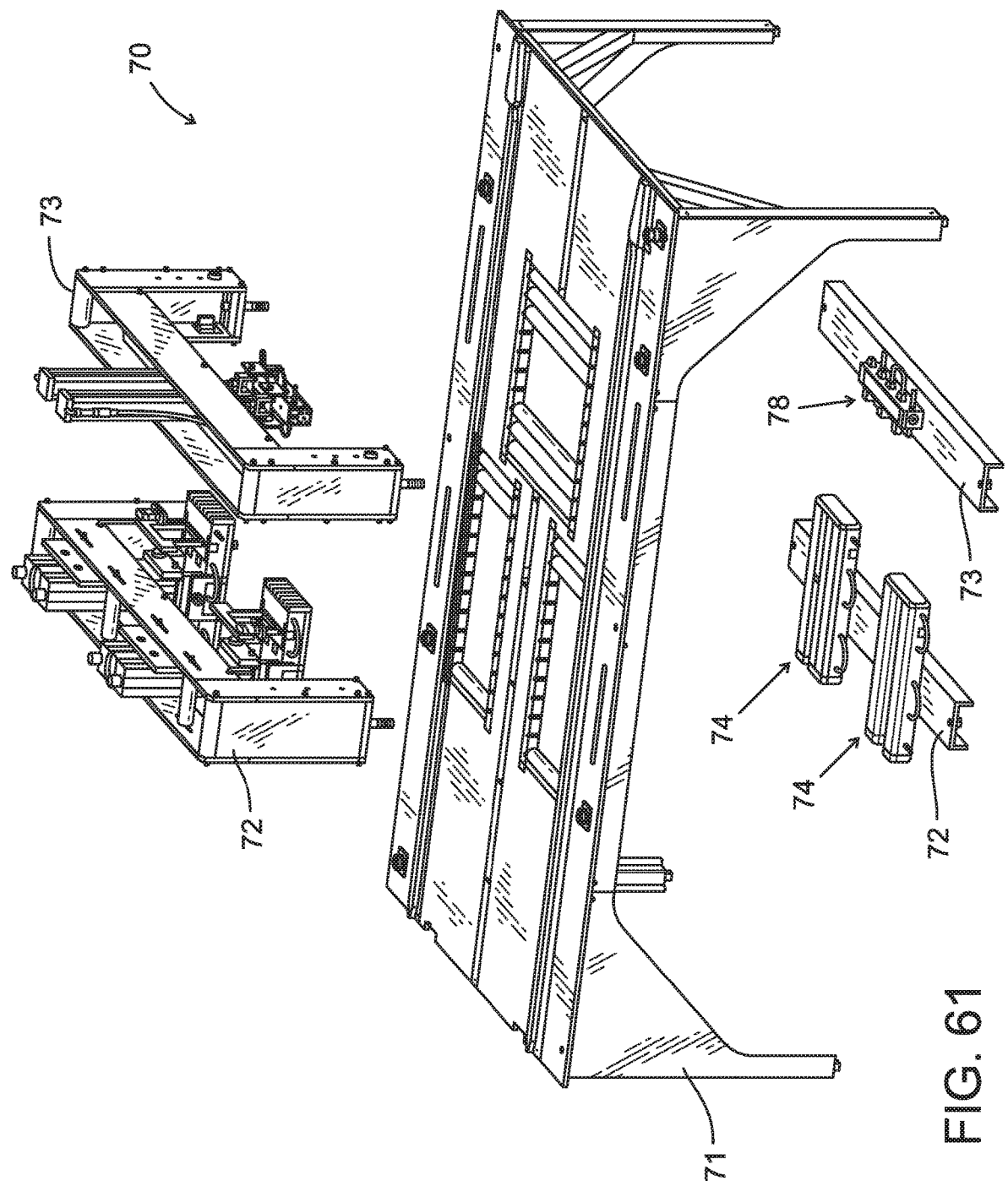
FIG. 61 is an exploded view of a preferred embodiment of a lift loop assembly and bottom cover/diaper heat sealing machine that can heat seal lift loop assemblies to a bulk bag and a bottom cover/diaper to a hulk bag.
Figure 62:
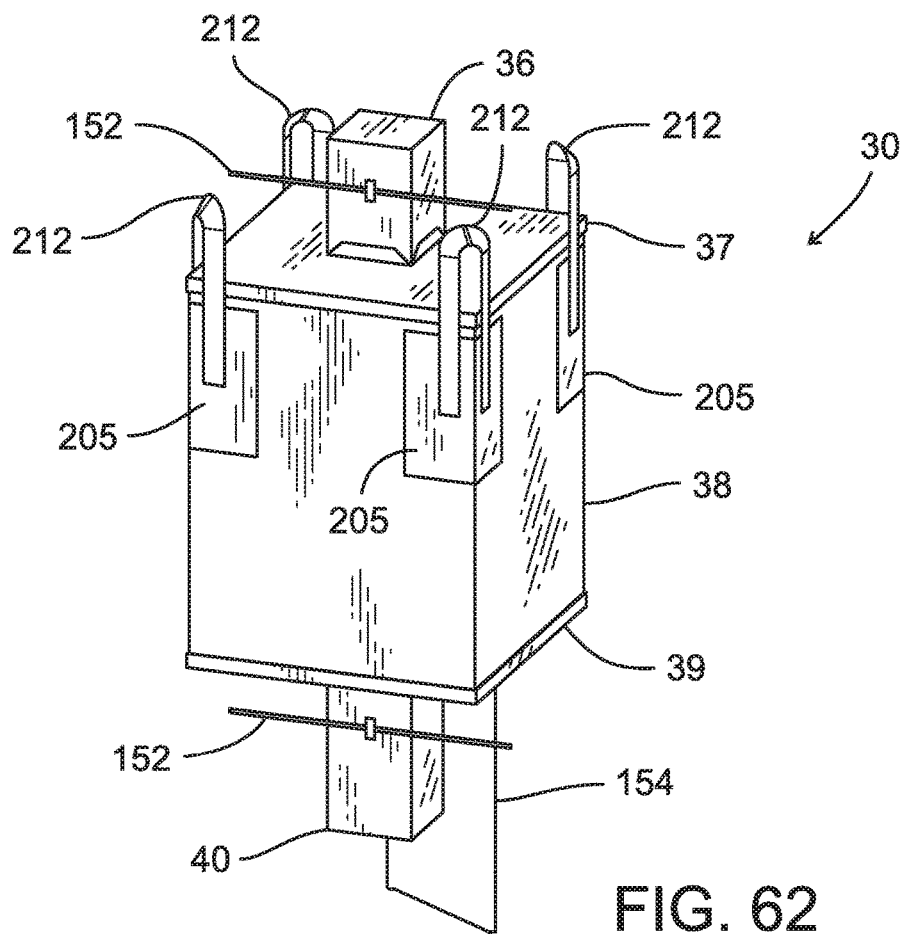
FIG. 62 is a perspective view of a bulk bag including a lift loop assembly of the type that can be manufactured with the machinery of FIGS. 58-61 and which can be tested with a preferred embodiment of a lift loop assembly tester of the present invention.
Figure 63:
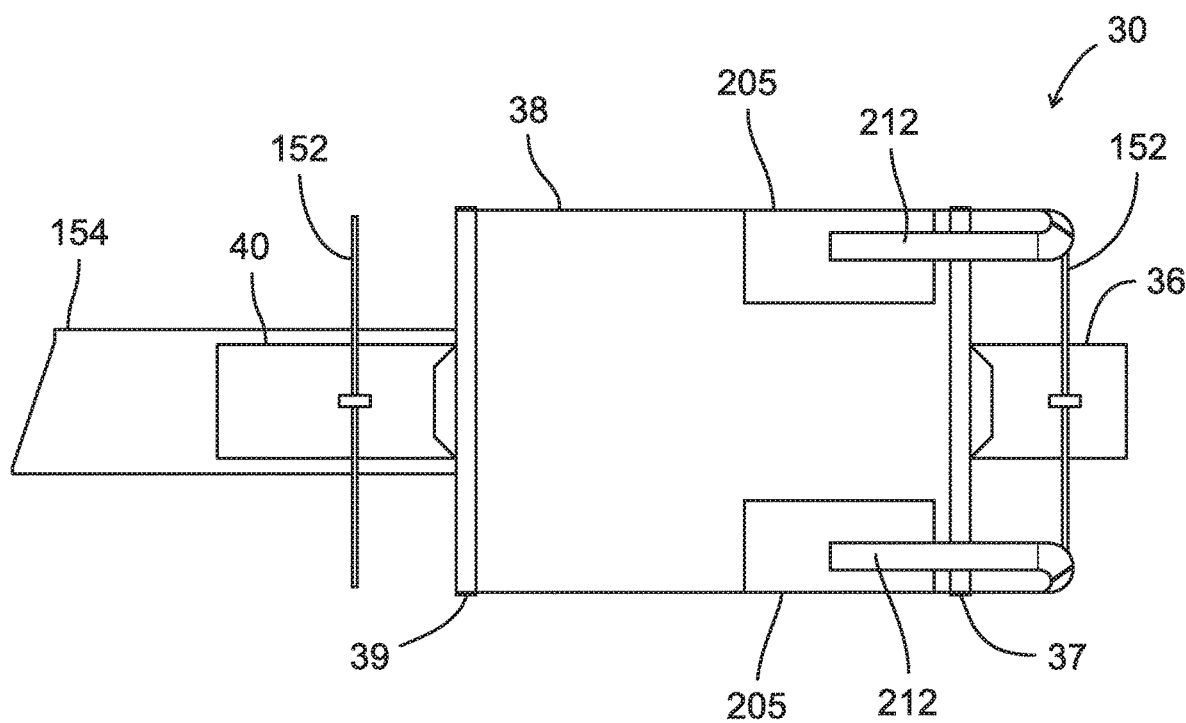
FIG. 63 is a top view of a hulk hag in gusseted configuration including a lift loop assembly of the type that can be manufactured with the machinery of FIGS. 59-61 and which can be tested with a preferred embodiment of a lift loop assembly tester of the present invention.

A carrier plate 50 can include a side and end rail assembly 51, an edge guide 52, a clamp 53, fasteners 54, 55, 56, which can be screws or bolts, and fastener 57, which can be a washer. A carrier plate 50 with the assembled and overlapped bag parts can be transferred to table 61 of main body heat sealing machine 60 to form bag joints for the discharge tube/bottom 40; bottom/body 39; label/tag (not shown); body/top 37 and top/fill spout 36 with respective heat seal bar assemblies 62-66 with respective heat seal bars 67, 68, 69, and 59 as shown in FIGS. 58-59. Carrier plate 50 can then be transferred to table 71 of lift loop assembly and bottom cover/diaper heat seal machine 70, where heat seal joints of lift assemblies 205 to the bag body 38 and heat seal joints of bottom cover 154 and body 38 can be formed with respective heat seal bar assemblies 72, 73 and respective heat seal bars 74, 78 as shown in FIGS. 60-61. A seal bar can heat seal bulk bag fill spout 36 and top 37 portions together, top 37 and body 38 portions together, and bottom 39 and discharge 40 portions together over openings 58 (see FIG. 56). A lift assembly 205 can also be heat sealed to a bag body 38 while on a carrier plate 50. For more information on heating sealing or fusing or adhering polypropylene or polyethylene fabric pieces together, e.g., to form a bulk bag as shown in FIGS. 56-61, reference is made to patent application publications WO 2014/197728, US 2014/0363106, WO 2014/197727, US 2014/0360669, and U.S. Pat. No. 10,618,225, incorporated herein by reference, for further detail.

A main body heat sealing machine 60 is preferably at least semi-automatic. Preferred specifications for a semi-automatic standard main body heat sealing machine 60 are:

1) Size—112" L×68" W×35" H;
2) Electrical—240 VAC, 60 Hz, Three Phase;
3) Air—filtered at 30 psi;
4) Internet compliant with full data collection and storage bag traceability with data including: Serial number, Manufacturing times and date, Operator, Seal/cool down temperatures, Seal bake times, machine cycle times, Air pressure, Error messages;
5) 30" to 55" body tube length—56" to 75" requires center folding;
6) 37" body tube width;
7) 14" diameter×15" fill spout;
8) 14" diameter×22" discharge spout; and
9) Five carrier plates—Standard Body Sealing Machine and Standard Loop Sealing Machine: 50" body length× 37" body width; 14" diameter×15" fill spout; 14" diameter×22" discharge spout.

Options can include:
1) 41" body width;
2) 16" and 18" diameter spouts—fill spouts and discharge spouts (note in general, new carrier plates are required for any bag dimensional change from standard); and
3) Input voltage—can customize requirement.

Preferably a lift loop assembly and bottom cover/diaper heat seal machine 70 is at least semi-automatic. Preferred specifications for a standard semi-automatic lift loop assembly and bottom cover/diaper heat seal machine 70 are:
1) Size—112" L×68" W×35" H;
2) Electrical—240 VAC, 60 Hz, Three Phase;
3) Air—filtered at 30 psi;
4) Internet compliant with full data collection and storage bag traceability with data including: Serial number, Manufacturing times and date, Operator, Seal/cool down temperatures, Seal bake times, machine cycle times, Air pressure, Error messages;
5) 30" to 55" body tube length—56" to 75" requires center folding;
6) 37" body tube width;
7) 14" diaper width;
8) 10" standard loop height above top of bag down to 5" loop height for oversize top;
9) Five carrier plates—same carrier plates for both Body Sealing Machine and Loop Sealing Machine;
10) Vision system—verification distance check of loop patch from edge of bag prior to start initiation; and
11) Tilt system—verification thickness check of loop patch area prior to start initiation.

Options can include:
1) 41" body width;
2) 16" and 18" diameter spouts—fill spouts and discharge spouts
(Note: new carrier plates generally are required for any bag dimensional change from standard); and
3) Input voltage—can customize requirement In some embodiments, by sewing a lift loop 212 to a patch 222 of fabric not initially associated with a product containment area fabric, e.g. at intermediate portion 38, sewing is not applied to the product containment area fabric, e.g., at intermediate portion 38. Instead, the patch 222 is an intermediate layer of fabric that is attached to the product containment fabric using either a heat seal method, or by using an adhesive. In other words, sewing or stitch holes from attaching lift loops in a product containment area can be eliminated.

When a patch 222 is coupled to bag 30 fabric via heat fusion, a joint is formed between the standard coating 19 and heat sealing coating 191 of the patch 222 or bag 30 fabric respectively, or between heat sealing coating 191 and heat sealing coating 191 of the patch 222 or bag 30 fabric, respectively. If a heat sealed joint fails (e.g., breaks away or otherwise becomes uncoupled from the bag 30 fabric), the heat seal and adhesive do not cause the bag 30 fabric (e.g., intermediate portion 38 of the bulk bag 30) to fail. If a heat sealed joint fails so that a heat fused joint degrades or breaks away, e.g., by improper lifting of the lift loops 212, intermediate layer or patch 222 can be released from bag 30 body 38 fabric without damaging the bag 30 fabric or a containment area of the bag 30. Should a sewn lift loop 212 connection end or leg 216 at connection area 224 fail, the lift loop 212 that is sewn to a patch 222 may tear only patch 222 and not bag 30 fabric, and the contained product remains secure in bag 30 without damage to the product or the environment. Likewise, in embodiments with a heat sealed connection of lift loop 212 end or leg 216 in connection area 224 of patch 222, if the heat seal bond or connection of the joint should fail, the containment area of the bag 30 and bag 30 fabric is left unaffected.

In exemplary embodiments, preferred embodiments of a heat seal method described herein and in the noted patent applications incorporated herein by reference, produces a heat seal or fused joint tensile strength of at least about 100 pounds per square inch. Generally, the tensile test is in pounds per square inch, which translates to about 400 pounds per a 2 inch overlap with a 2 inch wide strip of a heat seal or fused joint. Since bulk bags are expected to provide a lifting safety ratio of 5 to 1, then, for example, a bulk bag carrying a 2,200 pound load would need to generate about 11,000 pounds of lift. Therefore, if used with a said bag 30, each lifting assembly 205 must have around 2,750 pounds of lift to meet this standard. Based on current test results, at 100 pounds per square inch, a minimum of about 27.5 square inches of patch 222 material needs to be heat fused or adhered wherein the resulting heat sealed joint is at full strength. A heat fused joint is considered herein to be at full strength if the joint retains at least about 90% of the fabric strength. A fabric patch 222 can be coupled to a bag wherein a heat fused joint formed between bag 30 fabric and patch 222 extends along an entire bottom surface 240 of patch 222, except preferably not in an area under lift loop 212 legs 216 as described further herein, which can create a full strength joint or a joint that retains at least 90% of the fabric strength. Preferably a patch 222 is coupled to the bag 30 fabric so that there are no graspable edges of the patch 222, e.g., no edges that can be gripped or grasped, or unintentionally or accidentally pulled or snagged during handling of a bag 30, except in a small area directly under the lift loop.

Testing has shown that as such a bag is lifted with material contents weighing about 2,200 lbs, forces against the lift loop attachment or joint are not always evenly applied, and the attachment seals or joints can be affected unevenly from edges of the seal or joint. Thus, in certain embodiments, a patch 222 that is about 18 inches wide by 18 inches long on a 37×37×50 inch bag is preferably used. Such a patch size provides the full lifting safety needed to qualify a bulk bag 30 for 5 to 1 lifting safety requirements for 2,200 lbs. A patch 222 can also be about 18 by 18.5 inches, or 18.5×18.5 inches wide.

In current preferred heat sealing machinery used to form a heat seal connection between a patch and a bag body, heat seal bars that are about ¼ inch larger than a patch to be sealed, e.g., has dimensions ¼ inches larger than an 18×18 inch patch, are used.

The patch size selected can change to any desired size that through testing (e.g., testing in weight based lifting ratio tests that test a bag to destruction, e.g., 5 to 1 weight based safety lifting tests commonly used in the industry) would prove the patch big enough to provide the proper amount of strength for the weight the bag is designed to carry. Heat seal bar dimensions can be selected based on patch dimensions, wherein heat seal bars preferably are a little larger than a patch to ensure sealing of edges of the patch.

In some embodiments, by changing the size of the patch 222, greater or lesser weights can be carried by a bulk bag 30. In various embodiments, the size of a patch 222 is selected based on the bag 30 to which it will be coupled and the weight for which the bag 30 is designed to carry.

While many different configurations are available to create a strong lift loop assembly 210, in certain preferred embodiments, a lift loop 212 is applied in an arch configuration. In some preferred embodiments, the arch loop spreads the lift loop legs or ends 216 apart at the point of sewing or otherwise coupling the lift loop ends 216 to the patch 222. Further, the legs or ends 216 are preferably separated far enough, e.g., at least about 4 inches apart, or about 4 to 8 inches apart, to provide a distance in between the legs or ends 216 that includes an area of patch 222 that will be, or is, coupled to bag 30, to decrease the number of stress points affecting the attachment points. In some embodiments, a patch 222 can most preferably have a total surface area of about 324 square inches, or preferably can also have a total square surface area of 100 to 800 square inches. However, the connection area 224 involving the attachment of the lift loop 212 most preferably covers only about 240 square inches, or connection area 224 can also cover about 74 to 592 square inches. As discussed above, a connection area 224 is preferably not heat sealed or otherwise coupled to the bag body portion 38, but is the area in which a lift loop end or leg 216 is separately attached to a patch 222.

In some embodiments, a lift loop or member 212 is twisted or folded prior to sewing it to a patch 222, e.g., at twist or fold area 228 as shown in FIGS. 1-3. A lift loop 212 can have a top surface 226 and a bottom surface 225. After twisting a lift loop or member 212, the bottom surface 225 of a first leg or end 216 is coupled to a patch 222 at area 224, and a top surface 226 of second leg or end 216 is coupled to a patch 222 at connection area 224. This half twist makes the distance along the loop 212 equal when the loop legs 216 are about 90 degrees to each other. The twist can be advantageous because it makes the distance along a loop formed with lift member 212 equal when the loop legs or ends 216 are positioned about 90 degrees respective to each other. This embodiment can provide additional strength to a lift loop assembly 210.

As discussed above, when attaching a lift loop assembly 210 via heat sealing to a patch 222, this means the heat seals can have weak resistance to peeling forces. If a lift loop 212 is pulled, for example, at about a 90 degree angle away from the bag 30, it is put into a peel position and is likely to fail, e.g., the bond joining a lift loop 212 to a patch 222 or bag 30 (if a patch 222 is not included) will break or tear or peel away. When a lift loop 212 is sewn to a patch 222, stitching can also tear or break away if the lift loop is improperly handled, e.g., pulled at about a 90 degree angle away from the bag. To address this, in some embodiments, the sewing of the lift loop 212 ends 216 to the patch 222 includes beginning a top-down sewing process starting at about two inches below the top 267 of a patch 222, as seen in FIGS. 2-3. In other words, the top of connection area 224 begins at around two inches below the top 267 of patch 222. In some embodiments, such a sewing arrangement allows heat sealing and part of a heat fused joint between the patch 222 and bag 30 fabric above the sewn attachment area 224. By heat sealing the patch 222 to the side wall or intermediate portion 38 of the bag 30 above connection area 224, the joint of the lift loop 212 is taken out of a peel position. By avoiding the peel position for the loop 212, improper handling conditions such as not maintaining the loops 212 in a vertical position relative to the bag 30 can be avoided.

In other embodiments, a connection area 224 can start at or near a top edge 267 of patch 222, or at or about 1 inches downward from a top edge 267 of patch 222. In other embodiments a connection area 224 can start about 1 to 3 inches below or downward from a top edge 267.

Preferably ends 216 of lift loops or members 212 are spaced a distance away from side and bottom edges of a patch 222 as shown, for example, in FIGS. 1-3, e.g., spaced about 2 to 4 inches away from a side edge, and about 3 to 7 inches away from a bottom edge of intermediate member or patch 222.

As discussed, preferably a lift loop assembly 210 is attached to a patch 222 rather than being attached directly to the bag fabric, e.g. at an intermediate or body portion 38 or other wall of a bag. More preferably, a patch 222 with a lift loop 212 securely sewn to it is attached to the side walls or body portion 38 of a hag 30 via a heat seal connection or bond or via an adhesive. Most preferably, a patch 222 and lift loop 212 combination preferably includes a heat seal portion connecting the patch 222 to the bag 30 that is at least about 1 inch above the sewn portion to protect the patch seal or joint from being put into a peel position if the bag 30 is picked up by less than 4 loops 212, for example.

In various embodiments, a patch 222 can be attached at or near a top edge of a bag body portion 38 or sidewall of a bag 30. In various embodiments a patch 222 can be attached to bag body portion 38 or sidewall of a bag 30 a distance below, or down from, a top edge of a bag intermediate or body portion 38, or a sidewall of a bag 30.

Loop impulse heat sealer machinery, e.g., a machine 70, can be used in various embodiments of the method of the present invention, e.g., when heat sealing a lift assembly 205 having patch 222 with loops 212 coupled thereto to a bag 30. As previously discussed, lift loops 212 can be sewn to a piece of fabric or patch 222, wherein this is the only sewing on an entire bag 30, and no stitch holes penetrate a containment area of bag 30. Alternatively, loops 212 could be fused to a piece of fabric or patch 222 or to a bag 30 itself. Patch 222 can be sealed or heat fused or heat sealed to the hag 30 with a heat sealing bar, applying heat and pressure to a patch 222 that is positioned in a desired location on a bag 30, e.g., in a desired location on body portion 38. Preferably, a heat sealing bar provides a rocking motion when carrying out the heat sealing process to promote an even seal of patch 222 to bag 30 fabric.

In some embodiments, loops or lift members 212 can be configured so as to not be perfectly parallel, for example, wherein one lift leg or end 216 is not perfectly parallel to another lift leg or end 216 of the lift loop 212 when coupled to a patch 222. Also, one lifting assembly 205 can be not perfectly parallel to another lifting assembly 205 on a bag 30.

Figure 8:
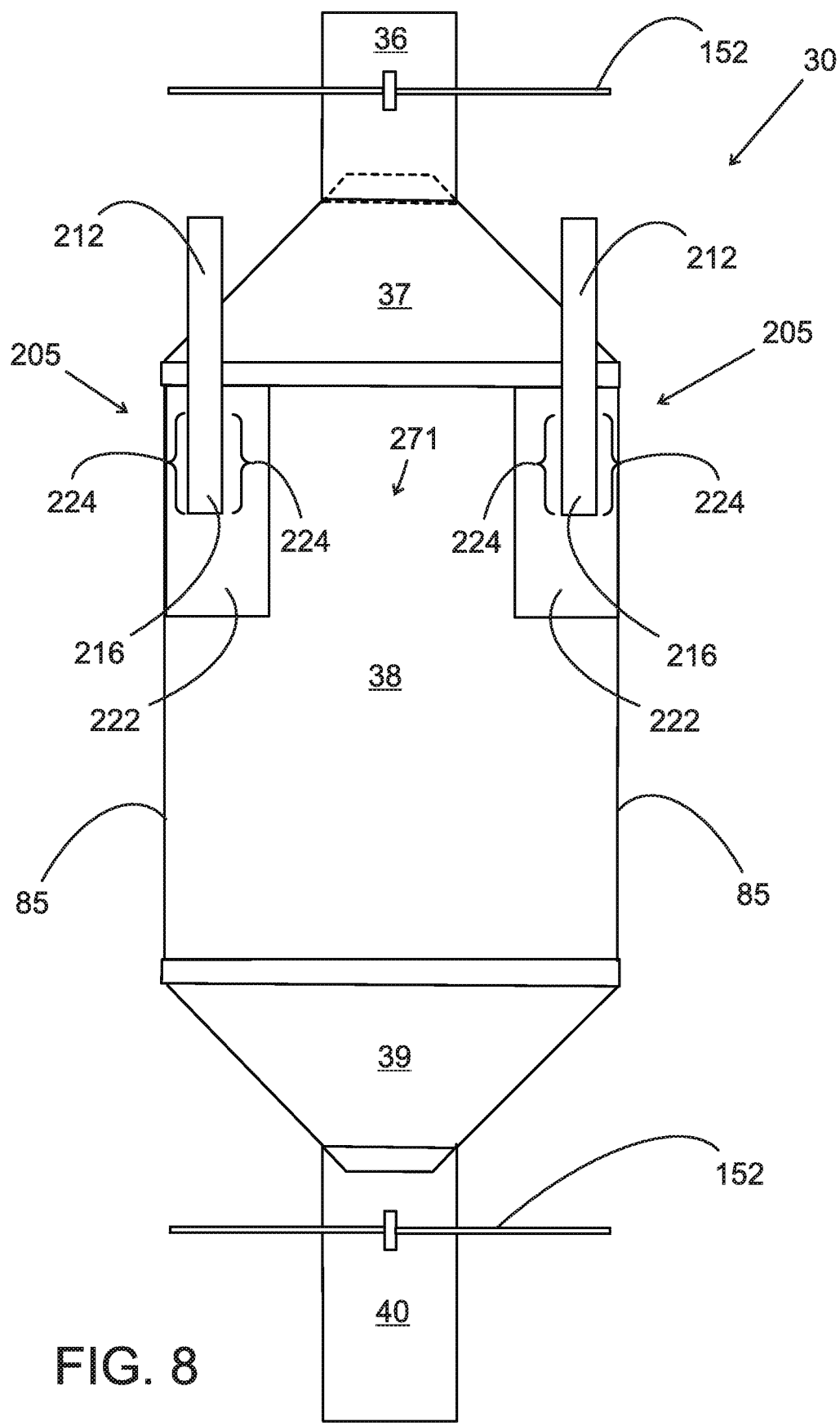
Figure 9:
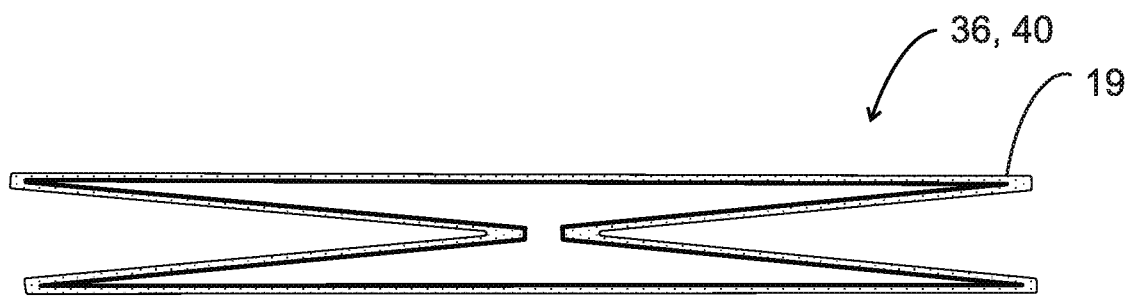
FIG. 9 is an end view of an embodiment of a folded, gusseted fill or discharge spout, of a preferred embodiment of a hulk hag that can be tested with a preferred embodiment of a lift loop assembly tester of the present invention.
Figure 10:
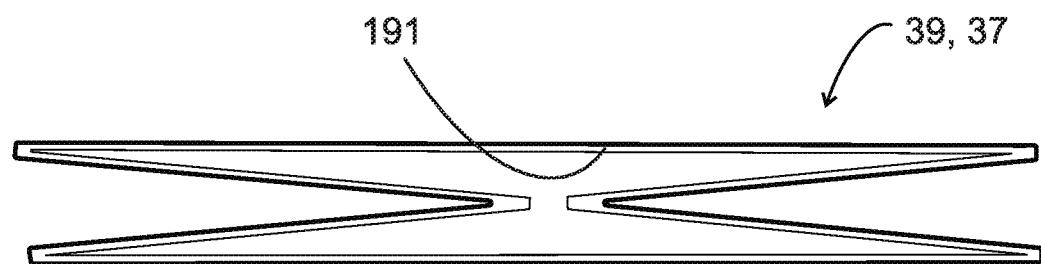
FIG. 10 is an end view of an embodiment of a folded, gusseted top or bottom panel, of a preferred embodiment of a bulk bag that can be tested with a preferred embodiment of a lift loop assembly tester of the present invention.
Figure 11:
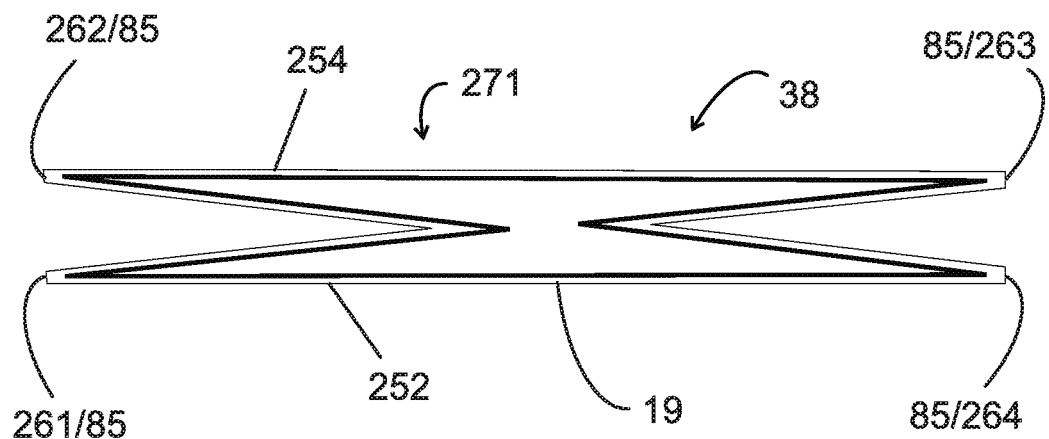
FIG. 11 is an end view of an embodiment of a folded, gusseted bag body or intermediate portion of a preferred embodiment of a bulk bag that can be tested with a preferred embodiment of a lift loop assembly tester of the present invention.
Figure 12:
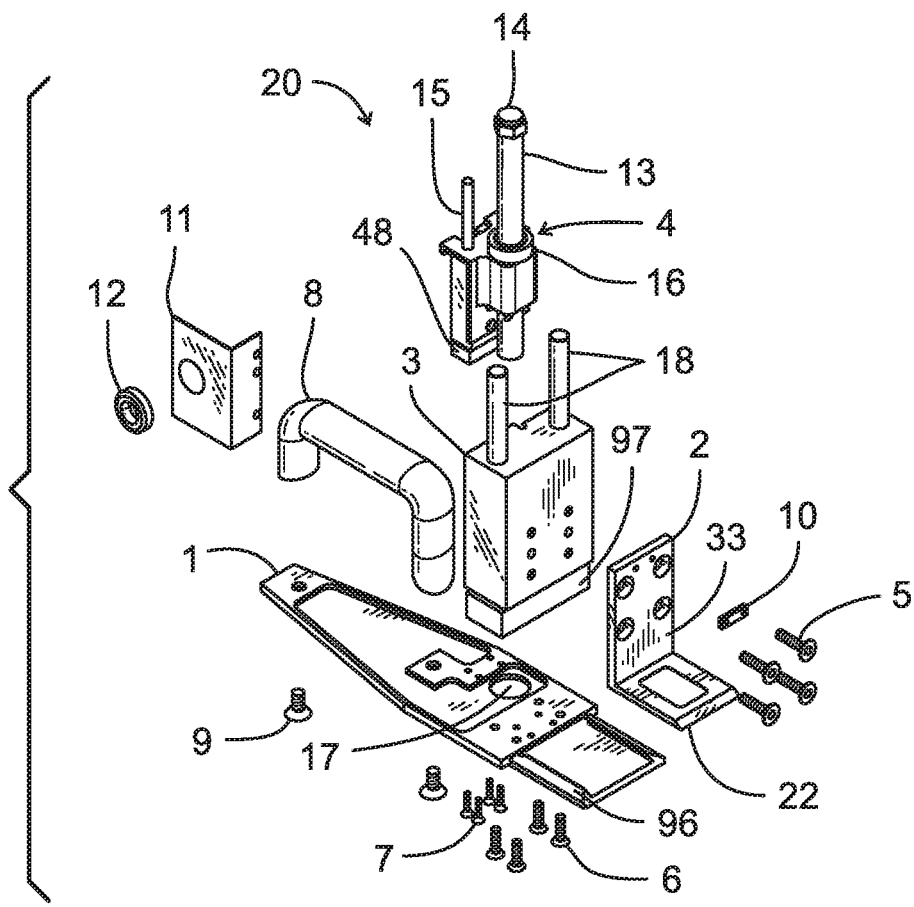
FIG. 12 is an exploded view of a preferred embodiment of a lift loop assembly tester of the present invention.
Figure 13:
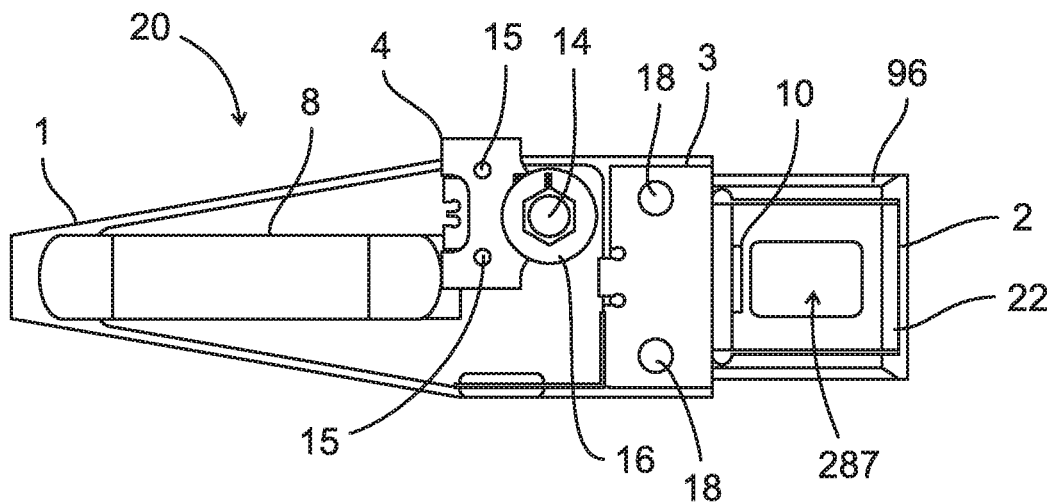
FIG. 13 is a top view of a preferred embodiment of a lift loop assembly tester of the present invention.

Referring now to FIGS. 9-11. FIG. 9 illustrates an end view of an embodiment of a folded, gusseted fill spout 36 or discharge portion 40 which can be included in a bag 30 as shown in FIGS. 4-8 and 62-63, for example. FIG. 10 illustrates an end view of an embodiment of a folded, gusseted top 37 or bottom panel 39 which can be included in a bag 30 as shown in FIGS. 4-8 and 62-63, for example. FIG. 11 illustrates an end view of an embodiment of a folded, gusseted bag body or intermediate portion 38 which can be included in a bag 30 as shown in FIGS. 4-8 and 62-63, for example.

To heat fuse or heat seal the respective fabric pieces together and form heat seal seam or joints 41 (see FIG. 7), a fill spout 36 can be positioned to overlap with top 37 while in folded gusseted form, e.g., wherein a standard coating 19 on one surface of fill spout 36 is in contact with a heat sealing coating 191 on top 37 in an overlapped area. Applying heat and pressure to the overlapped area can form a joint 41. A standard coating 19 instead could be included on a top 37 when a heat sealing coating 191 is on fill spout 36, or both top 37 and fill spout 36 can have a heat sealing coating 191 thereon along portions to be heat sealed. A discharge spout 40 can be joined to a bottom 39 in a similar manner by forming an overlapped portion wherein a standard coating 19 on one of the fabric portions is in contact with a heat sealing coating 191 on the other fabric portion, or wherein a heat sealing coating 191 on one of the fabric portions is in contact with a heat sealing coating 191 on another fabric portion and heat and pressure is applied. Likewise a top 37 can be joined to intermediate/body portion 38 and a bottom 39 can be joined to intermediate/body portion 38 in similar manner. A bulk bag main body heat sealing machine 60 can be used to heat seal the respective overlap areas to form joints 41. In general, a heat sealed joint 41 can be made by overlapping one fabric portion with another fabric portion, wherein a standard coating 19 on one of the fabric portions is in contact with a heat sealing coating 191 on the other fabric portion, or wherein a heat sealing coating 191 on one of the fabric portions is in contact with a heat sealing coating 191 on another fabric portion and heat and pressure is applied to the overlapped area.

Preferably when heat fusing or heat sealing a lift assembly 205, a patch 222 is heat sealed to a bag 30 with patch 222 including a lift loop assembly 210. Patch 222 can be folded or creased at or near a central position 93 preferably at a location in between each end 216 of loop 212, and the center fold or crease at central position 93 is preferably positioned on or near a corner area of hag 30 when bag 30 is in folded gusseted form, preferably like an envelope, at one or more folds 85 (see FIGS. 5-8, 11). Respective folds 85 can become corner areas 261, 262, 263, 264 when a bag 30 is unfolded and filled with bulk material. In this configuration, about one half of a patch 222 with one end 216 of lift loop 212 is positioned under a fold 85 and about one half of patch 222 and the other end 216 of a lift loop 212 is positioned over a fold 85. Preferably a bottom surface 240 of patch 222 includes a sealing coating 191 and can be heat sealed to body fabric having a standard coating 19. Alternatively, both bottom surface 240 of patch 222 and exterior surface 44 of intermediate portion 38 could have a heat sealing coating 191. A patch 222 could also have a standard coating 19 on bottom surface 240 when being heat fused to an intermediate portion 38 having a fusion coating 191 thereon.

Figure 7:
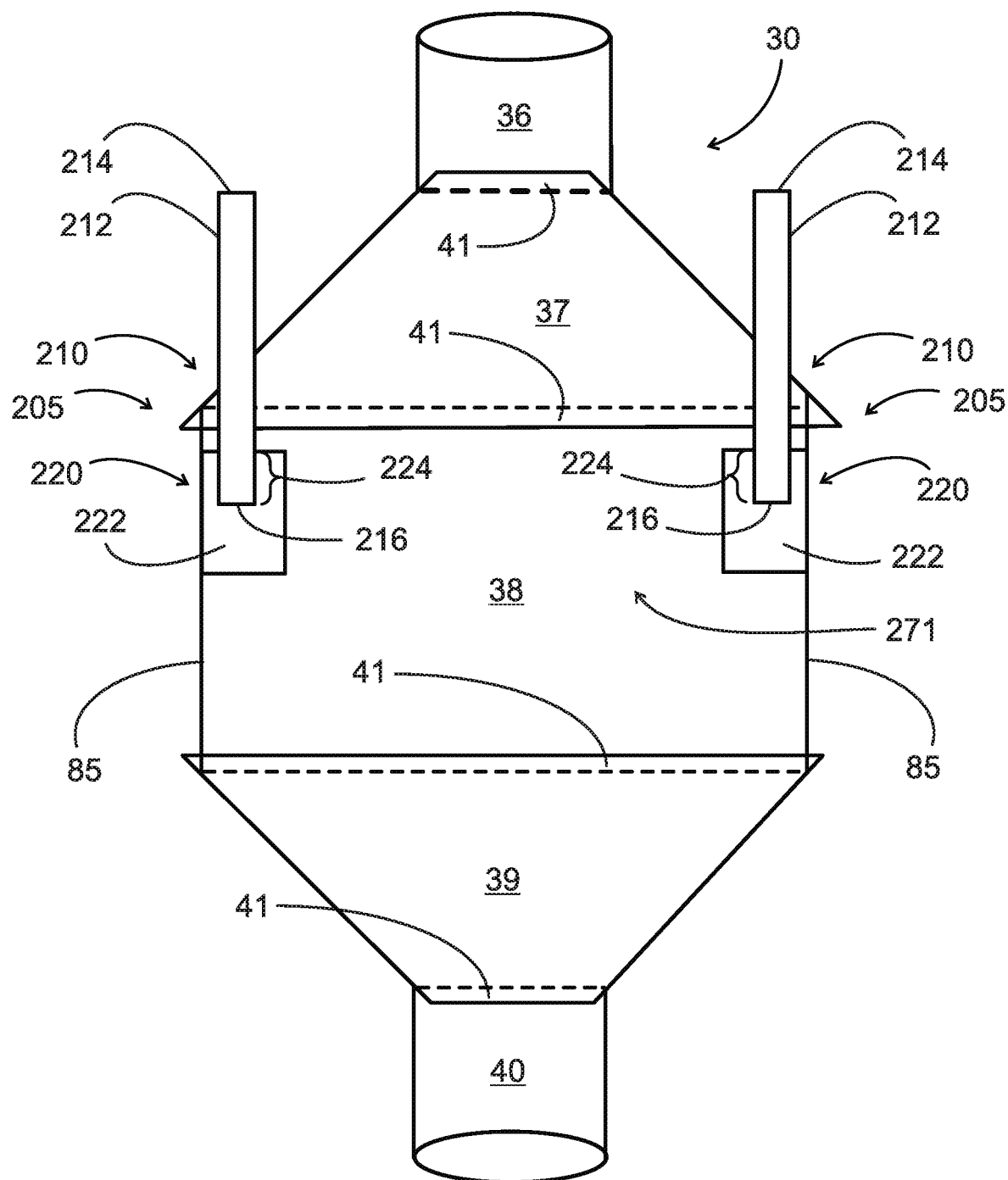
FIGS. 7-8 are top views of preferred embodiments of bulk bags that can be used with the present invention in folded, gusseted form, illustrating the location of lift assemblies on the gusseted bags before and/or after heat sealing.

Referring to FIGS. 7-8, 11, heat and pressure preferably is applied from the direction of surface 271 downward, wherein heat travels to and through lift assemblies 205 in folded configuration on intermediate/body portion 38 downward, through each layer of fabric of the gusseted intermediate portion 38 with the lift assemblies 205 folded thereon. Heat can also be applied from the bottom upwards if desired. In this manner, four lift loop assemblies 205 can be attached to a bag 30 simultaneously. Alternatively two lift assemblies 205 can be attached to a bag 30 simultaneously, or each lift assembly 205 can be attached to a bag 30 one at a time, in turn. When heat sealing a bag 30 lift assembly 205 using heat seal bars 74 as shown in FIG. 61, for example, preferably no heat or pressure is applied to the lift loop 212 legs 216 and no heat or pressure is applied to fabric of patch 222 under the lift loop 212 legs 216 such that no bond is formed between patch 222 and body portion 38 in the area under a lift loop 212 leg 216. A seal bar 74 of a lift loop assembly seal bar assembly 72 can have seal bars 74 with a substantially u-shape as shown where no heating element is present in the area where a lift loop 212 leg 216 will be present on a carrier plate 50 when heat sealing bag 30 portions together.

Depending on the type of bulk bag 30, in various embodiments less than 4 lift assemblies 205 can be attached to a bag 30. For example, some types of bulk bags 30 are designed to have only 1 or 2 lift loops 212; thus, for those bags only 1 or 2 lift assemblies 205 can be coupled to a bag 30 as needed.

In embodiments wherein lift loops 212 are sewn to patches 222, with patches 222 heat fused or heat sealed to a polypropylene fabric bag 30, a lifting assembly 205 is preferably in a shear position and can lift very heavy weights, e.g. about 500 to 5000 lbs of bulk material. In testing, lift loops 212 secured in this manner to a bag 30 have been able to lift weights equivalent to that of an RV.

A heat sealing coating 191 can be a coating comprising propylene based elastomers or plastomers. In various embodiments, heat sealing coating 191 can comprise about 50% to 90% of propylene-based plastomers, propylene-based elastomers, or mixtures thereof and about 10% to 50% polyethylene resins and additives, having a melting point that is preferably at least about 5 degrees lower than the melting point of the polypropylene fabrics to be joined together. In other embodiments, the heat sealing coating 191 can comprise about 50% to 90% of VERSIFY™ 3000 (Trademark of The Dow Chemical Company) and about 10% to 50% polyethylene resins, having a melting point that is preferably at least about 5 degrees lower than the melting point of the polypropylene fabrics to be joined together. Suitable propylene based elastomers or plastomers can be purchased for example under the trademark VERSIFY™ 3000, and EXXON™.

In various embodiments, a mixture of a minimum of about 70% pure VERSIFY™ 3000 and about 25% polyethylene, and about 5% other additives such as pigments or Ultra Violet (UV) inhibitors, can be used for heat sealing coating 191. Other potential additives may include anti-static protection. Properly sealed, this system will produce heat sealed joints resulting in an average joint strength of about 92% of the strength of standard 5 ounces per square yard (169.53 grams per square meter) woven polypropylene.

A standard coating 19 can be a standard industry coating for polypropylene fabrics, which generally comprises a majority percentage of polypropylene and a small percentage of polyethylene. Preferably, a standard polypropylene fabric coating used with one or more embodiments of the present invention has about 70-85 percent polypropylene with a balance of polyethylene, i.e., 15 to 30 percent polyethylene. More preferably, a standard polypropylene coating used in various embodiments of the present invention has about 70-85 percent polypropylene, with a balance of polyethylene and some UV inhibitors, and other additives.

For polyethylene fabrics, a standard coating 19 can be a laminated film or coating that is comprised of polyethylene, or a mixture of polyethylene and other additives.

For prior art hulk bags, generally a standard coating 19 is applied at about 1 mil (0.03 millimeters) thickness. Preferably for a stitchless or heat sealed bag of the present invention, a standard coating 19 is applied at about 2.5 mil (0.064 millimeters) thickness. A standard coating 19 can also be applied at about 1 to 2.5 mil (0.03 to 0.064 millimeters) thickness or over about 2.5 mil (0.064 millimeters) thickness, if desired.

Preferably a heat sealing coating 191 is applied at about 2.5 mil (0.064 millimeters) thickness. In other embodiments a heat sealing coating 191 can be applied at about 1 to 2.5 mil (0.03 to 0.064 millimeters) thickness or over about 2.5 mil (0.064 millimeters) thickness. Given the high cost of a heat sealing coating, preferably a heat sealing coating is not applied above about 2.5 mil (0.064 millimeters) thickness, although it can be applied at a greater thickness if desired.

A heat seal bond can be formed between a heat sealing coating 191 on one piece of fabric and a heat sealing coating 191 on another piece of fabric when heat is applied to melt the heat sealing coating(s) so that a bond between the two heat sealing coatings 191 is formed. A heat seal bond can also be formed between one piece of fabric having a heat sealing coating 191 and another piece of fabric having a standard coating 19 when heat is applied to melt the heat sealing coating.

Figure 74:
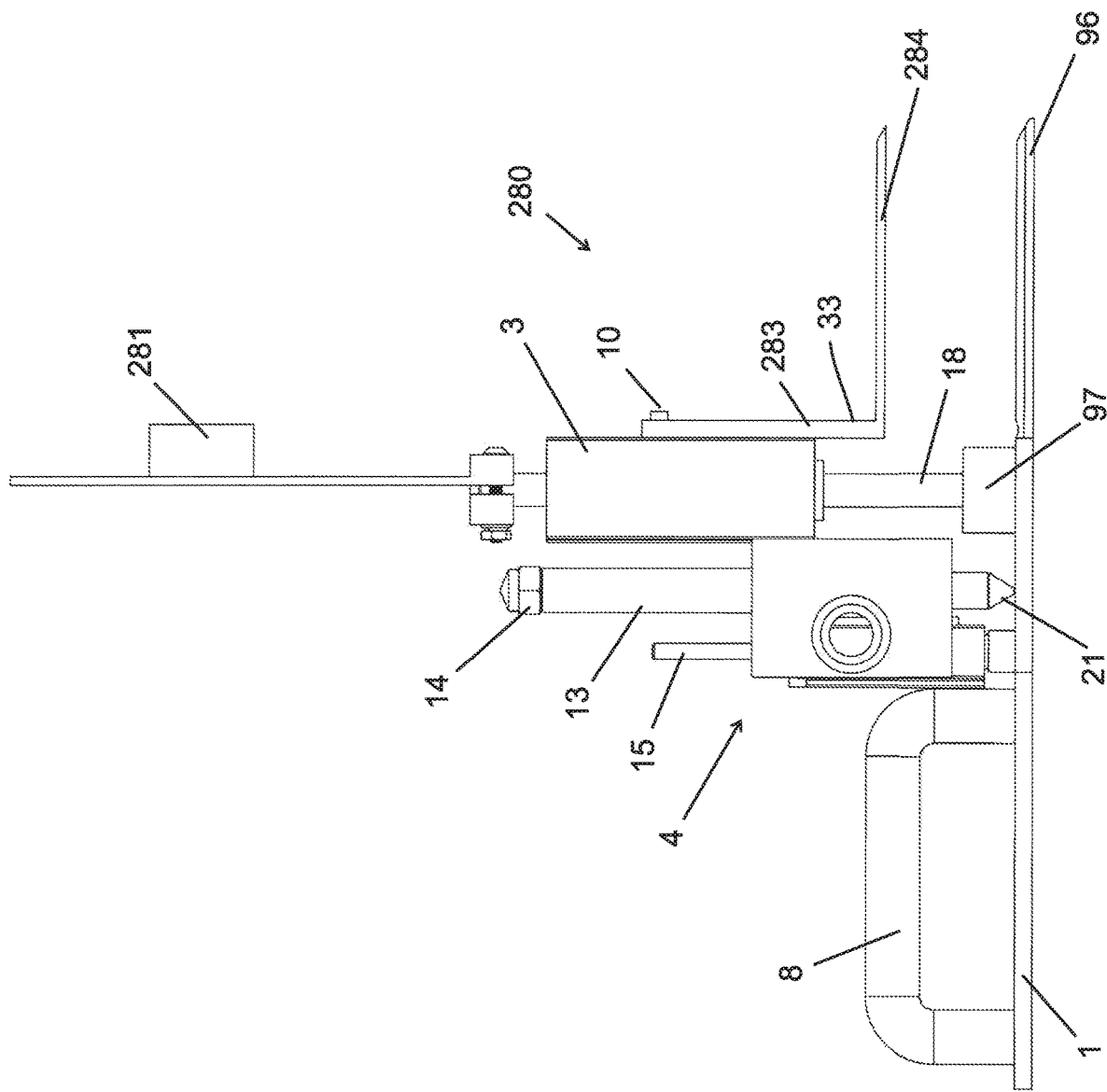
FIG. 74 is a front side view of a preferred embodiment of a lift loop assembly tester apparatus showing a lifting platform and lifting member in a raised position and a marker assembly in a raised position.
Figure 75:
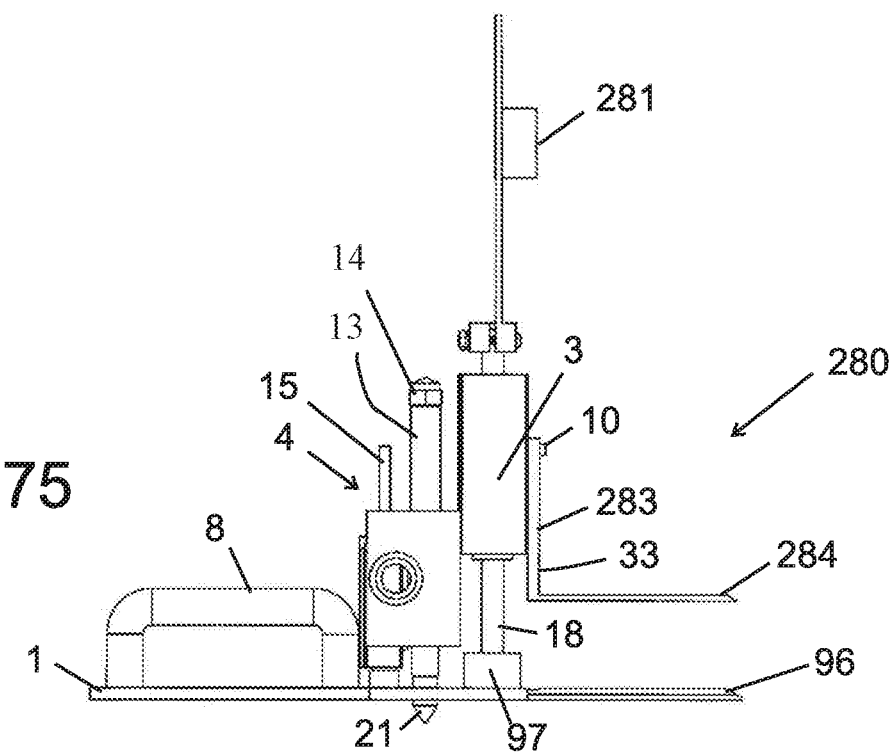
FIG. 75 is a front side view of a preferred embodiment of a lift loop assembly tester apparatus showing a lifting member in a raised position and a marker assembly in a lowered position.

Referring now to FIGS. 12-55, 66-68, and 70-75 preferred embodiments of a tester apparatus 20 and 280, which is at times referred to herein as a lift assembly or lift loop tester apparatus, will be discussed. Tester apparatuses 20, 280 both preferably include an air slide assembly 3 with a lifting platform 2 or 283 which has a sensor spacer 10 to which a sensor 76 is preferably attached for sensing movement of a lifting platform 2 insert portion 22 or lifting platform 283 insert portion 284 into an unsealed area 75 of a patch 222 on a bulk bag 30. An air slide assembly 3 of either a tester apparatus 2 or 280 can also include a displacement sensor 281 for sensing rise of patch 222 fabric during a test in addition to a sensor spacer 10 with a sensor 76, which is preferably attached for sensing moving of lifting platform 284 into an unsealed area 75 of patch 222, which is shown in the embodiment of a tester 280 as shown in FIGS. 74 and 75.

A tester apparatus 20, 280 preferably includes a base mount 1. A handle 8 preferably is coupled to base mount or base plate 1 with a coupler or fastener 9, e.g., screws or bolts, and possibly washers if desired. A user can grasp handle 8 when performing a test with lift loop assembly tester 20, 280.

An air slide assembly 3 is also coupled to base mount 1 as shown in FIGS. 12-16, 54-55, 70, 73-75 with a coupler or fastener 6, e.g., screws or bolts, washers. Air slide assembly 3 can include cylinders 18, which preferably are air cylinders. In other embodiments, other devices generating mechanical movement can be used instead of air cylinders 18, e.g., pressure sensitive mechanical actuators, electric or hydraulic actuators, linear solenoids (which are generally electric), rotary actuators (air or electric), miniature hydraulic jacks, precision hand winches, torque lifts, or weights on a pivot can be used instead of air cylinders 18, hut these generally are more costly and not as efficient as an air cylinder.

Figure 14:
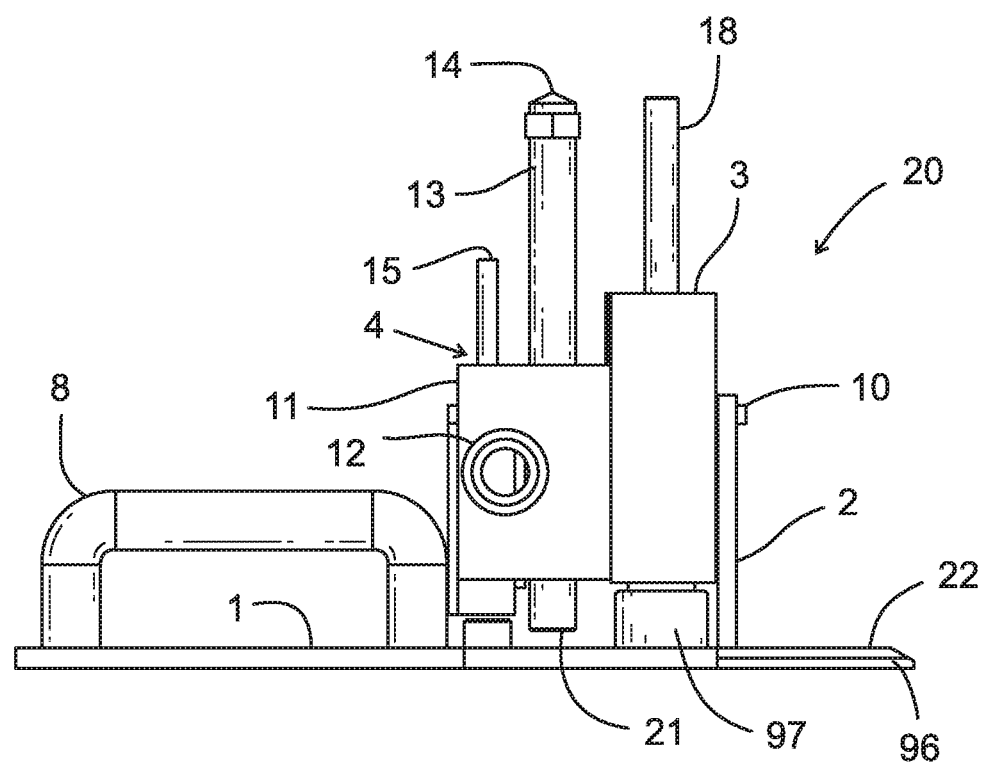
FIG. 14 is a front side view of a preferred embodiment of a lift loop assembly tester of the present invention showing the lifting platform and lifting member in a lowered position and a marker assembly in a raised position.
Figure 15:
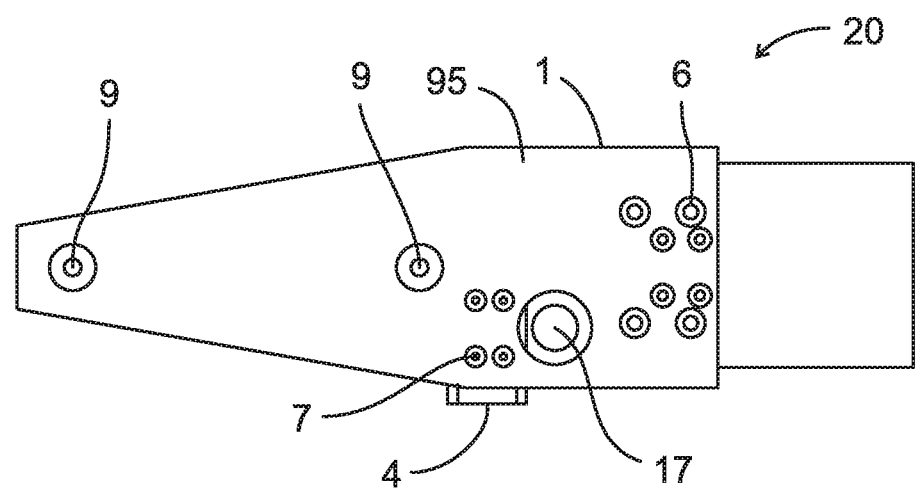
FIG. 15 is a bottom view of a preferred embodiment of a lift loop assembly tester of the present invention.
Figure 16:
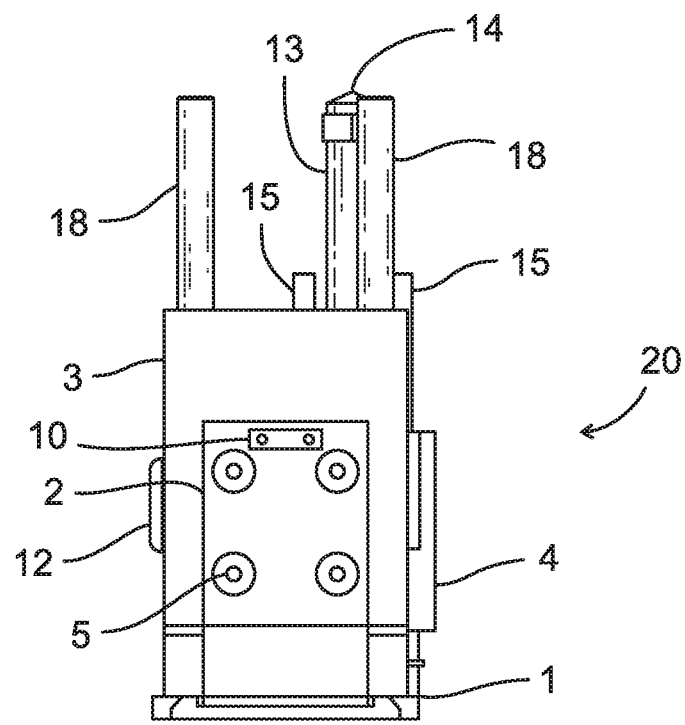
FIG. 16 is a right side view of a preferred embodiment of a lift loop assembly tester of the present invention.
Figure 17:
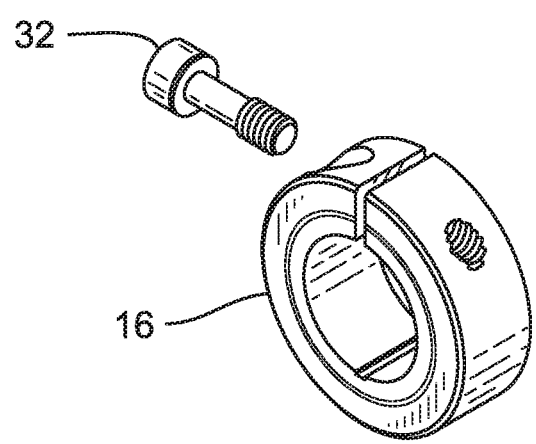
FIG. 17 is a perspective view of a preferred embodiment of a stop assembly for a marker assembly in a preferred embodiment of a lift loop assembly tester of the present invention.
Figure 18:
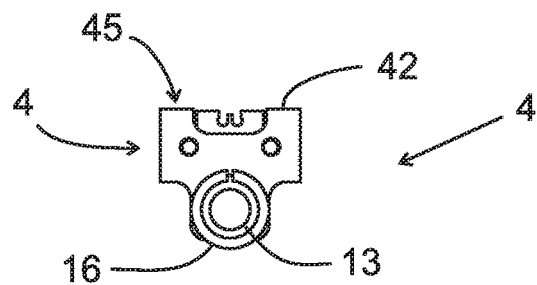
FIG. 18 is a top view of a preferred embodiment of a marker assembly in a preferred embodiment of a lift loop assembly tester of the present invention.
Figure 19:
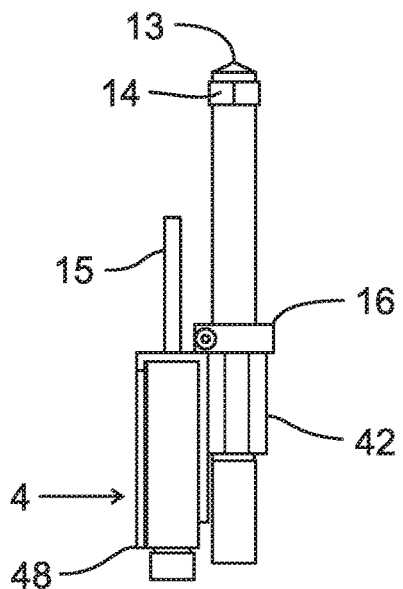
FIG. 19 is a left side view of a preferred embodiment of a marker assembly in a preferred embodiment of a lift loop assembly tester of the present invention.
Figure 20:
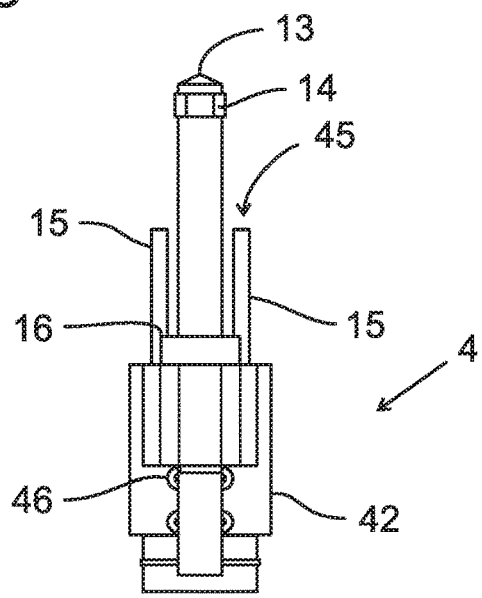
FIG. 20 is a back view of a preferred embodiment of a marker assembly in a preferred embodiment of a lift loop assembly tester of the present invention.
Figure 21:
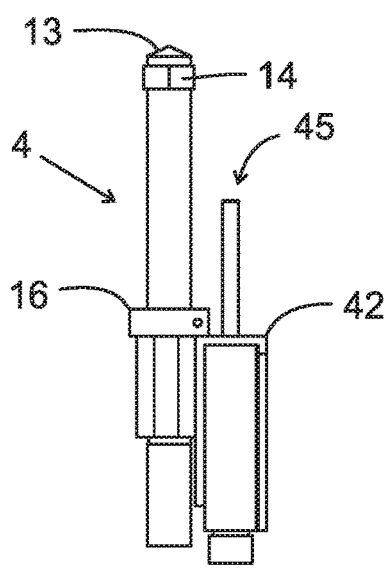
FIG. 21 is a right side view of a preferred embodiment of a marker assembly in a preferred embodiment of a lift loop assembly tester of the present invention.
Figure 22:
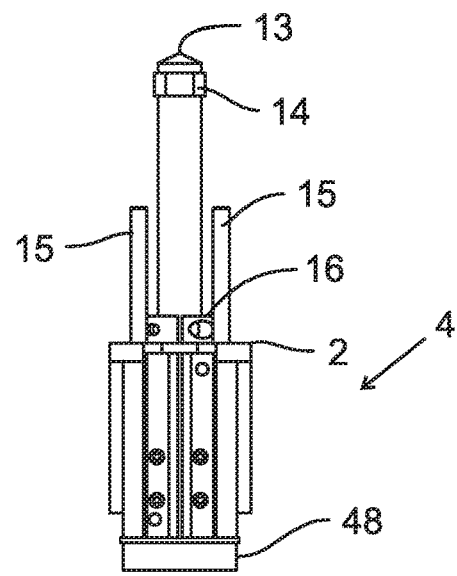
FIG. 22 is a forward view of a preferred embodiment of a marker assembly in a preferred embodiment of a lift loop assembly tester of the present invention.
Figure 23:
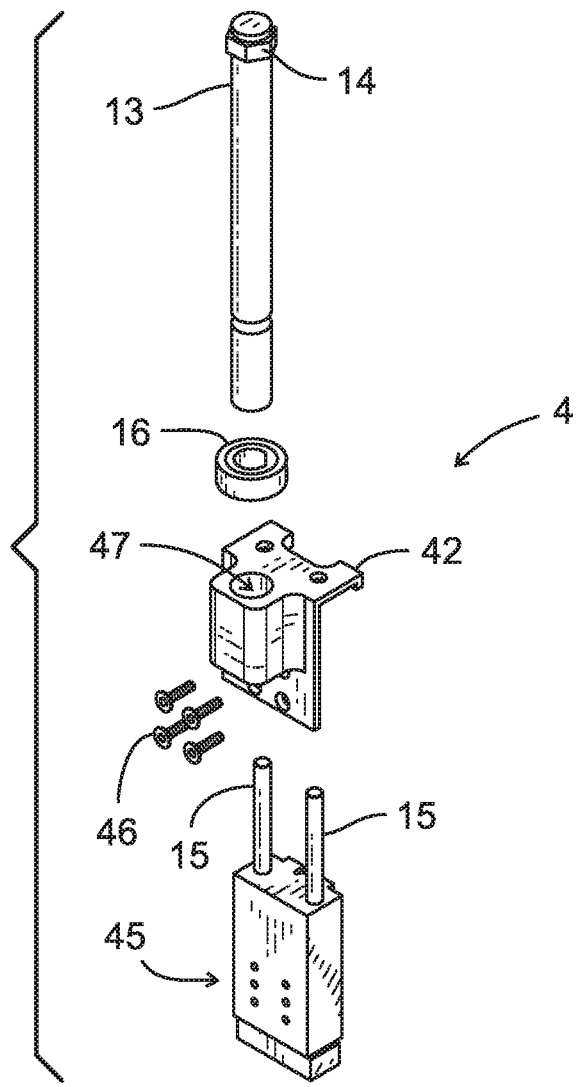
FIG. 23 is an exploded view of a preferred embodiment of a marker assembly in a preferred embodiment of a lift loop assembly tester of the present invention.
Figure 24:
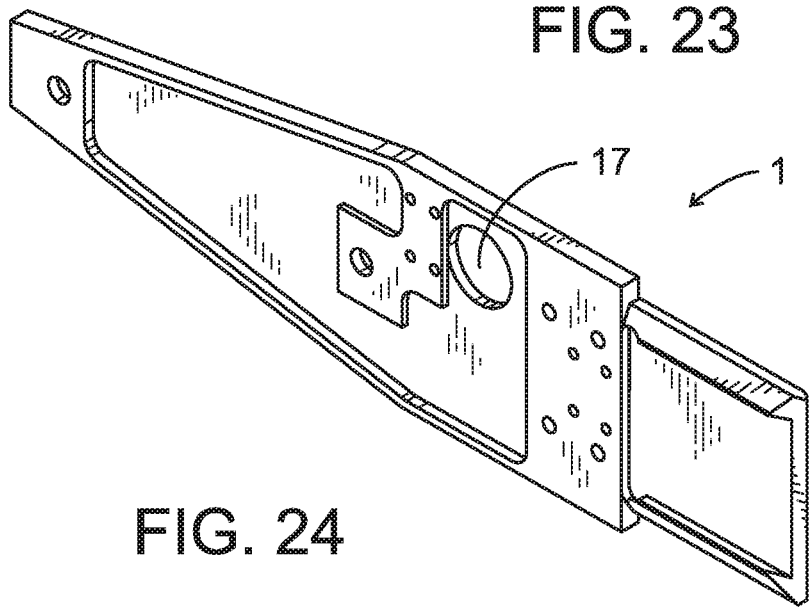
FIG. 24 is a perspective view of a base mount in a preferred embodiment of a lift loop assembly tester of the present invention.
Figure 25:
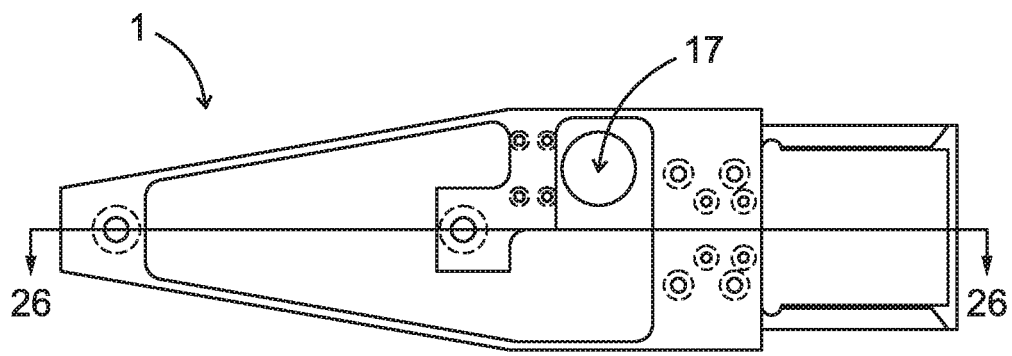
FIG. 25 is a front view of a base mount in a preferred embodiment of a lift loop assembly tester of the present invention.
Figure 26:
FIG. 26 is a sectional view taken along lines 26-26 of FIG. 25.
Figures 27, 28:
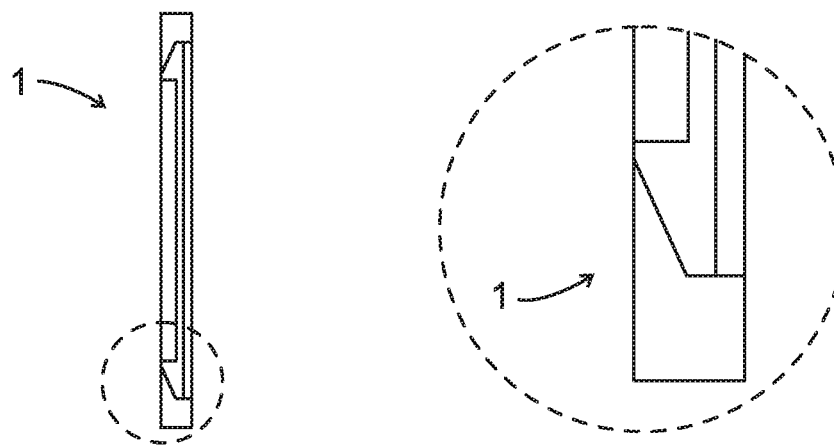
FIG. 27 is a right side view of a base mount in a preferred embodiment of a lift loop assembly tester of the present invention.
FIG. 28 is a detail view of a base mount in a preferred embodiment of a lift loop assembly tester of the present invention as shown in FIG. 27.
Figure 29:
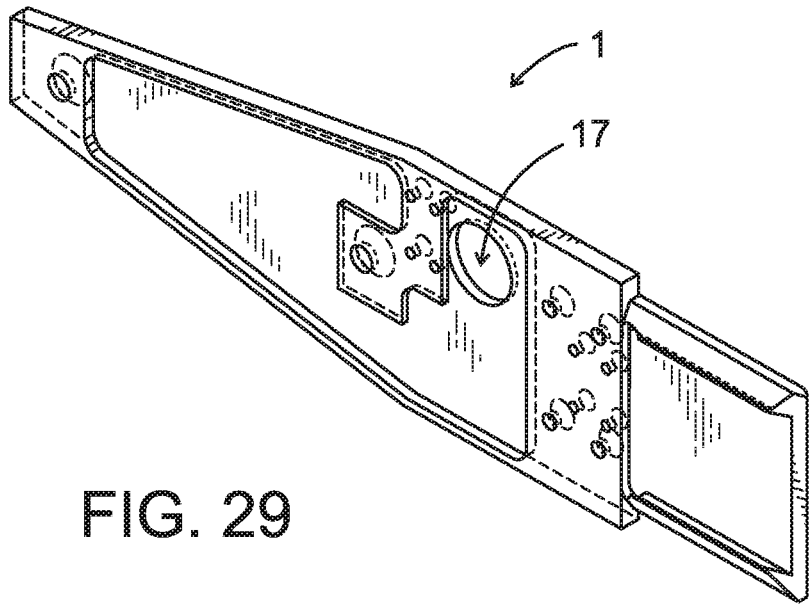
FIG. 29 is a perspective view of a preferred embodiment of a base mount in a preferred embodiment of a lift loop assembly tester of the present invention.
Figure 30:
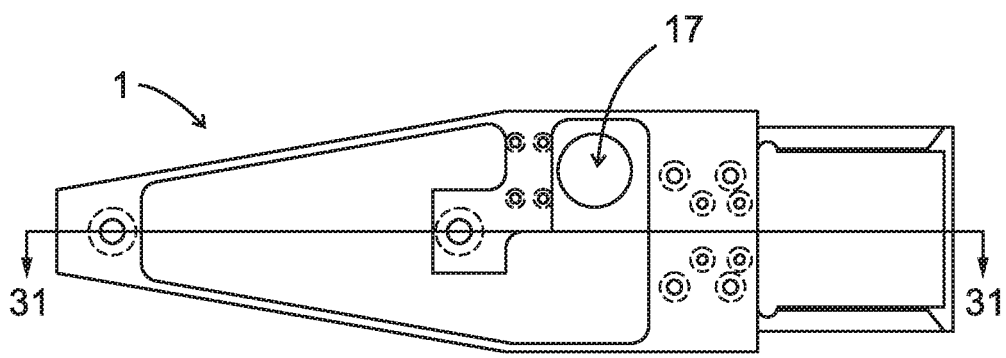
FIG. 30 is a front view of a preferred embodiment of a base mount in a preferred embodiment of a lift loop assembly tester of the present invention.
Figure 31:
FIG. 31 is a section view taken along lines 31-31 of FIG. 30.
Figure 32:
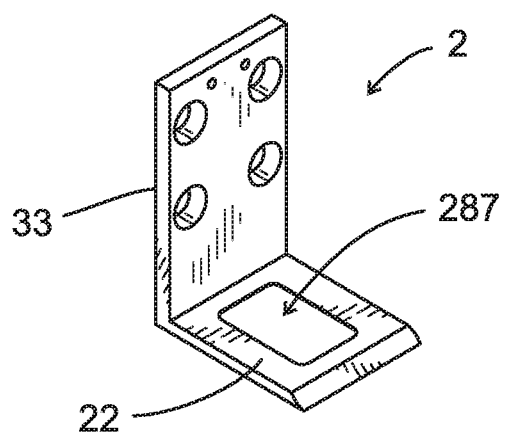
FIG. 32 is a perspective view of a preferred embodiment of a lift member in a preferred embodiment of a lift loop assembly tester of the present invention.
Figure 33:
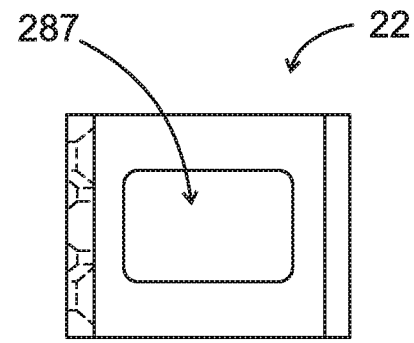
FIG. 33 is a top view of a preferred embodiment of a lift member in a preferred embodiment of a lift loop assembly tester of the present invention.
Figure 34:
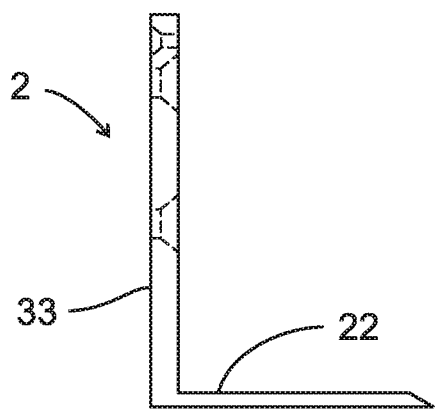
FIG. 34 is a side view of a preferred embodiment of a lift member in a preferred embodiment of a lift loop assembly tester of the present invention.
Figure 35:
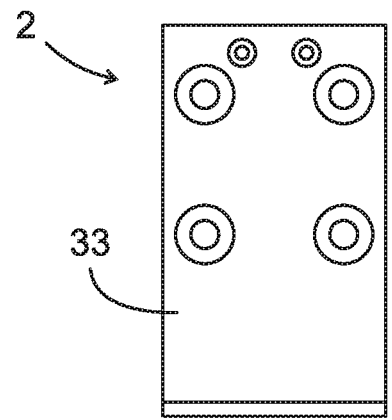
FIG. 35 is a back view of a preferred embodiment of a lift member in a preferred embodiment of a lift loop assembly tester of the present invention.
Figure 36:
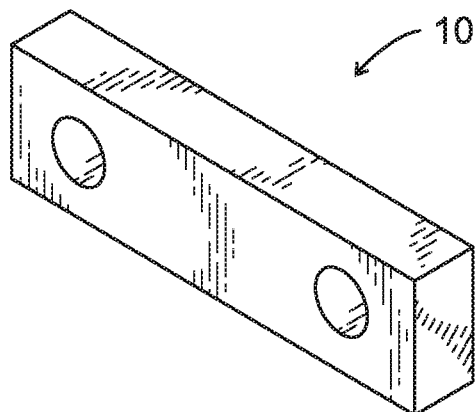
FIG. 36 is a perspective view of a preferred embodiment of a sensor spacer in a preferred embodiment of a lift loop assembly tester of the present invention.
Figure 37:
FIG. 37 is a top view of a preferred embodiment of a sensor spacer in a preferred embodiment of a lift loop assembly tester of the present invention.
Figure 38:
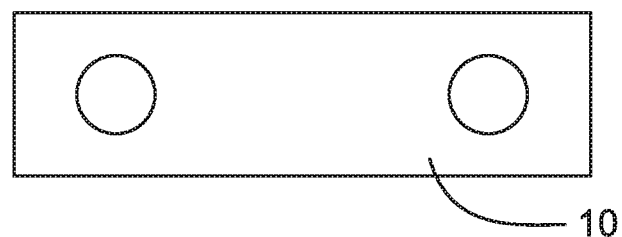
FIG. 38 is a front view of a preferred embodiment of a sensor spacer in a preferred embodiment of a lift loop assembly tester of the present invention.
Figure 43:
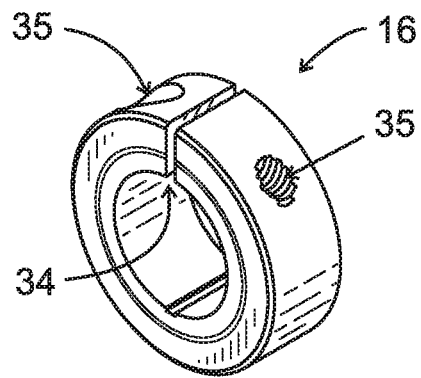
FIG. 43 is a perspective view of a preferred embodiment of a stop of a marker assembly in a preferred embodiment of a lift loop assembly tester of the present invention.
Figure 44:
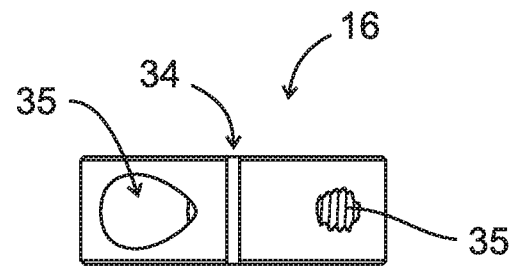
FIG. 44 is a top view of a preferred embodiment of a stop of a marker assembly in a preferred embodiment of a lift loop assembly tester of the present invention.
Figure 45:
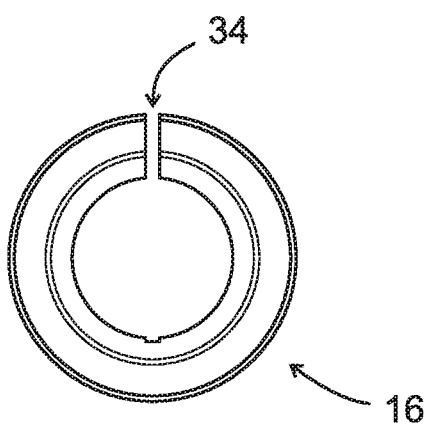
FIG. 45 is a front view of a preferred embodiment of a stop of a marker assembly in a preferred embodiment of a lift loop assembly tester of the present invention.
Figure 46:
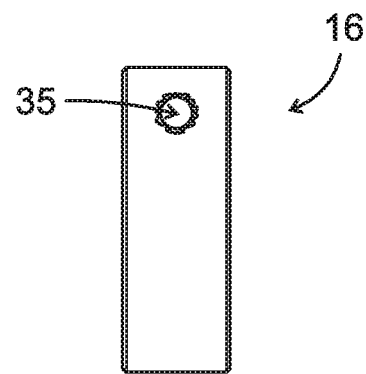
FIG. 46 is a right side view of a preferred embodiment of a stop of a marker assembly in a preferred embodiment of a lift loop assembly tester of the present invention.
Figure 47:
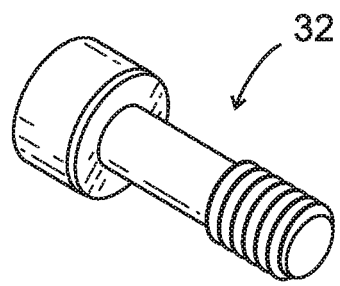
FIG. 47 is a perspective view of a preferred embodiment of a fastener, which can be a screw or bolt, of a stop of a marker assembly, which can be included in a preferred embodiment of a lift loop assembly tester of the present invention.
Figure 48:
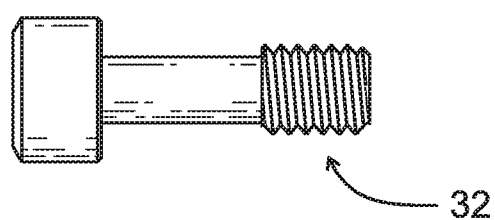
FIG. 48 is a front side view of a preferred embodiment of a fastener, which can be a screw or bolt, of a stop of a marker assembly, which can be included in a preferred embodiment of a lift loop assembly tester of the present invention.
Figure 49:
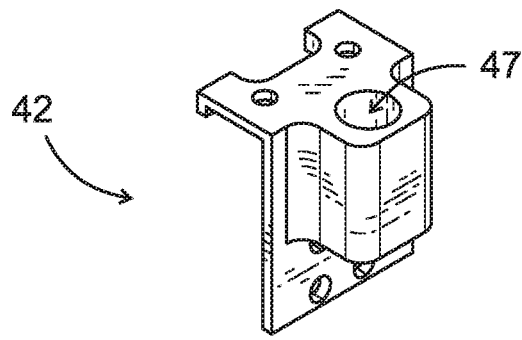
FIG. 49 is a perspective view of a preferred embodiment of a marker holder of a marker assembly in a preferred embodiment of a lift loop assembly tester of the present invention.
Figure 50:
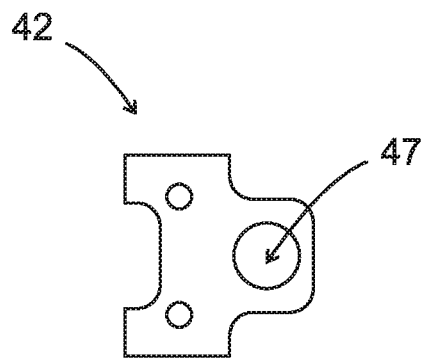
FIG. 50 is a top view of a preferred embodiment of a marker holder of a marker assembly in a preferred embodiment of a lift loop assembly tester of the present invention.
Figure 51:
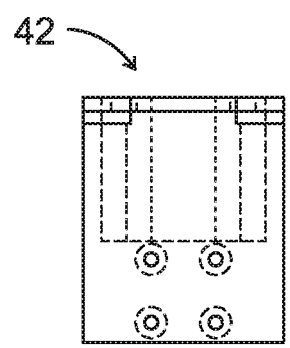
FIG. 51 is a left side view of a preferred embodiment of a marker holder of a marker assembly in a preferred embodiment of a lift loop assembly tester of the present invention.
Figure 52:
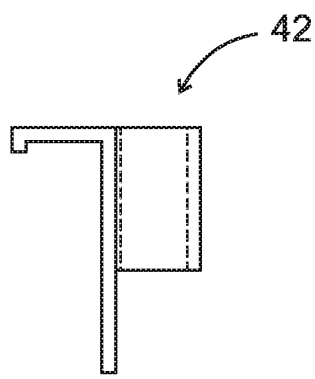
FIG. 52 is a front side view of a preferred embodiment of a marker holder of a marker assembly in a preferred embodiment of a lift loop assembly tester of the present invention.
Figure 53:
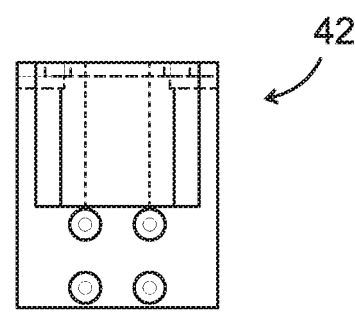
FIG. 53 is a right side view of a preferred embodiment of a marker holder of a marker assembly in a preferred embodiment of a lift loop assembly tester of the present invention.
Figure 54:
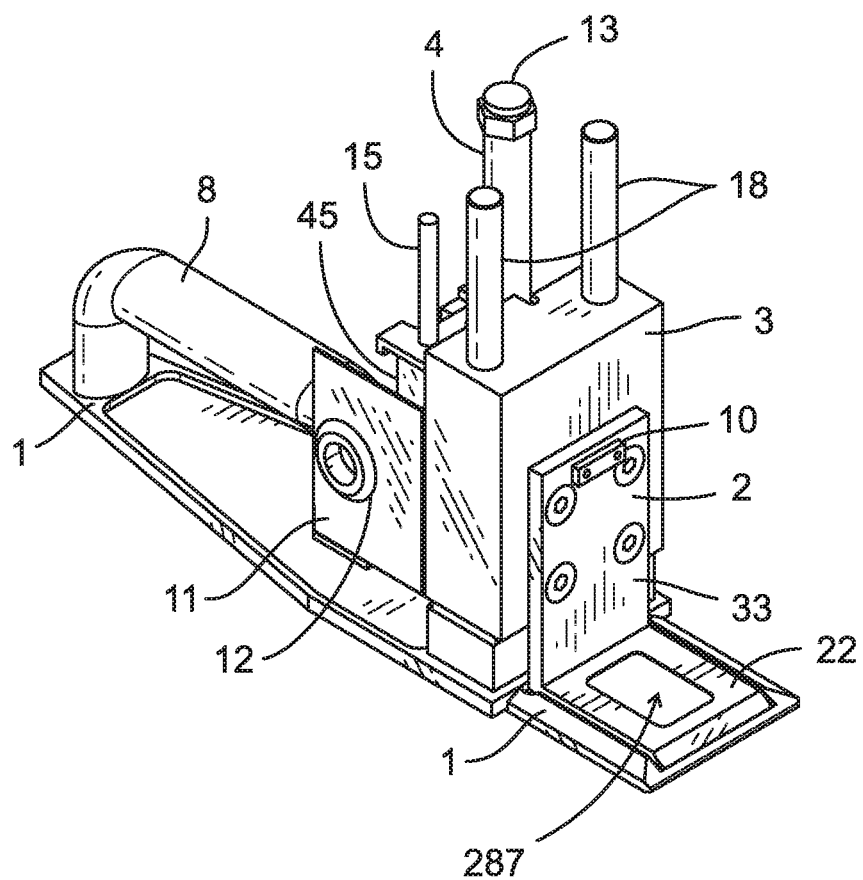
FIG. 54 is a perspective view of a preferred embodiment of a lift loop assembly tester of the present invention.
Figure 55:
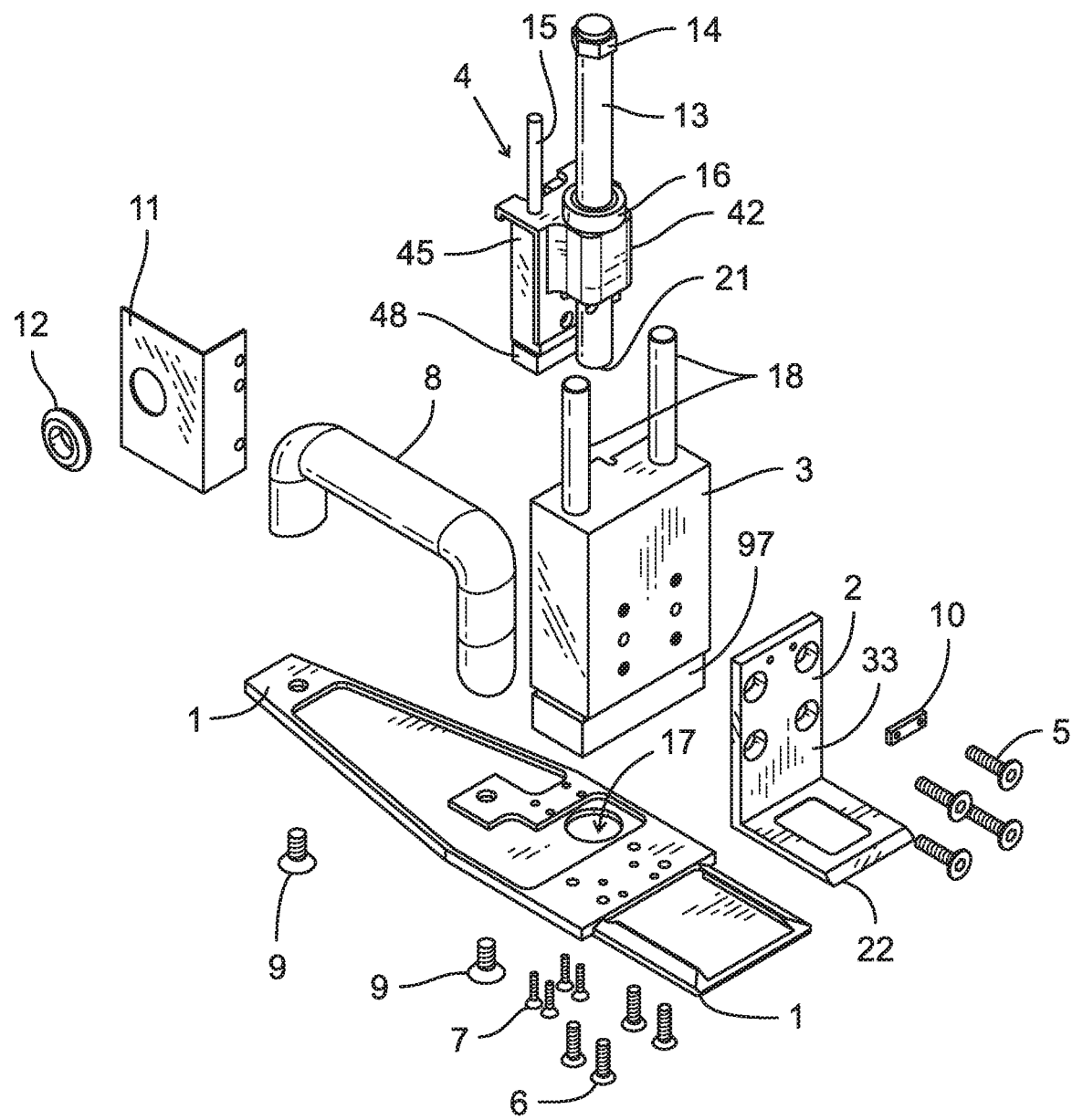
FIG. 55 is an exploded view of a preferred embodiment of a lift loop assembly tester of the present invention.
Figure 70:
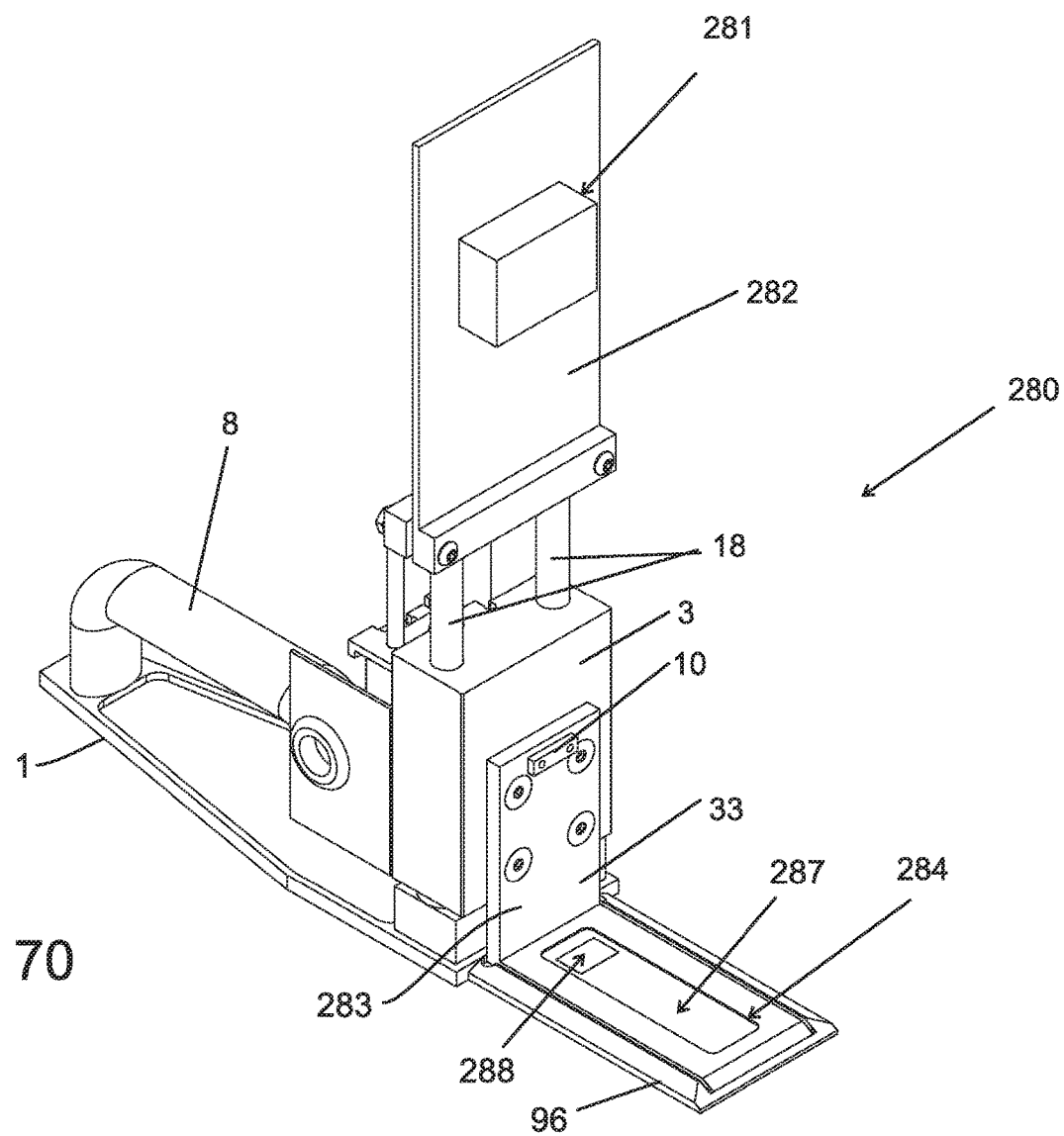
FIG. 70 is a perspective view of another preferred embodiment of a lift loop assembly tester apparatus of the present invention.

Lifting platform 2 or 283 of tester apparatus 20 or 280 is coupled to air slide assembly 3 with a coupler or fastener 5, e.g., screws or bolts, and possibly washers if desired. Lifting platform 2 or 283 includes a sensor spacer 10 coupled to mounting plate 33. Lifting platform 2 or 280 also includes an insert portion or lifting member 22 or 284 that can lift a patch 222. Air slide assembly 3 including cylinders 18 above a cylinder foot 97 is operable to raise and lower lifting platform 2 or 283 during a test of a lift assembly 205 coupled to a bulk bag 30. FIG. 14 illustrates air slide assembly 3 of tester 20 in a lowered position prior to a test. Air slide assembly 3 of tester 280 can also be lowered in a same or similar position as shown in FIG. 70. FIGS. 74-75 illustrate air slide assembly 3 of tester 280 in a raised position that occurs during a test, showing insert portion 284 of lift member 283 raised off of base 1, rail 96.

Figure 73:
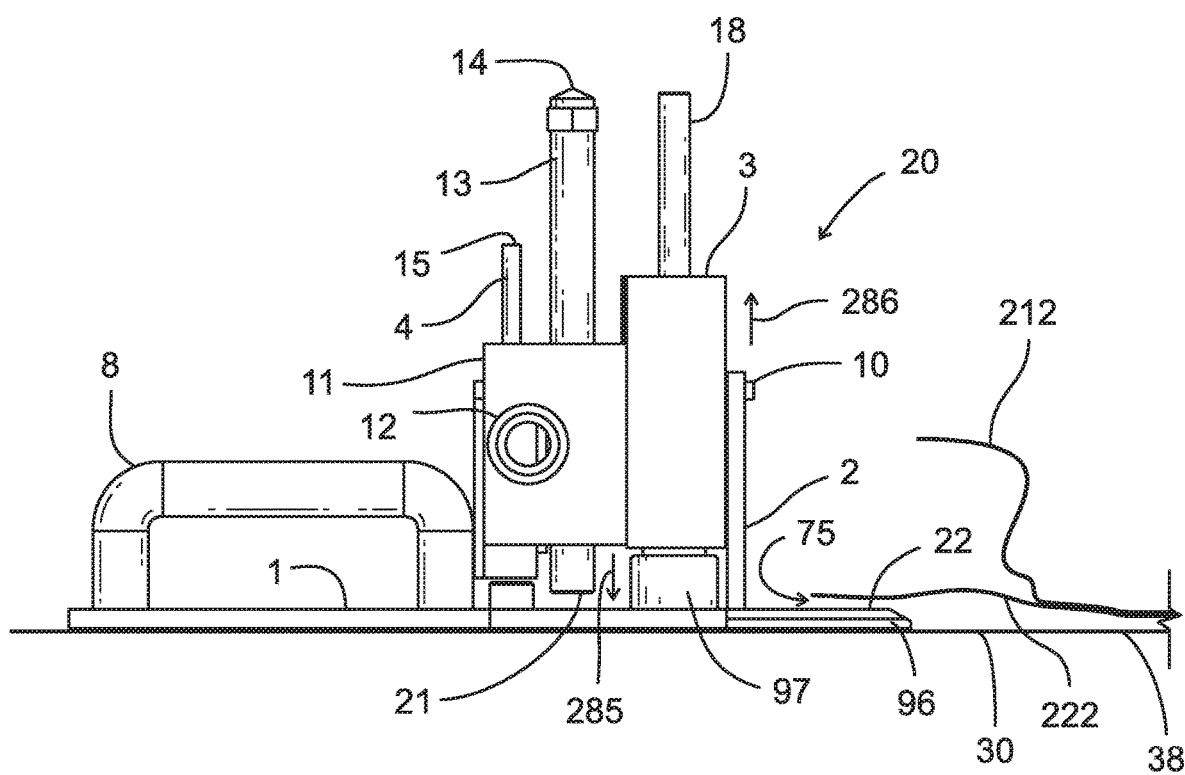
FIG. 73 is a side view illustrating insertion of a preferred embodiment of a lift loop assembly tester apparatus in an unsealed area between a lift loop patch and a bag body.

Air slide assembly 3 of tester 20 can also be raised in a similar manner during a test as depicted by in FIG. 73. Preferably lifting platform 2 insert portion 22 of tester 20, and lifting platform 283, insert portion 284 of tester 280 are sized so that insert portions 22, 284 can be inserted into an unsealed area in between a lift loop patch 222 and bag body portion 38 as described above. Arrows 75 in FIGS. 3, 66-67 and 73 represent the location of unsealed areas of patch 222 on a bag 30 body 38, which are under the patch 222 in the area under the location of lift loop legs 216.

Preferably, the width of lifting platform 2 insert portion/ lifting member 22 and of lifting platform 283, insert portion/ lifting member 284 are sized based on the width of a lift loop 212 such that lifting platform 2 insert portion/lifting member 22 and lifting platform 283, insert portion/lifting member 284 can apply pressure along edges of the sealed area or bond between patch 222 and body portion 38 while insert portion 22 is in the unsealed area 75 in between patch 222 and body portion 38. A length of insert portion 22 of lifting platform 2 and insert portion/lifting member 284 of lifting platform 283 is preferably determined based on the distance desired for insert portion 22 or 284 to be inserted in the unsealed area between patch 222 and body portion 38. When lifting platform 2 is lifted or raised, insert portion 22 applies pressure to a bond or joint 41 between patch 222 and body portion 38 and it tests the peel pressure along edges of the bond or joint 41 and whether the bond or joint 41 peels away or breaks during the test. The distance that insert portion 22 is inserted in the unsealed area determines the test area of the lift assembly 205.

Likewise, when lifting platform 283 is lifted or raised, insert portion 284 applies pressure to a bond or joint 41 between patch 222 and body portion 38 and it tests the peel pressure along edges of the bond or joint 41 and whether the bond or joint 41 peels away or breaks during the test. The distance that insert portion 284 is inserted in the unsealed area determines the test area of the lift assembly 205.

Referring to FIGS. 12-23, 54-55, 70, 73-75 marker assembly 4 of a tester 20 or 280 is preferably coupled to base mount 1 with a coupler or fastener 7, e.g., screws or bolts, and possibly washers if desired. Marker assembly 4 preferably includes a pen or marker 13, which can be a felt tip marker, which can include a hollow bore, a pen tip 21, and a cap 14, e.g., a hex nut. Ink can be poured into a hollow bore of pen 13 and flow to pen tip 21. Pen 13 can be a standard commercial marking pen, e.g., for dot marking, e.g., a pen available from McMaster-Carr, part no. 1644T1.

Preferably pen 13 is positioned on base mount 1 so that pen tip 21 can extend through opening 17 of base mount 1 during a test process if a lift member assembly 205 passes the test (see FIG. 75) and place a mark on lift loop assembly 205 or on another desired area of bag 30. Preferably ink of pen 13 is green (symbolizing cleared to go) and applies a mark on lift member assembly 205 as confirmation that successful safety testing has been performed. The ink used in the testing process can, however, be any desired color.

Marker assembly or marker sub-assembly 4 also preferably includes an air slide assembly 45 including cylinders 15, which preferably are air cylinders which can be positioned above a cylinder foot 48. In other embodiments, other devices generating mechanical movement can be used instead of air cylinders, e.g., pressure sensitive mechanical actuators, electric or hydraulic actuators, linear solenoids (which are generally electric), rotary actuators (air or electric), miniature hydraulic jacks, precision hand winches, torque lifts, or weights on a pivot can be used instead of air cylinders, but these generally are more costly and not as efficient as an air cylinder.

Marker assembly 4 also preferably includes a marker holder 42. Fasteners 46, which can be screws or bolts, and possibly washers if desired, for example, can be used to couple marker holder 42 to air slide assembly 45. Cylinders 15 are operable to raise and lower pen 13. When a test is successful and lifting platform 2, lifting member 22 is raised only an acceptable distance in the direction of arrow 286 in FIG. 73, e.g., 1.5 inches or less during a test, cylinders 15 can lower pen 13 in a downwards direction in the direction of arrow 285 in FIG. 73 within bore 47 of marker holder 42 to mark bag 30 fabric or lift assembly 205 fabric as an indicator of a successful test. Pen 13 can also be raised by cylinders 15 after a successful test is complete. A pen 13 can also be lowered in a same or similar manner based on a positive test result using a tester 280 as shown in FIG. 75.

FIGS. 14, 73 show pen 13 in a raised position prior to a test for a tester 20. A pen 13 can be in a similar raised position in a tester 280 prior to a test. FIG. 74 shows pen 13 in a raised position after a test using tester 280 was unsuccessful and lifting platform 283, lifting member 284 is raised an unacceptable distance, e.g., over 1.5 inches. FIG. 75 shows pen 13 in a lowered position after a successful test wherein pen 13 is lowered through opening 17 in base 1 to mark fabric of bag 30 or lift assembly 205 (not shown in this Figure) and provide a positive indication of a successful test after lifting platform 283, lifting member 284 is raised an acceptable distance, e.g., 1.5 inches or less. A marker assembly 4 of tester 20 can also be lowered or not lowered based on successful or unsuccessful tests in a similar manner as depicted in FIGS. 74-75.

Stop 16 is also preferably provided as part of marker assembly or marker sub-assembly 4. Stop 16 can be a c-clamp or a shaft collar (see FIGS. 17 and 43-46) with a slot 34 and threaded opening 35 for receiving a fastener 32 (see FIGS. 47-48), which can be a screw or bolt, via which stop 16 can be adjusted. Preferably stop 16 is configured to allow for upwards and downwards movement, e.g., a free sliding action, of pen 13, during testing. Preferably stop 16 allows for about one inch of upward and/or downward sliding movement of pen 13 within stop 16. In some embodiments an ink jet based marking system or other form of mechanical marking system can be used.

Cable holder 11 including grommet 12 can also be provided to house tubing or wiring of the lift loop assembly tester 20, 280 (see FIGS. 12-15, 39-42, 54-55).

Figure 65:
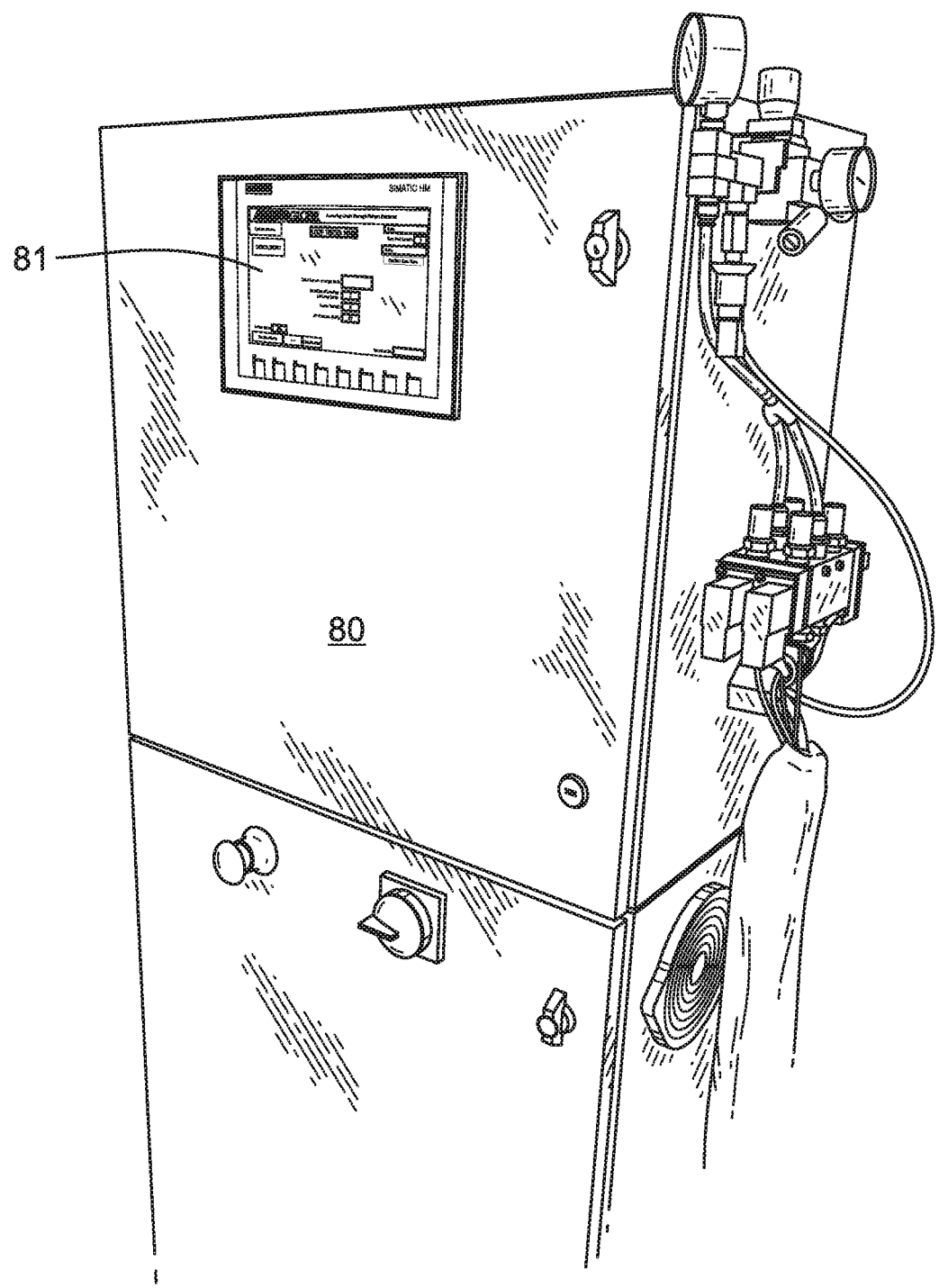
Figure 68:
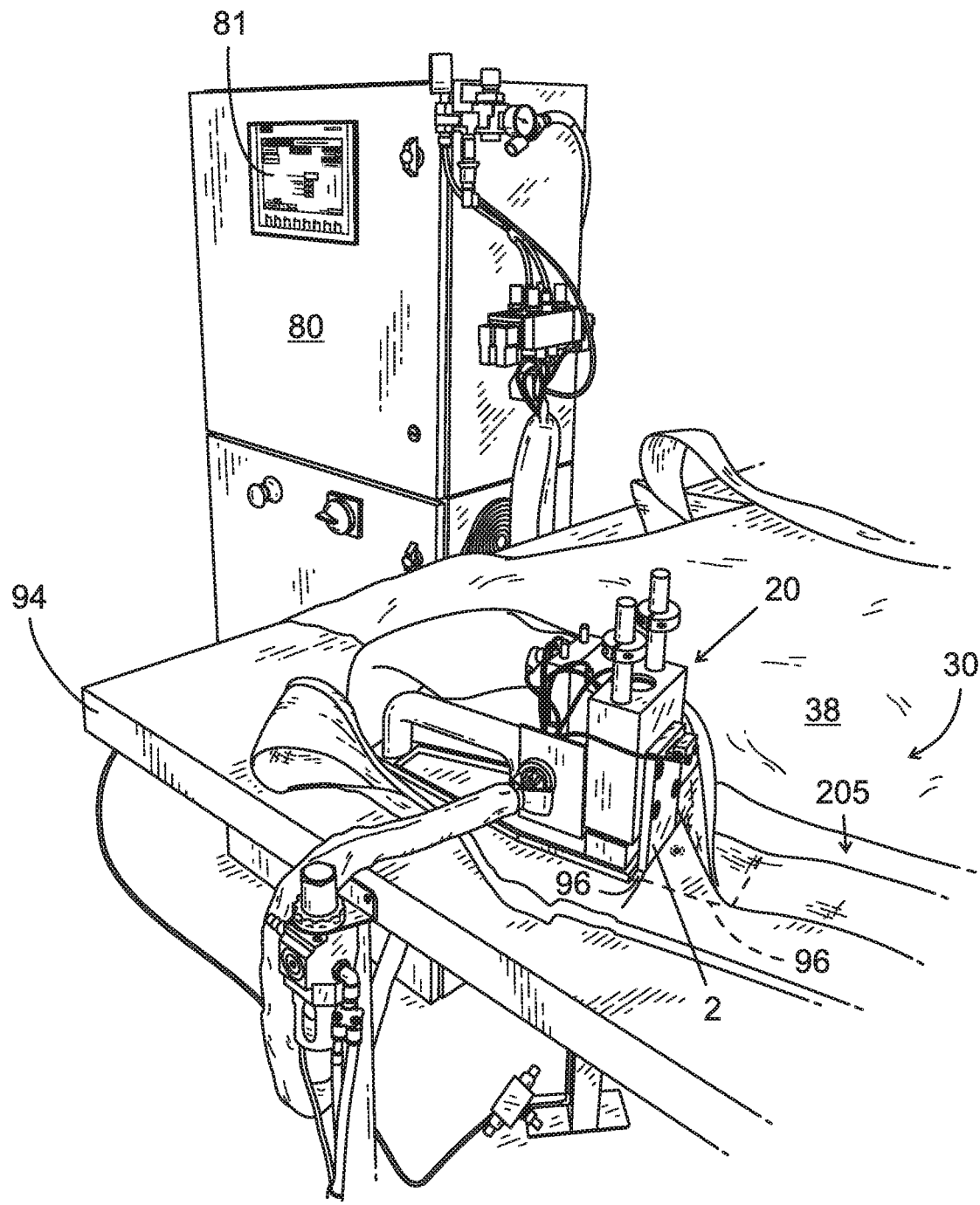
FIG. 68 illustrates a preferred embodiment of an electronic panel including a display screen and a preferred embodiment of a lift loop assembly tester apparatus of the present invention.

An electrical panel 80 including a display screen 81 for a lift loop assembly tester 20, 280 can be a stand alone piece of equipment connected to lift loop assembly tester 20, 280 e.g., with wiring (see FIGS. 65, 68-69). Preferably, the wiring is long enough to enable free movement of lift loop assembly tester 20 while testing a bag 30, e.g., about 6 feet long. In some embodiments, a lift loop assembly tester 20, 280 can be wirelessly connected to a control panel.

Figure 64:
FIGS. 64-65 illustrate an electronic panel including a display screen for use with a preferred embodiment of a lift loop assembly tester apparatus, system and method of the present invention.

Preferably, an electronic system of a lift loop assembly tester 20, 280 is configured so that marker assembly 4 only drops pen 13 downward through opening 17 of base mount 1 when a test is successful. If the test fails or an error is recorded, pen 13 will not drop downwards through opening 17 and will not mark the fabric of lift assembly 205. Stop 16 facilitates accuracy of pen 13, and it allows pen 13 to move downward until pen tip 21 makes contact with a surface of the fabric of a lift assembly 205 or another location on a bag 30. Software that can be used to program a lift loop assembly tester/lift tester 20, 280 is Siemens TIA portal engineering software. A lift tester 20, 280 can be programmed by entering parameters on a touchscreen HMI (Human Machine Interface) such as the KTP900 Basic panel commercially available from Siemens. These screens are very straight forward and can be operated by a person with ordinary skill in the art. FIGS. 64 and 69 illustrate examples of what a main tester display screen 81 can look like on a control panel 80.

Preferably, once stop 16 is set to allow a desired amount of free movement of pen 13, e.g., to allow about one inch of movement in upward and downward directions using fastener 32, stop 16 will not need re-adjustment. Allowing for free sliding movement of pen 13 in stop 16 is important because pen 13 may touch lift assembly 205 fabric before cylinders 15 have completed their downward movement, for example, in which case pen 13 can slide within stop 16 as cylinders 15 continue the downward movement. Stop 16 also helps fully engage pen 13 when marker assembly 4 retracts from the fabric. Preferably stop 16 is configured and adjustable to allow pen 13 to always have enough clearance to engage the fabric of lift assembly 205 or another location on a bag 30 when a successful test is completed, e.g., based on acceptable rise of a lifting platform 2 or 283.

In operation, a lift assembly safety test method preferably includes the following steps.

A lift assembly safety test method can include 1 to 8 test cycles per bulk bag 30, and preferably includes at least 4 test cycles per bulk bag 30 and most preferably 8 test cycles per bulk bag 30.

When a lift assembly test cycle is ready to begin, the lift loop assembly tester 20, 280 is preferably in a non-operating position with lifting platform 2, 283 in a downward position in contact with base plate 1.

Figure 71:
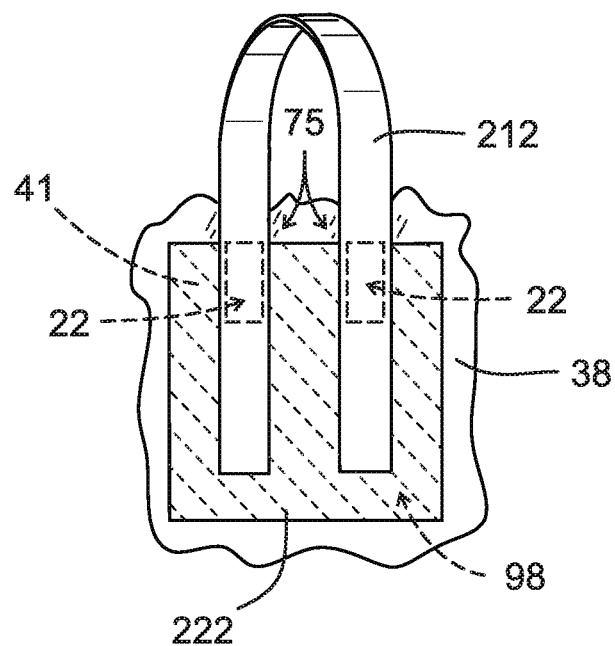
FIG. 71 is a detail view of a preferred embodiment of the present invention illustrating an insertion area of a lifting member in an unsealed area between a lift loop patch and the bag body.
Figure 72:
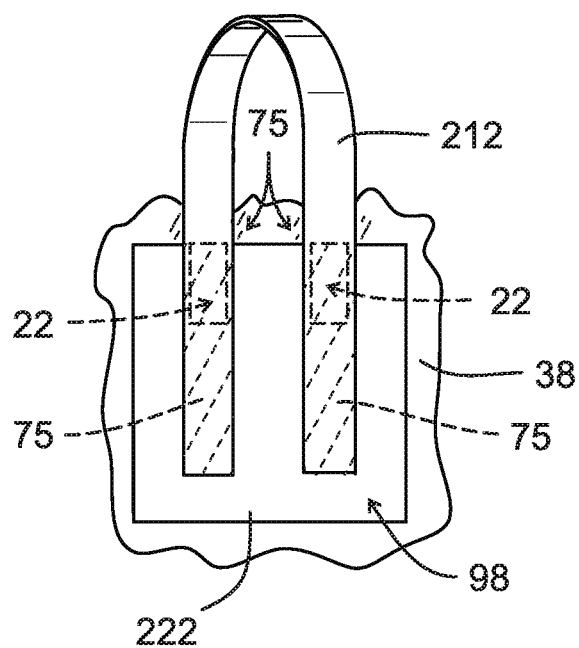
FIG. 72 is a detail view of a preferred embodiment of the present invention illustrating an unsealed area/insertion area under a patch and lift loop between a patch and bulk bag body.

A user can hold a lift loop assembly tester 20 or 280 with handle 8 and move lifting platform 2 or 283 in the direction of unsealed area 75 below patch 222 and lift member 212 and insert portion 22 or 284 of lifting platform 2 or 283 between patch 222 and body portion 38 at an upper portion of patch 222 in unsealed area 75 (see, e.g., FIGS. 3, 71 and 72). Cross hatching in FIG. 71 represents a sealed area of patch 222 to body 38, where a heat sealed bond or joint 41 is present. There is no seal between patch 222 and body 38 in the area under lift loop 212. Cross hatching in FIG. 72 represents an unsealed area 75 in between patch 222 and body 38 under the area of lift loop 212.

As lifting platform 2 insert portion 22 or lifting platform 283, insert portion 284 is inserted in the space or unsealed area 75 in between patch 222 and body portion 38, preferably sensor 76 on sensor spacer 10 (see FIGS. 12-16, 36-38, 54-55, 66, 74-75) senses the fabric and causes the test to begin. Preferably the electronic system is programmed to allow the test cycle to automatically begin when a sensor 76 on sensor spacer 10 senses the fabric. Preferably lifting platform 2, insert portion 22 of a tester 20 is inserted a distance of about 2 inches into unsealed area 75 between patch 222 and body portion 38. Preferably lifting platform 283, insert portion 284 is inserted a distance of about 4 inches into unsealed area 75 between patch 222 and body portion 38. Lifting platform 2, insert portion 22 and/or lifting platform 283, insert portion 284 can also be inserted between about 2 and 8 inches, for example, into the unsealed area 75 between patch 222 and body portion 38, e.g., depending on dimensions of an insert portion 22 or 284.

Figure 66:
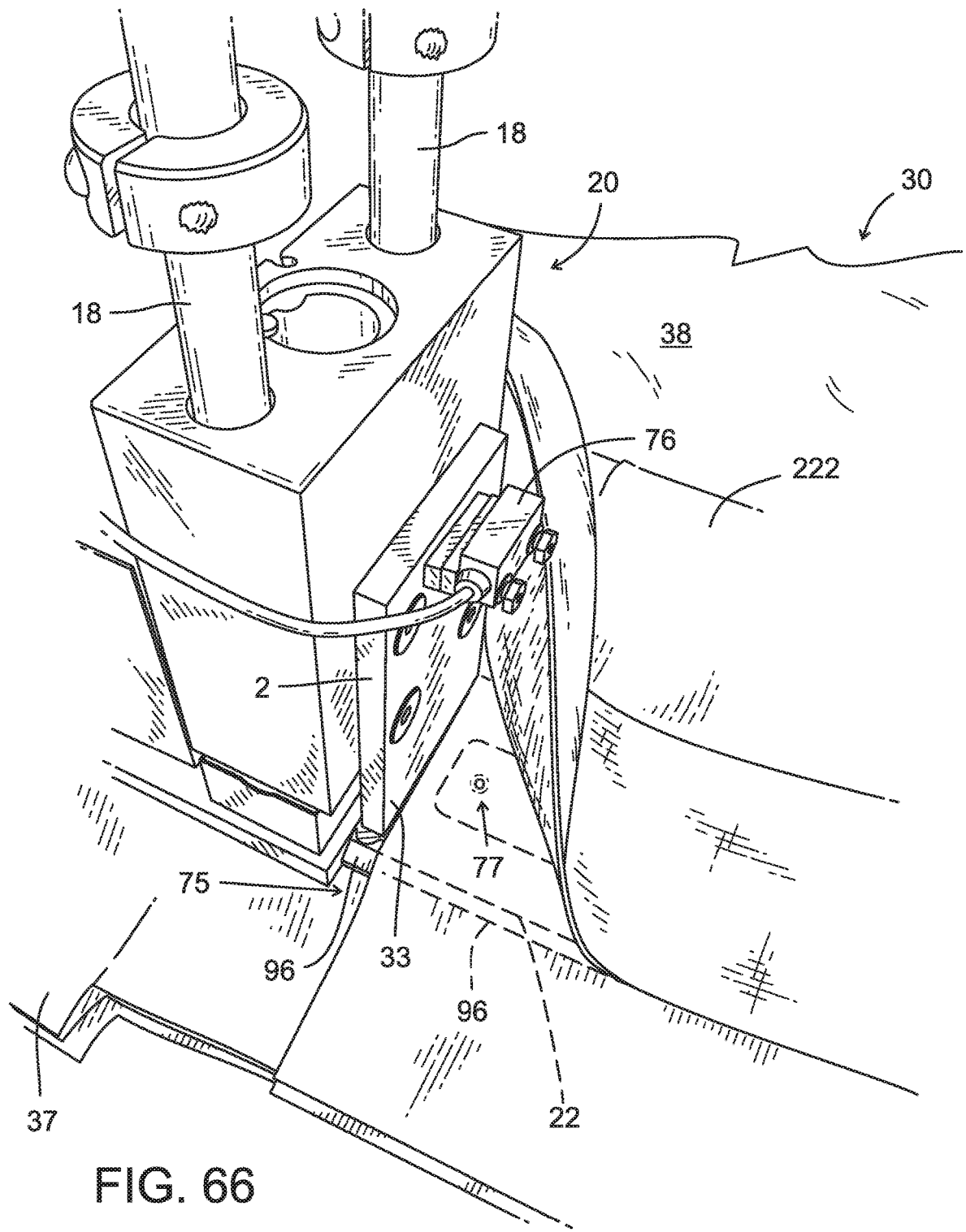
FIG. 66 illustrates a preferred embodiment of a lift loop assembly tester testing a lift loop assembly with a lifting platform fully inserted in a test area on a bulk bag in a preferred embodiment of the method of the present invention.
Figure 67:
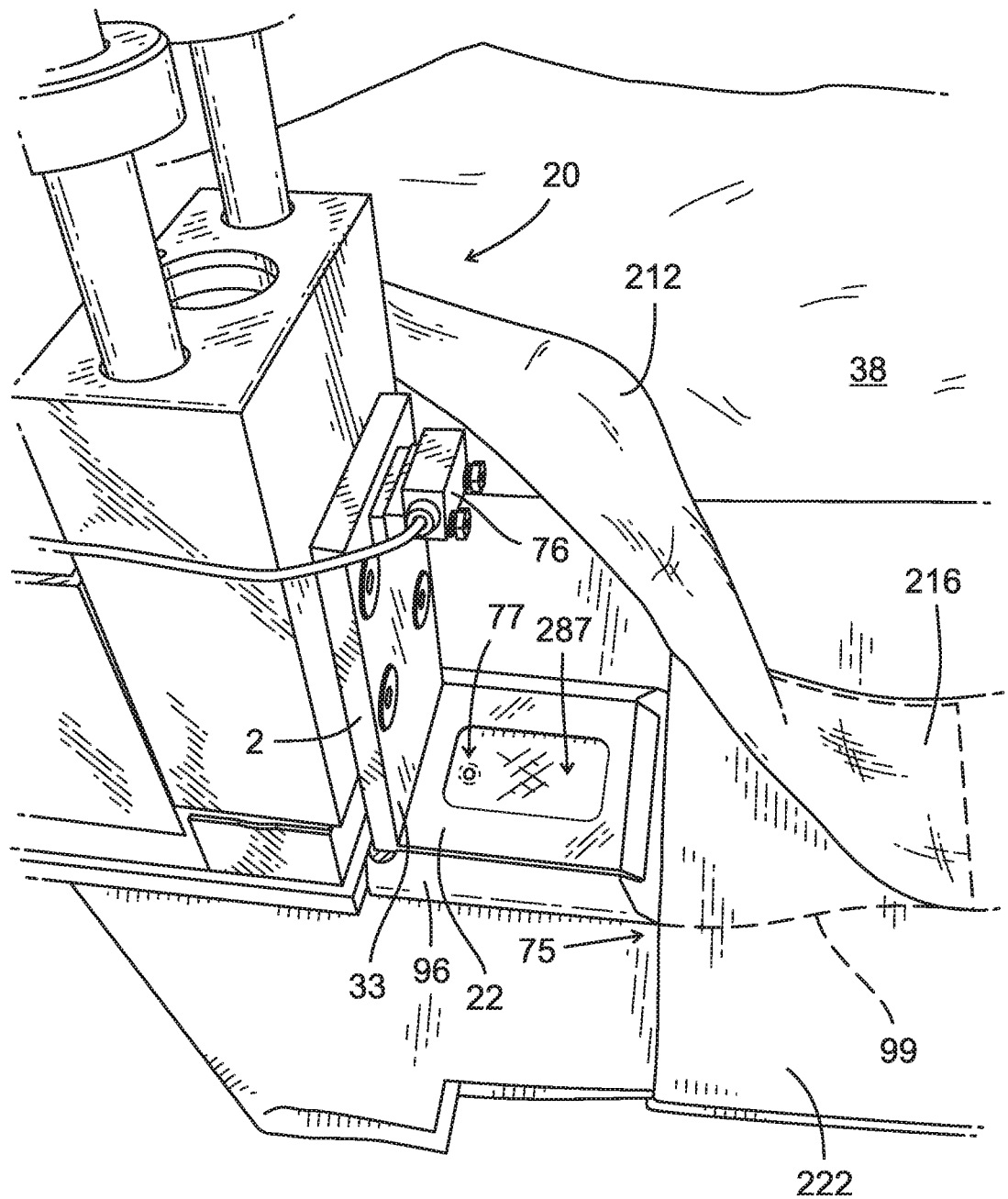
FIG. 67 illustrates a preferred embodiment of a lift loop assembly tester before testing a lift loop assembly on a bulk bag in a preferred embodiment of the method of the present invention.

Sensor spacer 10 preferably moves a sensor 76 in a forward direction so that sensor 76 can engage and/or sense the presence of fabric (e.g., if the sensor includes laser light or a laser beam 77 that can engage/sense the fabric as shown in FIGS. 66-67). A mounting plate 33 of lifting platform 2 or 280 stops insertion of insert portion 22. If no sensor spacer 10 is present, when moving insert portion 22 or 284 into unsealed area 75 and when insert portion 22 is lifting during the test, fabric around unsealed area 75 tends to move out of the way so that sensor 76 may no longer be able to engage the fabric or sense the fabric which can result in an error message during the test. With sensor spacer 10 included, even if a fabric edge moves back from lifting platform 2 or 283, the fabric is still fully engaged and/or sensed by sensor 76, otherwise preferably an error message would arise. Sensor 76 can sense fabric of body 38 before a test begins and fabric at the top of a patch 222 after a test is begun as shown in FIGS. 66-68.

In some embodiments, e.g., as shown in FIG. 70, reflective tape 288 can be included in a recessed area 287 of an insert portion 22 or 284 of a tester 20 or 280. Recess or recessed area 287 can preferably be about 0.020 to 0.100 inches deep, more preferably is about 0.040 to 0.070 inches deep and most preferably is about 0.060 inches deep. A recessed area 287 of an insert portion 22 or 284 provides protection for reflective tape 288. Sensor 76 on sensor spacer 10 can use reflective tape 288 to detect when a tester 20 or tester 280 is fully engaged under a patch 222. If reflective tape 288 were on the surface of the insert portion or lift member 22, 283 not having a recess 287, the edges of the bag 30 fabric could potentially catch it at some point and peal it off as it was being moved into unsealed area 75 between patch 222 and body 38.

A sensor 76 can be a sensor that can engage and/or sense the presence of bag 30 fabric, lift assembly 205 fabric, or of reflective tape. For example, a sensor 76 can be a retroreflective sensor commercially available from Banner Engineering. Reflective tape 288 can be reflective tape commercially available from 3M.

A test cycle can begin with a bag 30 on a table 94, e.g., as shown in FIG. 68. Base 1 bottom side/surface 95 of tester 20, 280 can be placed on a bag 30 and oriented so that rails 96 of base 1 of a lifting member 22 or 283 can be inserted into unsealed area 75 as shown in FIGS. 66-68, 73 with a tester 20. Lifting platform 283 of tester 280 can be used in a test cycle in a same or similar manner. Line 99 in FIG. 67 represents where rail 96 will be within unsealed area 75 after being inserted therein, which preferably is right at an edge of an adjacent bonded area or joint 41. Rail 96 and lifting member 22 are shown in phantom view in sealed area 75 in FIGS. 66, 68. Once a test cycle begins, air slide assembly 3 and cylinders 18 cause lifting platform 2, including insert portion 22 (or lifting platform 283, insert portion 284 if using tester 280), to rise in an upward direction as depicted in FIG. 73 by arrow 286. FIGS. 74 and 75 show lifting platform 283, lifting member 284 in a raised position. In one or more preferred embodiments, if lifting platform 2 insert portion 22 or lifting platform 283, insert portion 284 is raised more than 1.5 inches in a 3 second period, this is a signal that the test has failed. If lifting platform 2 or 283 does not raise more than 1.5 inches in a 3 second period, this is a signal that the test is successful. The electronic system can be programmed to enter desired lifting parameters for lifting of lifting platform 2, insert portion 22 or lifting platform 283, insert portion 284.

Rails 96 of a base 1 of lifting platform 20 and 280 serve two functions. Rails 96 increase structural strength of a tester 20, 280. Also, preferably rails 96 are part of a single piece construction of a tester frame or base 1. As part of a single piece bottom frame or base 1, rails 96 absorb the constant rubbing of fabric along the edges when inserted into unsealed area 75, thus relieving insert member 22, 283 of all insertion forces and potential side forces against the cylinder rods.

If a test is successful, the electronic system is preferably programmed so that marker assembly 4 will automatically drop pen 13 and mark a lift assembly 205, e.g., on a lift loop 212 leg 216 or to other wise mark another location on bag 30, as having completed a successful lift loop safety test. If the test is unsuccessful, the test will be canceled and pen 13 will not be lowered by marker assembly 4. A canceled state can be displayed on electrical control panel 80, display screen 81. A message can also be sent to technical support or engineering support.

During a test, error messages preferably are also fully displayed on display screen 81 as well as a canceled test. Support messages sent by e-mails, which can be behind the scene on the programming, can be programmed to be automatically sent depending on the level of error. A display screen 81 preferably notifies an operator if a tester apparatus 20, 280 is set so that it cannot cycle forward without technical support or engineering support.

Preferably each lift assembly 205 is tested twice in two unsealed areas of a patch 222 and body portion 38 in unsealed areas 75 below patch 222 that is below the two lift member ends/legs 216 of a lift assembly 205. If a bulk bag 30 has four lift assemblies 205, this means the hulk hag 30 is preferably tested eight times before being cleared as safe. In one or more preferred embodiments, an electronic system of a lift loop assembly tester 20, 280 can be programmed so that if a test cycle has more than 8 successful signals, an error message will occur that will cancel the test. This may happen, for example, if one unsealed area of lift assembly 205 is tested more than once. Any such error message can be displayed on display screen 81.

Other error messages can also occur, for example, if the set pressure of a lift loop assembly tester 20, 280 moves outside of an acceptable range (e.g., if the set pressure deviates from +/−1 psi when set at 37 psi). The electronic system can be programmed so that an operator cannot clear such an error message and so that any error messages are sent to technology support and/or engineering who can come and reset the test and fix any problems that have arisen before a test cycle can continue or be reset. Any such error messages can be displayed on display screen 81.

In one embodiment, preferably the parameters for a lift loop assembly tester 20 are set as follows:
 set to a pressure of 37 psi (+/−1 psi) to power cylinders 18 (if the pressure deviates more than +/−1 psi an error message/error state will arise);
 test cycle time period for lifting platform 2 to rise is set to 3 seconds;
 maximum lift of lifting platform 2 is set to 1.5 inches; and
 lifting member/insert portion 22 inserted 2 inches into unsealed area.

The lift loop safety test method, as described in one or more preferred embodiments herein, tests the peel strength of a bond or joint 41 between patch 222 and body portion 38 without degrading said bond or joint 41 in a bag 30 that is successfully tested. The test lifts a lifting platform 2 or 280 upward against both sides of the bonds/joints 41 that are on either side of unsealed area 75, and it is testing the peel strength of the bonds/joints 41 around or adjacent the unsealed area 75.

If a heat seal bond or connection is perfect, no separation or peeling will occur during the lift loop safety test. For example, if lifting platform 2, insert portion 22 or lifting platform 283 insert portion only rises about an ⅛ inch during a 3 second test cycle, this is evidence that the bond/joint 41 is at least close to perfect and likely no peeling has occurred.

If a heat seal bond or connection is good enough to pass the test and acceptable, but not perfect, a little peeling of the heat seal bond or joint 41 on one or both sides of unsealed area 75 may occur, but the bond or joint 41 is still strong enough to pass the current 5 to 1 safety lifting test requirements. For a tester 20, if lifting platform 2, insert portion 22 does not rise more than 1.5 inches in a 3 second period when cylinders 18 are powered to 37 psi, this is evidence that only an acceptable amount of peeling has occurred, and the bond/joint 41 is strong enough to pass the current 5 to 1 safety lifting test requirements and can be put on the market. For example, if lifting platform 2 rises between about ⅛ inch and 1.5 inches but not over 1.5 inches, this is evidence that some peeling may have occurred but the bond will still be strong enough to meet to the current 5 to 1 safety lifting standards.

If lifting platform 2, insert portion 22 of a tester 20 does rise more than 1.5 inches in a 3 second period when cylinders 18 are powered to 37 psi, this is evidence that an unacceptable amount of peeling has occurred and the bond/joint 41 between patch 222 and body 38 may not be strong enough to pass the current 5 to 1 safety lifting test requirements, and the bulk bag 30 should not be put on the market.

During experimentation and testing, bags that underwent a lift loop safety test and bags that did not undergo a lift loop safety test were compared in tests that tested strength until destruction. There was no measurable difference in strength between bags that had undergone a lift loop safety test and those that did not, which is evidence that the test does not degrade or weaken the heat seal connections or bonds.

During experimentation and testing, a sample of 1017 bags were tested with the above-stated preferred parameters for a tester 20. Only 13 bags of the 1017 sample were rejected in the test. The rest of the bags (1,004) were tested to destruction. A small number of the bags tested below the 11,000 pounds required per the 5 to 1 safety lifting requirements, but none of the bags failed below the minimum hoped for 3 to 1 safety level. In fact, all tested above 4 to 1 and only 3% tested below the 5 to 1 level. Many of them passed at 7 to 1.

For the above example using a tester 20, the 3 second preferred time period of the preferred testing parameters is selected based on experimentation and testing. During testing, results showed that if the test was run for less than 3 seconds, there was still a potential for peel movement. If the tests were run for more than 3 seconds, peel movement, however, tended to stop. As the lift member 2 lifts in each test cycle, depending on the peel strength of the bond of a patch 222 to a body portion 38, peel movement may begin but as the movement approaches the maximum peel movement, the movement starts to creep along or slows until it stops. In the above example, if the movement of lifting platform 2, insert portion 22 stops at 1.5 inches or below, this is evidence of a good bond that will pass safety lifting requirements.

FIGS. 70, 74-75 illustrates another preferred embodiment of a lift assembly tester apparatus of the present invention. As discussed, tester apparatus 280 can be the same or similar to tester apparatus 20 and used in a same or similar manner, however tester apparatus 280 as depicted has a lifting platform/platform 283 that has a longer insert portion/lifting member 284 that can be inserted further into an unsealed area between a lift loop patch 222 and bag body 38 to test a larger portion of the sealed areas 98 including bonds or joints 41 of lift loop patch 222 and body 38 that are adjacent to the unsealed areas.

In the embodiment shown in FIG. 70, insert portion 284 of lifting platform 283 is preferably about 4 inches long, and can be 4 to 8 inches long. A displacement sensor 281 on plate 282 is also included in the embodiment shown in FIGS. 70, 74-75 that senses displacement of fabric during lifting of insert portion 284 of lifting platform 283. Preferably, a beam of displacement sensor 281, e.g., laser light beam, reflects off a top of an air cylinder 18 body which in turn translates into the amount of movement of rise of insert portion 284 of lifting platform 283 that sensor 281 sees based on movement in unsealed area 75. The amount of rise of lifting platform 283 insert portion 284 sensed by a displacement sensor 281, e.g., whether it is 1.5 inches or less or more, can be automatically sent to a control panel 80. If the amount is rise is more than 1.5 inches a fail signal will occur and be recorded at control panel 80 and an error state for the tester 280 can occur. Recording of the amount of rise sensed by a sensor 181 or a failed test can be programmed to be automatic. If the rise is 1.5 inches or less, a successful signal can occur and be recorded at control panel 80 and pen 13 can be automatically lowered by marker assembly 4 to mark bag 30, e.g., on lift assembly 205.

A displacement sensor 281 can be a laser displacement sensor (IL Series) commercially available from Keyence. Other non-contact sensors can potentially be used to measure displacement such as resistive sensors, capacitive sensors, inductive sensors, ultrasonic sensors as well as other types of optical/laser sensors. There are also other linear transducers that can be attached to a lifting platform 2 or 283 to measure displacement as well.

A sensor 76 on sensor spacer 10 is also preferably included in this embodiment where sensor 76 senses movement of insert portion 284 as it is being inserted into unsealed area 75. Upon sensing that insert portion 284 has been inserted a desired distance, e.g., completely inserted in this embodiment if testing sealed areas 98 adjacent a 4 inch length of insert portion 284, then sensor 76 sends a signal to automatically start a test. A displacement sensor 281 can also be used on a tester apparatus 20 that includes a shorter insert portion 22 on lift member 2.

When both a displacement sensor 181 and sensor 76 are included, cylinders 18 of lifting platform 3 are triggered by sensor 76 on sensor spacer 10 upon full desired amount of penetration of lifting platform 2 or 283 insert portion 22, 284 into unsealed area 75 under patch 222. Desired penetration can be full penetration of insert portion 22, 284 where portion 33 of lifting platform 2 or 283 acts as a stop. Once full penetration or desired penetration of insert portion 22, 284 is achieved, cylinders 18 start moving upward and raise lifting platform 3, 283 and displacement sensor 281 measures the distance as lifting platform 3, 283 moves upward. When the upward movement stops due to the peel force equalizing with the upward pressure, then a displacement measurement is recorded, which can be automatically recorded at a control panel. In addition to that, if the upward movement continues to 1.5 inches, then parameters can be set so that the displacement sensor records that as a failed lift assembly 205 and cylinders 18 can reverse movement to a down position, which can be done automatically.

As discussed, a safety lift tester 20 or a safety lift tester 280 can be used to test peel strength of a heat sealed bond of a woven fabric of lift loop patch 222 on a woven fabric bulk bag 30 of a lift assembly 205. It is foreseeable that a safety lift tester 20 or 280 can also be used to test the strength of a bag 30 including a stitched lift loop 212 or lift loop assembly 210 that is stitched to a bag body portion 38, wherein the tester 20 can test the strength of stitches next to an unstitched area. A safety lift tester of the present invention, e.g, a tester 20 or 280, can also be used in other contexts to test strength of a joint (e.g., heat sealed joint) or seam (e.g., stitched) or bond or connection between flexible fabrics or other materials, e.g., to test peel strength which provides information on shear strength, between flexible fabrics or materials whether part of a bulk bag or not.

A heat seal bond that can be tested with one or more preferred embodiments of a tester of the present invention can be formed between flexible fabrics via one or more coatings as described herein, with hot melt and/or with an adhesive, for example.

In one or more embodiments of the present invention, peel strength of a bond or connection between flexible fabrics, e.g., flexible plastic fabrics, e.g., woven polypropylene or woven polyethylene fabrics that are heat sealed together, or that are not heat sealed together but connected by other means, can be tested with one or more preferred embodiments of a tester of the present invention. A connection or bond that is not heat sealed can be a bond via adhesive or connection via sewing.

In one or more embodiments of the present invention, peel strength of a bond or connection between two materials that are heat sealed bonded together, or that are not heat sealed bonded and connected by other means, can be tested with one or more preferred embodiments of a tester of the present invention. A connection or bond that is not heat sealed can be a bond via adhesive or connection via sewing.

In preferred embodiments, a discharge tube 40 of a bag 30 is made from 3 oz polypropylene fabric. A discharge tube 40 can also be made from 2 to 9 oz polypropylene fabric.

In preferred embodiments, a discharge tube assembly reinforcer or insert that can be included in a bag 30 is made from 5 oz polypropylene fabric. A discharge tube assembly reinforcer or insert can also be made from 2 to 9 oz polypropylene fabric.

In preferred embodiments a bag 30 bottom 39 is made from 5 oz polypropylene fabric. A bag bottom 39 can also be made from 3 to 9 oz polypropylene fabric.

In preferred embodiments a bag 30 body is made from 5 oz polypropylene fabric. A bag body 38 can also be made from 3 to 9 oz polypropylene fabric.

In preferred embodiments a bag top 37 is made from 3 oz polypropylene fabric. A bag top 37 can also be made from 2 to 10 oz polypropylene fabric.

In preferred embodiments a bag 30 fill spout 36 is made from 3 oz polypropylene fabric. A bag 30 fill spout 36 can also be made from 2 to 9 oz polypropylene fabric.

The following is a list of parts and materials suitable for use in the present invention:

PARTS LIST:

| PART NUMBER | DESCRIPTION |
| --- | --- |
| 1 | base mount/base plate |
| 2 | lift member for air slide/lifting platform/platform |
| 3 | air slide assembly |
| 4 | marker sub-assembly/marker assembly |
| 5 | fastener, (e.g., screw or bolt) |
| 6 | fastener, (e.g., screw or bolt) |
| 7 | fastener, (e.g., screw or bolt) |
| 8 | handle |
| 9 | fastener, (e.g., screw or bolt) |
| 10 | sensor spacer |
| 11 | cable holder |
| 12 | grommet |
| 13 | marking pen/felt tip marker |
| 14 | pen cap/hex nut |
| 15 | air cylinder/cylinder |
| 16 | c-clamp/stop/collar/shaft collar |
| 17 | opening |

-continued

PARTS LIST:

| PART NUMBER | DESCRIPTION |
| --- | --- |
| 18 | air cylinder/cylinder |
| 19 | standard coating |
| 20 | lift loop assembly tester/test or tester apparatus/lift assembly tester/lift loop assembly safety tester |
| 21 | pen tip |
| 22 | lifting platform insert portion/lifting member/platform insert portion |
| 30 | bulk bag |
| 32 | fastener, (e.g., screw/shaft collar screw/bolt) |
| 33 | plate/mounting plate |
| 34 | slot of stop 16 |
| 35 | opening/threaded opening of stop 16 |
| 36 | fill spout of bag 30 |
| 37 | top of bag 30 |
| 38 | intermediate panel/side wall/body portion of bag 30 |
| 39 | bottom of bag 30 |
| 40 | discharge portion/discharge spout of bag 30 |
| 41 | heat seal seam or joint |
| 42 | marker holder |
| 43 | body portion opening |
| 44 | exterior or outer surface of body portion |
| 45 | portion |
| 46 | air slide assembly/marker |
| 47 | assembly air slide assembly |
| 48 | fastener, (e.g., screw or bolt) |
| 50 | bore |
| 51 | cylinder foot of marker sub-assembly |
| 52 | assembly |
| 53 | carrier plate |
| 54 | side and end rail assembly |
| 55 | edge guide |
| 56 | clamp |
| 57 | fastener (e.g., screw or bolt) |
| 58 | fastener (e.g., screw or bolt) |
| 59 | fastener, (e.g., screw or bolt) |
| 60 | fastener, (e.g., washer) |
| 61 | openings |
| 62 | heat seal bar |
| 63 | bulk bag main body heat sealing machine |
| 64 | machine |
| 65 | table |
| | heat seal bar assembly for discharge tube and bottom joint |
| | heat seal bar assembly for bottom and body joint |
| | heat seal bar assembly for label/tag joint |
| | heat seal bar assembly for body and top joint |
| 66 | heat seal bar assembly for top and fill spout joint |
| 67 | heat seal bar |
| 68 | heat seal bar |
| 69 | heat seal bar |
| 70 | lift loop assembly and bottom cover/diaper heat seal machine |
| 71 | table |
| 72 | heat seal bar assembly for lift loop assembly joints |
| 73 | heat seal bar assembly for bottom cover/diaper joints |
| 74 | heat seal bar |
| 75 | arrows - unsealed patch area |
| 76 | sensor |
| 77 | laser light/laser beam |
| 78 | heat seal bar |
| 80 | electrical panel/control panel |
| 81 | display screen |

-continued

| PART NUMBER | DESCRIPTION |
|---|---|
| 85 | folds |
| 93 | center position/fold/crease |
| 94 | table |
| 95 | base bottom surface |
| 96 | rail |
| 97 | cylinder foot |
| 98 | sealed area |
| 99 | line |
| 152 | tie |
| 154 | bottom cover/diaper |
| 191 | heat sealing coating |
| 205 | lifting assembly/lift assembly |
| 210 | lift member assembly/lift loop assembly |
| 212 | lift loop/strap/lift member |
| 214 | upper end/lift end of loop 212 |
| 216 | lower end/connection end/end/lift loop leg of loop 212 |
| 220 | bag connection assembly |
| 222 | patch/intermediate member |
| 223 | stitching |
| 224 | connection area |
| 225 | bottom surface of loop 212 |
| 226 | top surface of loop 212 |
| 228 | twist or fold area of loop 212 |
| 240 | bottom surface of patch 222 |
| 241 | top surface of patch 222 |
| 251 | side wall of panel 38 |
| 252 | side wall of panel 38 |
| 253 | side wall of panel 38 |
| 254 | side wall of panel 38 |
| 261 | corner location/area |
| 262 | corner location/area |
| 263 | corner location/area |
| 264 | corner location/area |
| 267 | top edge of patch 222 |
| 271 | surface |
| 280 | lift loop assembly tester/tester/test or tester apparatus/lift assembly tester/lift loop assembly safety tester |
| 281 | displacement sensor |
| 282 | plate |
| 283 | lift member for air slide/lifting platform/platform |
| 284 | lifting platform insert portion/lifting member/platform insert portion |
| 285 | arrow |
| 286 | arrow |
| 287 | recess/recessed area |
| 288 | tape/reflective tape |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An apparatus for testing peel strength of a bond or connection between flexible fabrics, the apparatus comprising:
   a) a lifting member that is operable to be raised and lowered under pressure, the lifting member sized to be inserted in between a first flexible fabric and a second flexible fabric in an unsealed area that has a sealed area adjacent the unsealed area;
   b) wherein the sealed area includes the bond or connection which couples the first flexible fabric to the second flexible fabric; and
   c) wherein a distance the lift member is able to rise under a designated pressure for a designated time interval in the unsealed area provides a measure of an amount of peel in the sealed area that is adjacent the unsealed area and information on whether peel strength of the sealed area is adequate, which is an indicator of whether shear strength of the sealed area is adequate.

2. The apparatus of claim 1, wherein the bond or connection is a heat-sealed bond and the apparatus is operable to test strength of the heat-sealed bond between the first flexible fabric and the second flexible fabric.

3. The apparatus of claim 2 wherein the first flexible fabric is part of a body of a bulk bag and the second flexible fabric is part of a lift assembly of the bulk bag.

4. The apparatus of claim 1 further comprising a sensor operable to sense when the lifting member is inserted into the unsealed area and to send a signal for a test to start.

5. The apparatus of claim 4 further comprising a marker assembly, wherein the marker assembly is operable to automatically mark the first flexible fabric or the second flexible fabric when the test has been successful.

6. The apparatus of claim 1 wherein a control panel can cancel a test using the apparatus when said test is unsuccessful.

7. The apparatus of claim 6 wherein the test is unsuccessful if the distance the lifting member rises is above 1.5 inches from a starting height and the designated time interval is 3 seconds and the designated pressure is 37 psi.

8. The apparatus of claim 1 wherein a test using the apparatus is successful if the distance the lifting member rises is 1.5 inches or below from a start height and the designated time interval is 3 seconds and the designated pressure is 37 psi.

9. The apparatus of claim 1 wherein the lifting member has a length that is sized to be inserted at least 2 to 8 inches into the unsealed area and the designated pressure is 36 psi to 120 psi.

10. The apparatus of claim 1 wherein the lifting member has a width that is sized to apply pressure to an edge of said sealed area when the lifting member is inserted into the unsealed area and wherein a length of the lifting member determines an amount of the bond or connection that is tested and the designated pressure that is selected.

11. An apparatus for testing strength of a connection between flexible fabrics of a bulk bag, the apparatus comprising:
   a) an insert portion that is sized so that at least a portion of the insert portion can be inserted into an unsealed area in between a first flexible fabric and a second flexible fabric of the bulk bag, and wherein the insert portion is sized to apply pressure to sealed areas of the first flexible fabric and the second flexible fabric that are adjacent to the unsealed area, wherein the sealed areas comprise a bond between the first flexible fabric and the second flexible fabric;
   b) wherein the insert portion is operable to be raised while inserted into the unsealed area to lift the first flexible fabric and test an amount of peel that occurs in said sealed areas, wherein the amount of peel is an indicator of peel strength of the bond between the first flexible fabric and the second flexible fabric;
   c) wherein the insert portion is operable to be raised while inserted in the unsealed area for a desired amount of time under a desired amount of pressure; and
   d) wherein a distance that the insert portion rises for the desired amount of time under the desired amount of pressure is a measure of the amount of peel that occurs in the sealed areas while the insert portion is being raised and provides information as to whether a shear strength of the bond is adequate.

12. The apparatus of claim 11 wherein the first flexible fabric is part of a lift loop assembly and the second flexible fabric is part of a body portion of a bulk bag.

13. The apparatus of claim 11 wherein the unsealed area has sealed areas at least partially around the unsealed areas.

14. A test system for measuring adequacy of a connection between flexible fabrics, the test system comprising:
   a) a tester having a lifting member that is sized so that at least a portion of the lifting member can be inserted into an unsealed area in between a first flexible fabric and a second flexible fabric, wherein the unsealed area is adjacent to a sealed area between the first flexible fabric and the second flexible fabric, and wherein the sealed area comprises the connection;
   b) the lifting member operable to be raised for a designated time interval under a designated pressure while the lifting member is in the unsealed area to lift the first flexible fabric and apply pressure to the connection in the sealed area;
   c) a control panel in electric communication with the tester, the control panel operable to record data on an amount of lift of the first flexible fabric under the designated pressure and within the designated time interval; and
   d) wherein a distance that the lifting member rises under the designated pressure within the designated time interval is a measure of an amount of peel that occurs in the sealed areas and provides information on a shear strength of the connection.

15. The system of claim 14 further comprising a marker assembly that is operable to be raised and lowered for marking said first flexible fabric or said second flexible fabric when a test is successful.

16. The system of claim 15 wherein the control panel is programmed to send a success signal to the tester if the test is successful and to lower the marker assembly to mark a location on the first flexible fabric or the second flexible fabric if the lifting member does not rise above a designated distance while under the designated pressure within the designated time interval.

17. The system of claim 14 further comprising a sensor that can sense when the lifting member is inserted in the unsealed area.

18. The system of claim 17 wherein the sensor is operable to send a signal to the tester to start a test when the sensor senses the first flexible fabric or the second flexible fabric when the lifting member is inserted in the unsealed area.

19. The system of claim 14 wherein the control panel is programmed to send an error signal to the tester to enter an error state if the lifting member rises above a designated distance and/or if the pressure deviates from set parameters.

20. The system of claim 14 wherein the control panel is programmed to send a success signal to the tester if the test is successful and the lifting member does not rise above a designated distance while under the designated pressure and within the designated time interval.

\* \* \* \* \*